United States Patent
Sogo et al.

(10) Patent No.: US 8,762,240 B2
(45) Date of Patent: Jun. 24, 2014

(54) ELECTRONIC VALUE EXCHANGE SYSTEM, TERMINAL DEVICE, RECOVERY DEVICE AND METHOD OF EXCHANGING ELECTRONIC VALUE ADOPTABLE THERETO

(75) Inventors: Takushi Sogo, Tokyo (JP); Yuichi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 830 days.

(21) Appl. No.: 12/744,309

(22) PCT Filed: Nov. 18, 2008

(86) PCT No.: PCT/JP2008/003369
§ 371 (c)(1),
(2), (4) Date: Aug. 23, 2010

(87) PCT Pub. No.: WO2009/066443
PCT Pub. Date: May 28, 2009

(65) Prior Publication Data
US 2010/0312681 A1   Dec. 9, 2010

(30) Foreign Application Priority Data

Nov. 21, 2007   (JP) ................................. 2007-301131

(51) Int. Cl.
*G06Q 40/00*   (2012.01)

(52) U.S. Cl.
USPC .......................................................... 705/35

(58) Field of Classification Search
None
See application file for complete search history.

(56) References Cited

U.S. PATENT DOCUMENTS 5,557,518 A * 9/1996 Rosen ............................ 705/69
5,799,087 A    8/1998 Rosen
5,982,293 A * 11/1999 Everett et al. .................. 340/5.4

FOREIGN PATENT DOCUMENTS

| JP | 9-511350 A | 11/1997 |
|----|-----------|---------|
| JP | 11-504144 A | 4/1999 |

(Continued)

OTHER PUBLICATIONS

Kimio Kuramitsu, et al., "TTP: Secure ACID Transfer Protocol for Electronic Ticket between Personal Tamper-proof Devices", Proc. 24th IEEE Annual International Computer Software and Applications Conference (COMPSAC 2000), Oct. 25, 2000, pp. 87-92.

Primary Examiner — Robert Niquette
Assistant Examiner — Chia Yi Liu
(74) Attorney, Agent, or Firm — Sughrue Mion, PLLC

(57) ABSTRACT

An electronic value exchange system which includes first and second terminals (1*d*), (1*e*) which at least execute electronic value exchange with each other, and an authentication device (110), each of the first and second terminals has a value storage unit (13) which stores the electronic value; an exchange contract data storage unit (17) which stores exchange contract data representing contents of the electronic value exchange; an exchange state storage unit (16) which represents a state of the electronic value exchange; a commit order storage unit (14) which stores a commit order which indicates that which of the first terminal and the second terminal is the first to execute; an identification information storage unit (15) which stores identification information assigned to every process of transmission/reception of the exchange contract data; and a first exchange execution unit (12) which executes transmission/reception of the exchange contract data with respect to each of the first and second terminals and stores it into the exchange contract data storage unit (17), wherein the authentication device (110) has a second exchange execution unit (114) which acquires the exchange contract data from either one of the first and second terminals, and operates the value storage unit (13) of such one terminal to execute the electronic value exchange.

5 Claims, 31 Drawing Sheets

(56) References Cited

FOREIGN PATENT DOCUMENTS

| | | |
|---|---|---|
| JP | 11-505348 A | 5/1999 |
| JP | 2001-084177 A | 3/2001 |
| WO | 95/30211 A1 | 11/1995 |
| WO | 96/33476 A2 | 10/1996 |
| WO | 96/36947 A1 | 11/1996 |

* cited by examiner

FIG. 9

| POINTS OF OCCURRENCE OF COMMUNICATION FAILURE | TERMINAL WITH COMMIT ORDER OF PREDECESSOR | TERMINAL WITH COMMIT ORDER OF SUCCESSOR |
|---|---|---|
| START TO E1 | UNDEFINED | UNCOMMITTED |
| E2 | COMMIT-READY | UNCOMMITTED |
| E3 | COMMIT-READY | COMMIT-READY |
| E4 | COMMITTED | COMMIT-READY |
| E5 TO END | COMMITTED | COMMITTED |

FIG. 10

| COMMIT ORDER | HISTORY OF RECOVERY IN OPPOSITE-PARTY TERMINAL | CANCELLATION/ COMMIT TO VALUE CHANGES |
|---|---|---|
| PREDECESSOR | UNRECOVERED | CANCEL |
| PREDECESSOR | RECOVERED | COMMIT |
| SUCCESSOR | UNRECOVERED | COMMIT |
| SUCCESSOR | RECOVERED | CANCEL |

(a) MOBILE PHONE 6a SECURE STORAGE AREA

FIG. 22

| ELECTRONIC TICKET<br>ID : 10001<br>  SOURCE MOBILE PHONE ID : 09012334<br>  DESTINATION MOBILE PHONE ID : 09005678 | ELECTRONIC MONEY<br>PRICE : 1,500YEN<br>  SOURCE MOBILE PHONE ID : 09005678<br>  DESTINATION MOBILE PHONE ID : 09012334 |

FIG. 27

| POINTS OF OCCURRENCE OF COMMUNICATION FAILURE | TERMINAL WITH COMMIT ORDER OF PREDECESSOR | TERMINAL WITH COMMIT ORDER OF SUCCESSOR |
|---|---|---|
| START TO E11 | COMMITTED | COMMITTED |
| E12 | COMMIT-READY | COMMITTED |
| E13 | COMMIT-READY | COMMIT-READY |
| E14 | QUASI-COMMITTED | COMMIT-READY |
| E15 TO END | QUASI-COMMITTED | QUASI-COMMITTED |

ELECTRONIC VALUE EXCHANGE SYSTEM, TERMINAL DEVICE, RECOVERY DEVICE AND METHOD OF EXCHANGING ELECTRONIC VALUE ADOPTABLE THERETO

CROSS REFERENCE TO RELATED APPLICATIONS

This application is a National Stage of International Application No. PCT/JP2008/003369filed Nov. 18, 2008, claiming priority based on Japanese Patent Application No. 2007-301131, filed Nov. 21, 2007, the contents of all of which are incorporated herein by reference in their entirety.

TECHNICAL FIELD

The present invention relates to an electronic value exchange system, a terminal device, a recovery device, a method of exchanging electronic value and a program adoptable thereto, and in particular to an electronic value exchange system which takes part in transfer and exchange of electronic value between terminals.

BACKGROUND ART

In recent years, electronic value (simply referred to as "value", hereinafter) such as electronic money, electronic ticket or the like, has been made available while being stored in mobile phone and other various terminal devices, and has also been utilized while being transferred or exchanged between terminal devices.

Methods of enabling this sort of transfer or exchange of the value between the terminal devices are classified into those making use of server or the like, and those based on direct process between the terminal devices. In this specification, the latter method based on direct process between the terminal devices will be explained.

A system, which transfers the value directly between the terminal devices without being mediated by a server or the like, is composed of a recording medium which stores data (value), and a storage unit which temporarily stores data in the process of transfer, and operates as described below (see Patent Document 1, for example).

First, when communication starts between the terminal devices, each of a data source terminal device and a destination terminal device preliminarily makes a copy of the initial state of its own recording medium into a temporary storage unit, and discards the copy stored in the temporary storage unit if the transfer successfully completes. On the other hand, if communication failure occurs in the process of transfer, the copy stored in the temporary storage unit is written back to the recording medium, to thereby recover the state before the transfer.

In general, in data transfer or exchange between the terminal devices, it is important to avoid any unexpected state such as duplication or loss of data between both terminal devices, even if communication failures should occur. According to the technique described in Patent Document 1, data in the recording medium before being transferred is preliminarily stored in the temporary storage unit, and is written back to the recording medium if communication failure should occur, so as to avoid any unexpected duplication or loss of data.

The method described in Patent Document 1 is, however, not perfect in the following point of view. Assuming now, for example, that a communication failure occurs immediately after issuing an "addition completion notification". According to the method described in Patent Document 1, the device on the sending side judges that some abnormality has occurred after "checking completion of addition over a predetermined duration of time", since the sending device did not receive an "addition completion notification" from the device on the receiving side, and then executes recovery.

However, in the method described in Patent Document 1, the device on the receiving side has already received "an erasure completion notification" from the device on the sending side, before issuing the "addition completion notification", and erroneously assumes that the transfer has successfully completed, in "checking completion of erasure over a predetermined duration of time". As a consequence, the data is duplicated in both of the devices on the sending side and the receiving side.

It is now assumable in the method described in Patent Document 1, that there may be a case where the erasure completion notification and the addition completion notification are issued in reverse order, that is, a case where the erasure completion notification is issued after the addition completion notification was issued. In this case, if some communication failure should occur, for example, immediately after the erasure completion notification was issued, the data is erased in the device on the server side assuming that the transfer was normally completed, but recovery is executed in the device on the client side assuming that some abnormality has occurred. This results in an unfavorable situation such that the data reside neither in the device on the server side nor in the device on the client side, which means erasure of data.

For the purpose of solving such problem, one possible method may be such as temporarily interrupting the process in the state of occurrence of abnormality when some abnormality should occur in either of the devices on the server side or on the client side, and the temporarily interrupted process is restarted after the device is re-connected, rather than immediately recovering the state of value (data) before the process as described in the above.

The method of recovery will be explained referring to FIG. 30. FIG. 30 illustrates a process in which value deletion and value addition are executed respectively by the server side terminal and the client side terminal, and decides value changes and completes the transfer, after receiving a notification from the opposite party (details of value deletion and value addition not illustrated) (steps S201, S202, S211, S212 in FIG. 30).

If, communication failure occurs at e1 or e2, and the terminal could not receive the notification, both terminal devices are re-connected to recover the communication, and the succeeding process is executed (steps S203, S204, S213, S214 in FIG. 30). The value in the terminal device, having been failed in receiving the notification, is locked to remain unavailable, until the communication is recovered and the process is completed.

The method of recovery described in the above is, however, not successfully adoptable in an environment where both terminal devices are not always guaranteed to establish re-connection in case of communication failure. Assuming now an exemplary case where two distant users are going to transfer electronic money using the respective terminal devices through a network, and where communication failure accidentally occurs at e1 in FIG. 30, the client side terminal may remain unconscious of communication failure because the electronic money has successfully been received, and may therefore not establish re-connection with the server side terminal. The electronic money in the server side terminal may therefore be remained locked, and this causes disadvantage to the user of the server side terminal.

Moreover, in this case, even if a trial should be made to forcedly recover the locked value, typically by bringing the server side terminal to a service supplier, so as to recover the state before the transfer by cancelling the value changes, or so as to decide the changes, such method of recovery is not available, since whether the changes have been committed by the client side terminal or not is unknown.

There may be another possible way to re-write the value recorded into the recording medium using a server, rather than using a terminal device alone as described in the above, from the viewpoint of security or the like. An exemplary operation of a system, which takes part in value transfer or exchange between the terminal devices using a server as described in the above, will be explained referring to FIG. 31. In this example, an electronic ticked stored in a terminal 210 is transferred to a terminal 220, and an electronic money stored in a terminal 220 is moved to the terminal 210.

First, communication starts between the terminals 210, 220, and data representing contents of exchange to be started (exchange of the electronic ticket in the terminal 210 and the electronic money in the terminal 220) is exchanged [(a) in FIG. 31], and contents of recording media 211, 221 are locked to be unchangeable by the others except a server 230.

Next, when the terminal 210 establishes connection through a public wireless network 200 to the server 230, and sends the data to the server 230, the server 230 makes authentication between itself and the recording medium 211, and moves the electronic ticket to the server 230 [(b) in FIG. 31]. Also the terminal 220 moves the electronic money to the server 230 [(c) in FIG. 31], similarly to as described in the above.

When both terminals 210, 220 establish connection to the server 230 and finish movement of the data to be exchanged to the server 230, the server 230 sends a message typically by means of E-mail to the individual terminals 210, 220. Upon reception of the message, the terminal 210 establishes connection to the server 230 again, the server 230 makes authentication between itself and the recording medium 211, and then moves the electronic money to the recording medium 211 [(d) in FIG. 31], and unlocks the recording medium 211. Also with respect to the terminal 220, the server 230 moves the electronic ticket to the recording medium 221 similarly to as described in the above [(e) in FIG. 31] and unlocks the recording medium 221. By the process described in the above, the electronic value exchange between the terminals 210, 220 completes.

In the procedure (b) or (c) in FIG. 31, if one of the terminals 210, 220 had established connection with the server 230, but the other terminal did not establish connection with the server 230 thereafter within a predetermined length of time, the server 230 assumes that the exchange was cancelled, then returns the value to the terminal which had established connection earlier, and unlocks the recording medium. The length of time before the cancellation is judged may be given by a predetermined value in some method, or may be decided based on negotiation between the terminals when the first communication is established therebetween in other method.

In the methods described in the above, exchange of the value does not complete until each of both terminals 210, 220 respectively moves the value to the server 230. Therefore, the values may not become inconsistent with each other, even if communication failure should occur in the process of exchange.

The method described in the above, however, suffers from complexity of procedures, since the user who moved the value to the server has to wait until the process in the terminal on the opposite party completes.

Moreover, the above-described method cannot smoothly complete the exchange, unless the users in both parties are cooperative. For an exemplary case where one terminal 210 established connection to the server 230, but the other terminal 220 did not immediately establish connection to the server 230, recording medium 211 of the terminal 210 is locked, and therefore the user cannot use other services.

For another exemplary case where a deadline electronic ticket is exchanged, the user may suffer from disadvantage if the terminal in the opposite party did not establish connection to the server to the very end, and the exchange was cancelled after the expiration date had passed, or immediately before the expiration date.

[Patent Document 1] Japanese Laid-Open Patent Publication No. 2001-84177 (FIG. 3, FIG. 4)

DISCLOSURE OF THE INVENTION

If the above-described electronic value exchange system relevant to the present invention adopts a method of effecting transfer and exchange of the value between the terminals, the terminal devices are not guaranteed to re-establish the connection for the purpose of recovering the value. As a consequence, if communication failure should occur in the process of value transfer or exchange between two terminal devices, the electronic value exchange system relevant to the present invention suffers from a problem in that the values stored in the terminal devices may not always successfully be recovered to a consistent state.

On the other hand, if the electronic value exchange system relevant to the present invention adopts a method of effecting transfer and exchange of the value using a server, typically for achieving security, the user may suffer from the disadvantage, that the exchange does not complete immediately.

It is therefore an object of the present invention to solve the above-described problems, and to provide an electronic value exchange system, a terminal device, a recovery device, and a method of exchanging electronic value and a program adoptable thereto, capable of recovering the state of values in two terminal devices into a consistent one, even if the terminal devices are not successfully re-connected with each other in case of communication failure in the process of value transferor exchange between the terminal devices.

It is another object of the present invention to solve the above-described problems, and to provide an electronic value exchange system, a terminal device, a recovery device, and a method of exchanging electronic value and a program adoptable thereto, capable of immediately completing value exchange, when a server is used for value exchange between two terminal devices.

According to the present invention, there is provided a first electronic value exchange system which includes first and second terminals which at least execute electronic value exchange with each other, and an authentication device.

Each of the first and second terminals includes:
a value storage unit which stores the electronic value;
an exchange contract data storage unit which stores exchange contract data representing contents of the electronic value exchange;
an exchange state storage unit which represents a state of the electronic value exchange;
a commit order storage unit which stores a commit order which indicates that which of the first terminal and the second terminal is the first to execute state change in the exchange state storage unit, into any one of a committed state representing a normal state before modification of the electronic value, a commit-ready state representing a state after completion of transmission/reception of the exchange contract data and before the exchange contract is committed, and a quasi-committed state representing a state after the exchange contract is committed;

an identification information storage unit which stores identification information assigned to every process of transmission/reception of the exchange contract data; and a first exchange execution unit which decides the commit order and stores it into the commit order storage unit, decides the identification information and stores it into the identification information storage unit, and executes transmission/reception of the exchange contract data between itself and each of the first and second terminals and stores it into the exchange contract data storage unit, precedently changes the state of the exchange state storage unit of the terminal having the commit order committed as predecessor to the commit-ready state, succeedingly changes the state of the exchange state storage unit of the terminal having a commit order committed as successor to the commit-ready state, succeedingly changes the state of the exchange state storage unit of the terminal committed as predecessor to the quasi-committed state, and succeedingly changes the state of the exchange state storage unit of the terminal committed as successor to the quasi-committed state.

The authentication device includes a second exchange execution unit which acquires the exchange contract data from either one of the first and second terminals, and operates the value storage unit of the one terminal after the two exchange state storage units are brought into the quasi-committed state to execute the electronic value exchange, to thereby change the state of the exchange state storage unit of the terminal into the committed state.

According to the present invention, there is provided a second electronic value exchange system which at least executes electronic value exchange between first and second terminals.

Each of the first and second terminals includes:
a value storage unit which stores the electronic value;
exchange contract data storage unit which stores exchange contract data representing contents of the electronic value exchange;
an exchange state storage unit which represents a state of the electronic value exchange;
a commit order storage unit which stores a commit order which indicates that which of the first terminal and the second terminal is the first to execute state change in the exchange state storage unit, into any one of a committed state representing a normal state before modification of the electronic value, a commit-ready state representing a commit-ready state representing a state after completion of transmission/reception of the exchange contract data, and a quasi-commit state representing a state after the exchange contract is committed;

an identification information storage unit which stores identification information assigned to every process of transmission/reception of the exchange contract data; and an exchange execution unit which decides the commit order and stores it into the commit order storage unit, decides the identification information and stores it into the identification information storage unit, and executes transmission/reception of the exchange contract data between itself and each of the first and second terminals and stores it into the exchange contract data storage unit, precedently changes the state of the exchange state storage unit of the terminal having the commit order committed as predecessor to the commit-ready state, succeedingly changes the state of the exchange state storage unit of the terminal having an commit order committed as successor to the commit-ready state, succeedingly changes the state of the exchange state storage unit of the terminal committed as predecessor to the quasi-commit state, and succeedingly changes the state of the exchange state storage unit of the terminal committed as successor to the quasi-commit state.

According to the present invention, there is provided a terminal device which at least executes electronic value exchange between itself and the other terminal device, comprising:

a value storage unit which stores the electronic value;
an exchange contract data storage unit which stores exchange contract data representing contents of the electronic value exchange;
an exchange state storage unit which represents a state of the electronic value exchange;
a communication unit which takes part in communication with the other terminal and with a recovery device which recovers a state of the value storage unit;
a commit order storage unit which stores a commit order which indicates that which of the own terminal and the other terminal is the first to execute state change in the exchange state storage unit, into any one of a commit state representing a normal state before modification of the electronic value, a commit-ready state representing a state after completion of transmission/reception of the exchange contract data and before the exchange contract is committed, and a quasi-commit state representing a state after the exchange contract is committed;

an identification information storage unit which stores identification information assigned to every process of transmission/reception of the exchange contract data; and an exchange execution unit which decides the commit order through communication with the other terminal and stores it into the commit order storage unit, decides the identification information and stores it into the identification information storage unit, and executes transmission/reception of the exchange contract data between itself and the other terminal and stores it into the exchange contract data storage unit, precedently changes the state of the exchange state storage unit of the terminal having the commit order committed as predecessor to the efinition-ready state, succeedingly changes the state of the exchange state storage unit of the terminal having an commit order committed as successor to the commit-ready state, succeedingly changes the state of the exchange state storage unit of the terminal committed as predecessor to the quasi-commit state, and succeedingly changes the state of the exchange state storage unit of the terminal committed as successor to the quasi-commit state.

According to the present invention, there is provided a first recovery device which recovers, in an electronic value exchange system which at least executes electronic value exchange between first and second terminals, at least one of the first terminal and the second terminal in case of communication failure. The first recovery device includes:

a communication unit which takes part in communication with either one of said first and second terminals;

a recovery log storage unit which stores recovered identification information out of identification information assigned to every process of transmission/reception of exchange contract data of said electronic value, in correlation with identification information of the terminal having been recovered; and a recovery execution unit which acquires a state of said electronic value exchange in one terminal out of said first and second terminals, and if the state is a commit-ready state which represents a state after completion of transmission/ reception of said exchange contract data and before the exchange contract is committed, acquires a commit order recorded in a commit order storage unit of said one terminal, acquires identification information recorded in an identification information storage unit of said one terminal, checks whether a record of recovery of the other terminal out of said first and second terminals with respect to said identification information resides in said recovery log storage unit or not, and executes either cancellation or commit of said exchange contract of said one terminal, based on said commit order, and presence or absence of said recovery.

According to the present invention, there is provided a second recovery device which recovers, in an electronic value exchange system which at least executes electronic value exchange between first and second terminals, at least one of the first terminal and the second terminal in case of communication failure. The second recovery device is provided with:

a communication unit which takes part in communication with either one of said first and second terminals and with said recovery log management device; and a recovery execution unit which acquires a state of said electronic value exchange in one terminal out of said first and second terminals, and if the state is a commit-ready state which represents a state after completion of transmission/reception of said exchange contract data and before the exchange contract is committed, acquires a commit order recorded in a commit order storage unit of said one terminal, acquires identification information recorded in an identification information storage unit of said one terminal, checks whether a record of recovery of the other terminal out of said first and second terminals with respect to said identification information resides in said recovery log storage unit or not, and executes either cancellation or commit of said exchange contract of said one terminal, based on said commit order, and presence or absence of said recovery.

According to the present invention, there is provided a first method of exchanging electronic value which includes at least executes electronic value exchange between first and second terminals. Each of the first and second terminals:

stores, into a commit order storage unit, a commit order which indicates that which of the first terminal and the second terminal is the first to execute state change into any one of a commit state representing a normal state before modification of the electronic value, a commit-ready state representing a state after completion of transmission/reception of the exchange contract data and before the exchange contract is committed, and a quasi-commit state representing a state after the exchange contract is committed; and stores identification information assigned to every process of transmission/reception of the exchange contract data into an identification information storage unit, executes transmission/reception of the exchange contract data with respect to each of the first and second terminals, and stores it into an exchange contract data storage unit, precedently changes the state of the exchange state storage unit of the terminal having the commit order committed as predecessor to the commit-ready state, succeedingly changes the state of the exchange state storage unit of the terminal having an commit order committed as successor to the commit-ready state, succeedingly changes the state of the exchange state storage unit of the terminal committed as predecessor to the quasi-commit state, and succeedingly changes the state of the exchange state storage unit of the terminal committed as successor to the quasi-commit state.

According to the present invention, there is provided a second method of exchanging electronic value which includes at least executing electronic value exchange between first and second terminals. Each of the first and second terminals executes:

a process of storing, into a commit order storage unit, a commit order which indicates that which of the first terminal and the second terminal is the first to execute state change into any one of a commit state representing a normal state before modification of the electronic value, a commit-ready state representing a preliminary stage after completion of transmission/reception of the exchange contract data of the electronic value and before commit of the exchange contract, and a quasi-commit state representing a state after the exchange contract is committed;

a process of storing identification information assigned to every process of transmission/reception of the exchange contract data into an identification information storage unit; and a process of executing transmission/reception of the exchange contract data with respect to each of the first and second terminals, and storing it into an exchange contract data storage unit, precedently changing the state of the exchange state storage unit of the terminal having the commit order committed as predecessor to the commit-ready state, succeedingly changing the state of the exchange state storage unit of the terminal having an commit order committed as successor to the commit-ready state, succeedingly changing the state of the exchange state storage unit of the terminal committed as predecessor to the quasi-commit state, and succeedingly changing the state of the exchange state storage unit of the terminal committed as successor to the quasi-commit state.

According to the present invention, there is provided a first program executed by a central processing unit of each of a first terminal and a second terminal when at least executing electronic value exchange between the first and second terminals. The first program includes:

a process of storing a commit order of an exchange contract of the electronic value into a commit order storage unit;

a process of storing identification information assigned to every process of transmission/reception of exchange contract data of the electronic value into an identification information storage unit; and a process of executing transmission/reception of the exchange contract data with respect to each of the first and second terminals, and storing it into an exchange contract data storage unit, precedently changing the state of the exchange state storage unit of the terminal having the commit order committed as predecessor to the commit-ready state, succeedingly changing the state of the exchange state storage unit of the terminal having an commit order committed as successor to the commit-ready state, succeedingly changing the state of the exchange state storage unit of the terminal committed as predecessor to the quasi-committed state and succeedingly changing the state of the exchange state storage unit of the terminal committed as successor to the quasi-committed state.

According to the present invention, there is provided a second program executed by a central processing unit of a recovery device which recovers, in an electronic value exchange system which at least executes electronic value exchange between first and second terminals, either the first terminal or the second terminal, in case of communication failure. The second program includes:

a process of setting a communication path between the first and second terminals;

a process of storing recovered identification information out of identification information assigned to every process of transmission/reception of exchange contract data which represents contents of the electronic value exchange into a recovery log storage unit;

a process of acquiring a state of the electronic value exchange in one terminal out of the first and second terminals;

a process of acquiring a commit order recorded in a commit order storage unit of the one terminal, if the state is a commit-ready state which represents a preliminary stage in which the exchange contract is committed after completion of transmission/reception of the exchange contract data;

a process of acquiring the identification information recorded in the identification information storage unit of the one terminal;

a process of checking whether a record of recovery of the other terminal out of the first and second terminals with respect to the identification information resides or not in the recovery log storage unit; and a process of executing either cancellation or commit of the exchange contract of the one terminal based on the commit order, and presence or absence of the recovery.

By virtue of the above-described configuration and operations, the present invention raises an effect of recovering the state of values in two terminal devices into a consistent one, even if the terminal devices are not successfully re-connected in case of communication failure in the process of value transfer or exchange between the terminal devices.

BRIEF DESCRIPTION OF THE DRAWINGS

The above and other objects, features and advantages of the present invention will be more apparent from the following description of certain preferred embodiments taken in conjunction with the accompanying drawings.

FIG. 9 is a drawing illustrating states of a value storage unit in case of communication failure according to the first embodiment of the present invention;

FIG. 10 is a drawing illustrating recovery strategies for a value storage unit in the process of value recovery in a recovery device according to the first embodiment of the present invention;

FIG. 22 is a flowchart illustrating exchange contract data according to the seventh embodiment of the present invention;

FIG. 27 is a drawing illustrating states of exchange state storage unit in case of communication failure according to the seventh embodiment of the present invention;

BEST MODES FOR CARRYING OUT THE INVENTION

Figure 1:
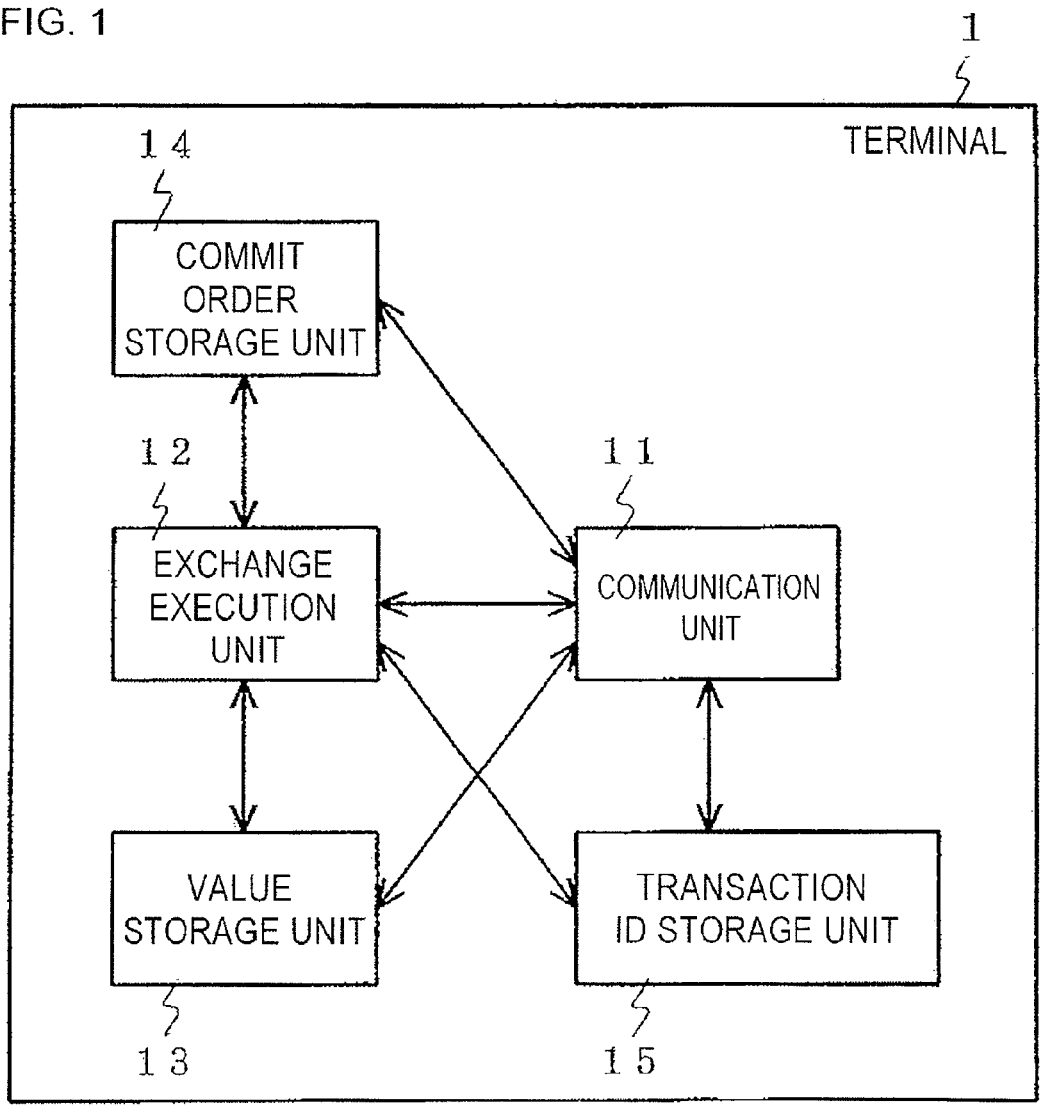
FIG. 1 is a block diagram illustrating an exemplary configuration of a terminal according to a first embodiment of the present invention.

Embodiments of the present invention will be explained below, referring to the attached drawings. Note that all similar constituents will be given similar reference numerals or symbols in all drawings, so that explanations therefor will not always be repeated.

FIG. 1 is a block diagram illustrating an exemplary configuration of a terminal according to a first embodiment of the present invention. As illustrated in FIG. 1, a terminal 1 is configured by a communication unit 11, an exchange execution unit 12, a value storage unit 13, a commit order storage unit 14, and a transaction ID (IDentifier) storage unit (identification information storage unit) 15.

The communication unit 11 takes part in communication with other terminals (not illustrated), and the exchange execution unit 12 executes exchange of electronic value (referred to as "value", hereinafter) such as electronic money and electronic ticket. The value storage unit 13 stores the value, and the commit order storage unit 14 stores commit order of operation with respect to the value storage unit 13. The transaction ID storage unit (identification information storage unit) 15 stores a transaction ID given to every process of exchange.

The terminal 1 herein includes mobile terminals such as mobile phone and PDA (Personal Digital Assistant), or recording medium which enables data transaction through reader/writer or the like, such as IC (Integrated Circuit) card.

The value may be available not only in a form of electronic money or electronic tickets, but also in a form of discount coupons or discount tickets; shopping points in association with purchase; digital contents such as bodies or rights of use of musics, movies and electronic books, electronic keys, and game-related data (game software per se, data of additional scenarios and so forth).

The communication unit 11 is available typically in a form of Bluetooth (registered trademark) representing a near field communication unit, infrared data communication, NFC (Near Field communication), Wireless LAN (Local Area Network), non-contact IC chip and so forth. The communication unit 11 may also be a wide area network or the Internet.

The value storage unit 13, the commit order storage unit 14, and the transaction ID storage unit (identification information storage unit) 15 are available not only, for example, in a form of UIM (User Identity Module) which is an IC chip widely adopted to mobile phone, but also in a form of general memory or hard disk on the terminal 1. The selection depends on whether a sufficient security level may be ensured in view of running the service.

Figure 2:
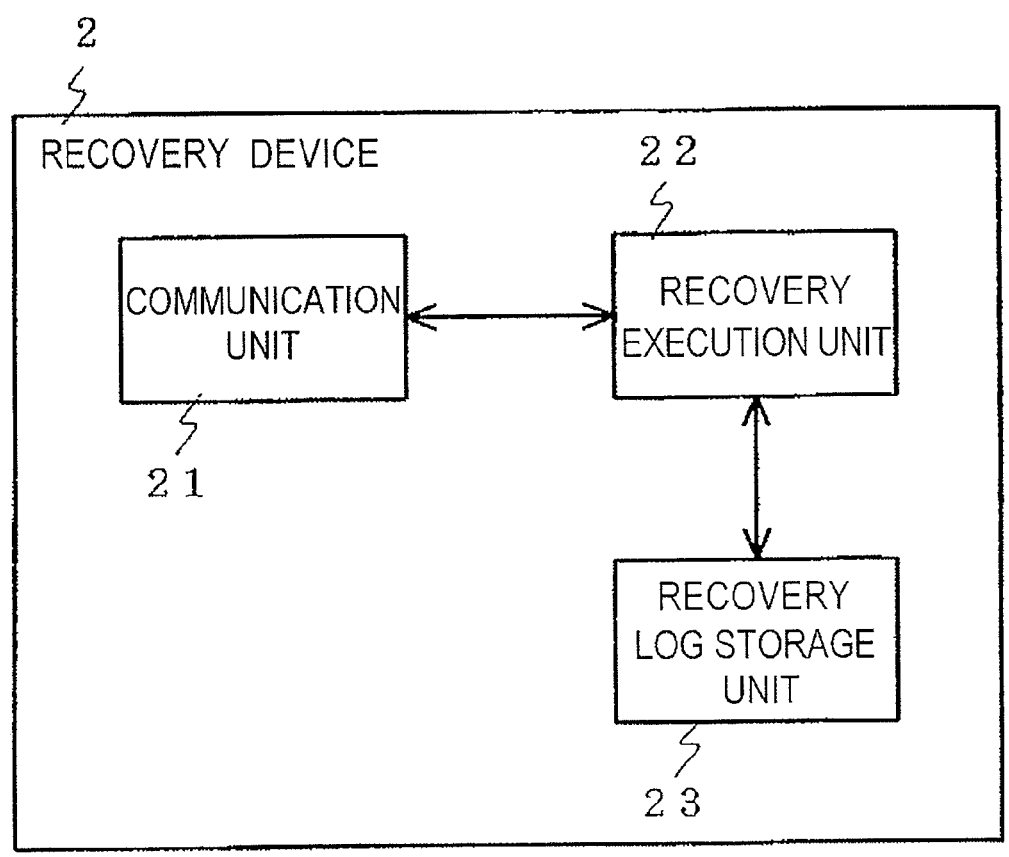
FIG. 2 is a block diagram illustrating an exemplary configuration of a recovery device according to a first embodiment of the present invention.

FIG. 2 is a block diagram illustrating an exemplary configuration of a recovery device according to a first embodiment of the present invention. In FIG. 2, a recovery device 2 is configured by a communication unit 21, a recovery execution unit 22, and a recovery log storage unit 23.

The communication unit 21 takes part in communication with the terminal 1, the recovery execution unit 22 executes recovery by which a state of the value storage unit 13 in the terminal is recovered back to a consistent one between the terminals which take part in transfer and exchange, and the recovery log storage unit 23 stores a history of past recovery for every transaction ID.

Figure 3:
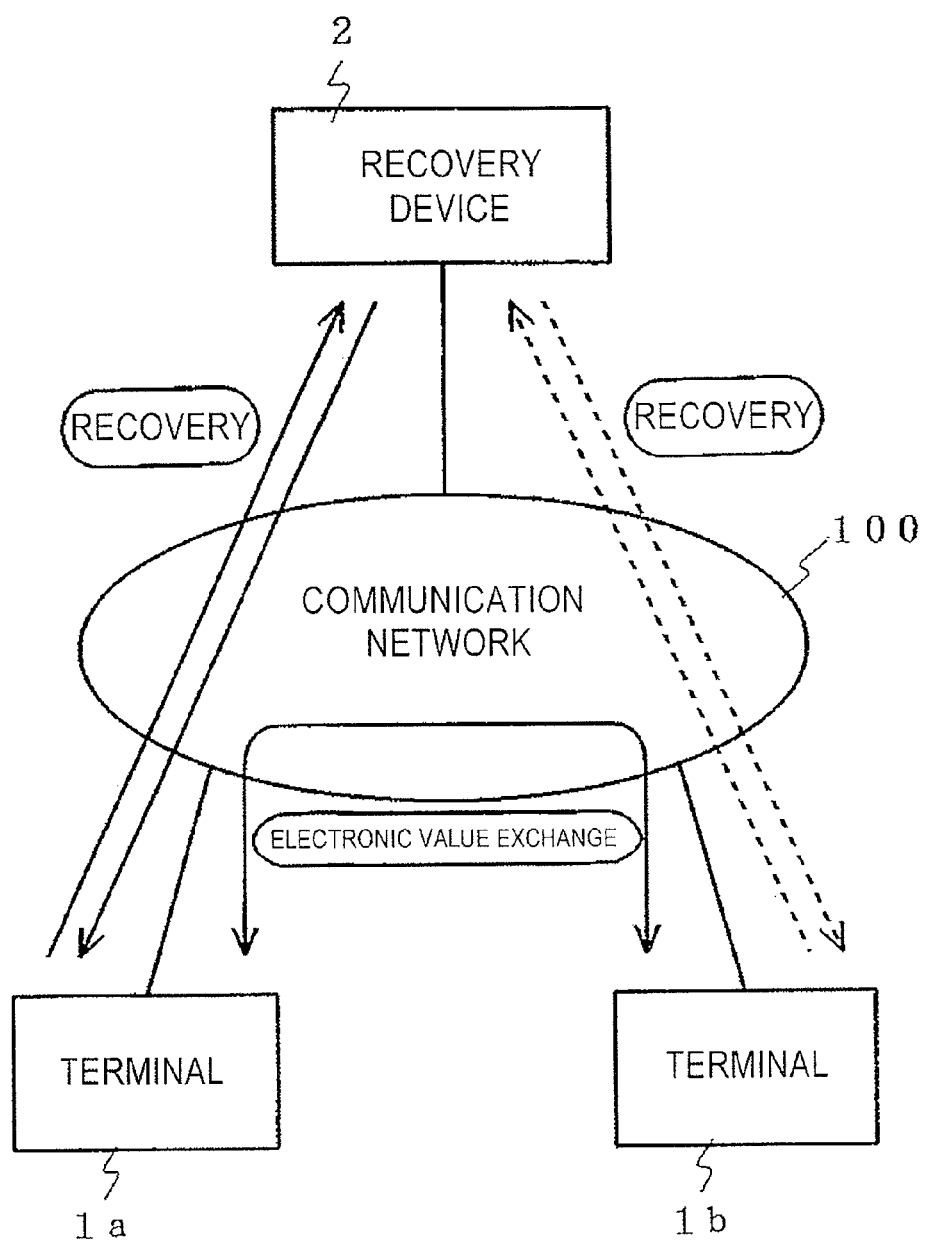
FIG. 3 is a block diagram illustrating an exemplary configuration of an electronic value exchange system according to the first embodiment of the present invention.

FIG. 3 is a block diagram illustrating an exemplary configuration of an electronic value exchange system according to the first embodiment of the present invention. In FIG. 3, the electronic value exchange system according to the first embodiment of the present invention is configured by terminals 1a, 1b which are configured similarly to the above-described terminal 1 and are connectable with each other through a communication network 100, a recovery device 2 connectable to each of the terminals 1a, 1b respectively through a communication network 100, and the communication network 100 which enables communication by the communication units 11, 21.

Figure 4:
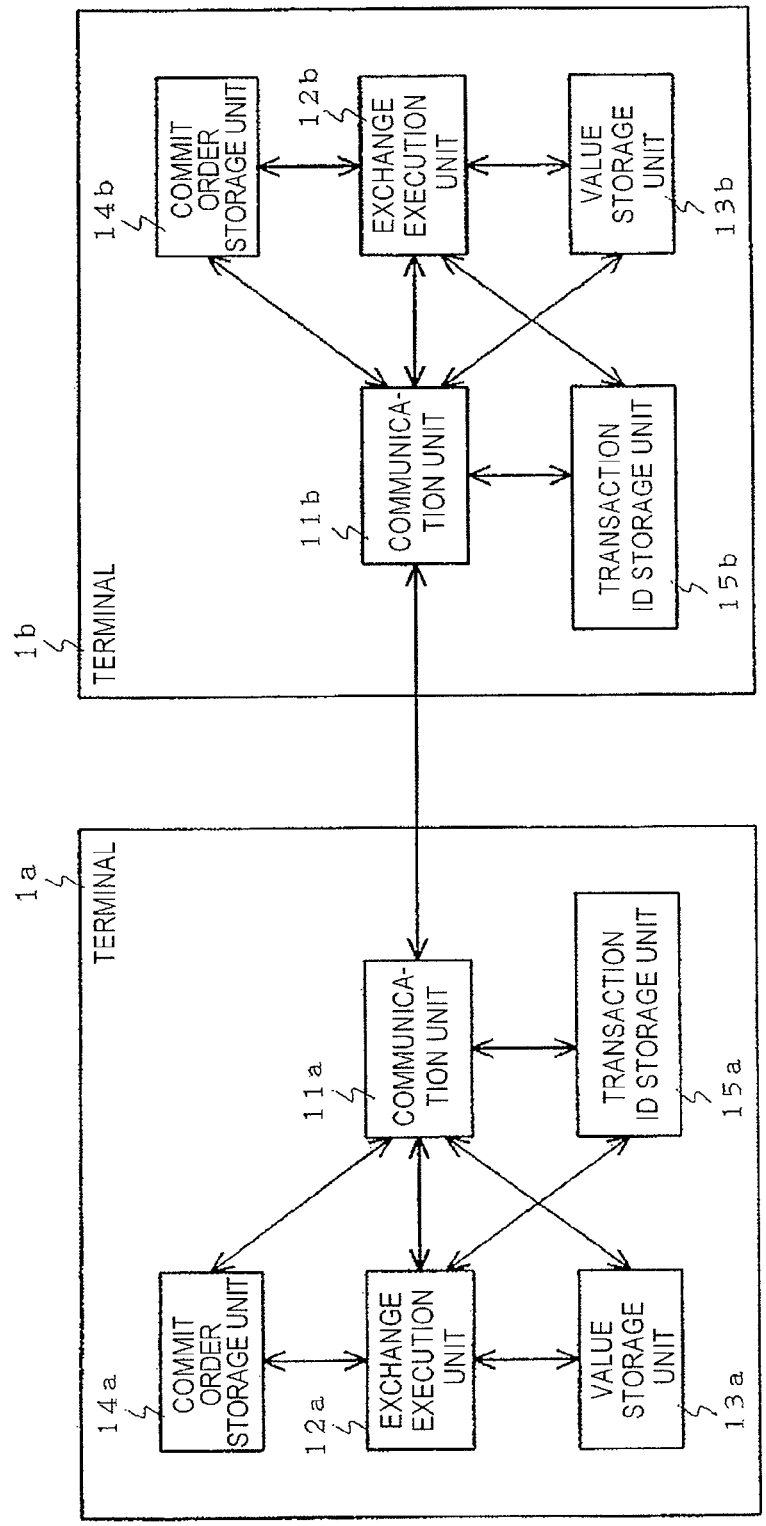
FIG. 4 is a drawing illustrating value transfer operation of the electronic value exchange system according to the first embodiment of the present invention.

FIG. 4 is a drawing illustrating a value transfer operation of the electronic value exchange system according to the first embodiment of the present invention. Value transfer and value exchange by the electronic value exchange system according to the first embodiment of the present invention will be explained referring to FIG. 4.

An exchange execution unit 12a of the terminal 1a starts value exchange while being triggered typically by an operation by the user, controls a communication unit 11a, and then establishes a communication path between itself and a communication unit 11b of the other terminal 1b. Note that operation of connecting the terminals 1a, 1b with each other (connecting the terminals 1a, 1b with a cable, bringing the terminals 1a, 1b close to each other in an area where wireless communication is available, and so forth) may alternatively be adoptable in place of the operation by the user.

Next, the exchange execution unit 12a establishes communication with the exchange execution unit 12b of the terminal 1b through the communication units 11a, 11b, and decides the commit order ("predecessor" or "successor") that indicates which of the value storage units 13a, 13b of the terminals 1a, 1b is the first to be changed into a commit-ready state. The result of decision (commit order) is stored in commit order storage units 14a, 14b of the individual terminals 1a, 1b.

Note that, in this embodiment, it is no longer necessary to decide the commit order by negotiation between the terminals in the process of communication, for example if one terminal operates as a server and the other terminal as a client, and the procedure is adopted that the server is always committed first.

The exchange execution unit 12a communicates with the exchange execution unit 12b of the terminal 1b, through the communication units 11a, 11b, produces ID (referred to as "transaction ID", hereinafter) unique to the current exchange process, and stores it into transaction ID storage units (identification information storage unit) 15a, 15b. The transaction IDs stored in the transaction ID storage units (identification information storage unit) 15a, 15b are necessarily identical.

Next, the exchange execution unit 12a communicates with the exchange execution unit 12b of the terminal 1b through the communication units 11a, 11b, and performs exchange by operating the value storage units 13a, 13b. For an exemplary case of transfer of electronic value between the terminals 1a, 1b, the value is deleted from the source value storage unit, and the value is written in the destination value storage unit.

Upon completion of the value exchange, that is, the operation with respect to the value storage units 13a, 13b, the exchange execution unit 12a communicates with the exchange execution unit 12b of the terminal 1b, through the communication units 11a, 11b, and changes the state of the value storage units 13a, 13b to the commit-ready state, then to the commit state, according to the commit order which has been decided at the start of communication. Assuming now, in this case, that the terminal 1a is the first to change to the commit-ready state, the terminal 1b changes to the commit-ready state after the terminal 1a changes to the commit-ready state. Thereafter, upon transition of the terminal 1a to the commit state in advance, the terminal 1b succeedingly changes to the commit state.

Figure 5:
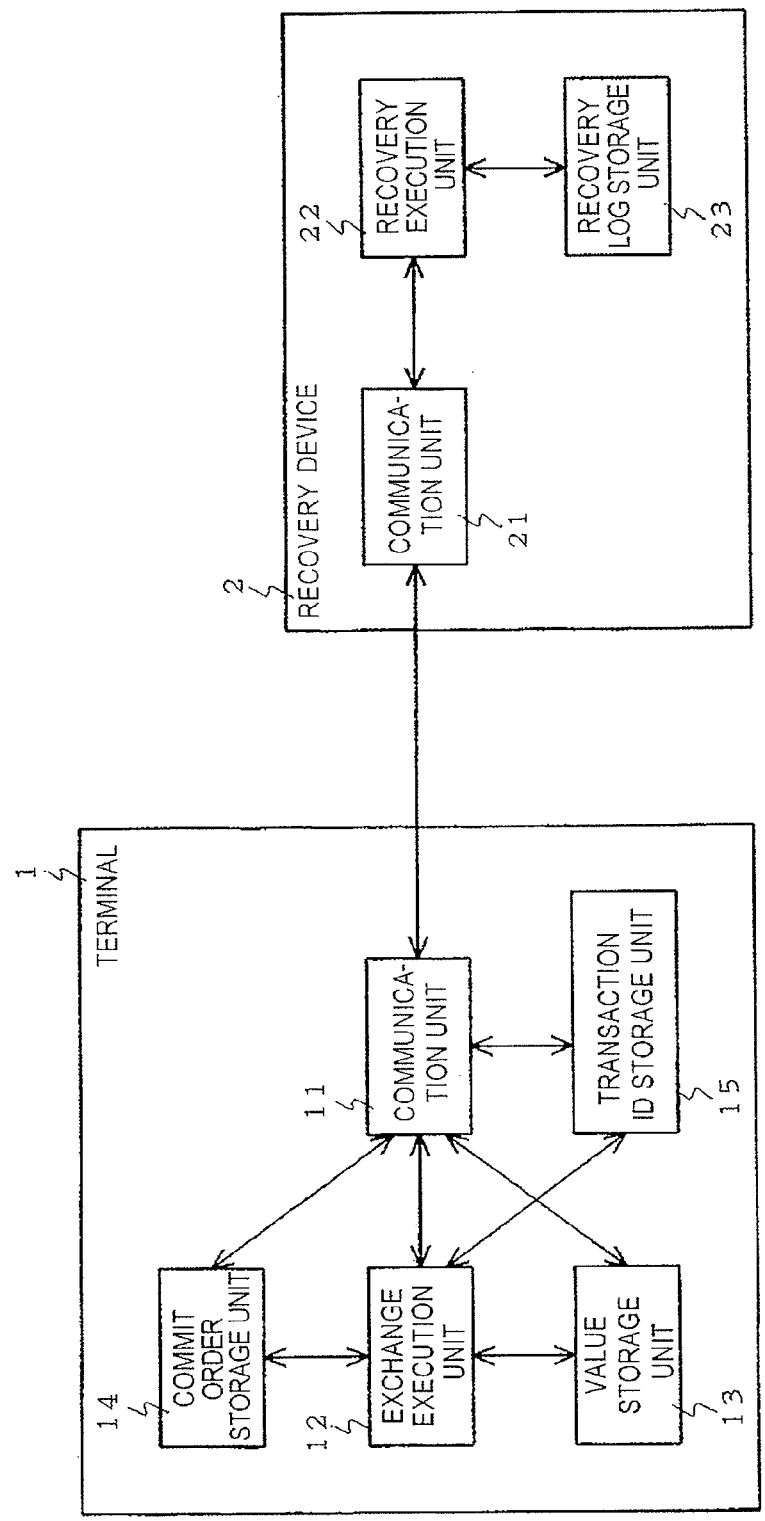
FIG. 5 is a drawing illustrating value recovery operation of the electronic value exchange system according to the first embodiment of the present invention.

FIG. 5 is a drawing illustrating value recovery operation of the electronic value exchange system according to the first embodiment of the present invention. Value recovery by the electronic value exchange system according to the first embodiment of the present invention, in case of communication failure, will be explained referring to FIG. 5.

For the case where communication failure occurs in the process of value exchange, the exchange execution unit 12 controls the communication unit 11 while being triggered typically by an operation by the user, and establishes a communication path between itself and the communication unit 21 of the recovery device 2. Note that operation of connecting the terminal 1 with the recovery device 2 (connecting them with a cable, bringing the terminal 1 and the recovery device 2 close to each other in an area where wireless communication is available, and so forth) may alternatively be adoptable in place of the operation by the user. Still alternatively, in case of communication failure in the process of value exchange, the terminal 1 may automatically be connected to the recovery device 2 through wireless communication or the like, irrespective of the operation by the user.

Next, the recovery execution unit 22 makes reference to the commit order storage unit 14 and the transaction ID storage unit (identification information storage unit) 15 through the communication unit 21 and the communication unit 11 of the terminal 1, and acquires the commit order and the transaction ID in the value exchange when the communication failure occurred. The recovery execution unit 22 further makes reference to the recovery log storage unit 23 based on the transaction ID, and confirms whether the other terminal has been previously recovered, in the restoration process identified with the transaction ID.

Based on the commit order and presence or absence of the past recovery, the recovery execution unit 22 decides whether the value storage unit 13 should be changed into the commit state without any change of data, or should be changed into the commit state after recovering the data before the value exchange, and executes the decision. The recovery execution unit 22 finally records the event of recovery into the recovery log storage unit 23. Note that the recovery device 2 to which an arbitrary terminal 1 is connected for recovery should always be the same. In other words, two or more recovery devices 2 are not permissible, and must be only one.

The exchange execution units 12a, 12b illustrated in FIG. 4 are configured to be incorporated inside the terminals 1a, 1b, whereas they may alternatively be provided outside the terminals 1a, 1b, and may be configured to execute read/write to or from the value storage units 13a, 13b, the commit order storage units 14a, 14b, and the transaction ID storage units (identification information storage units) 15a, 15b, through the communication units 11a, 11b.

Figure 6:
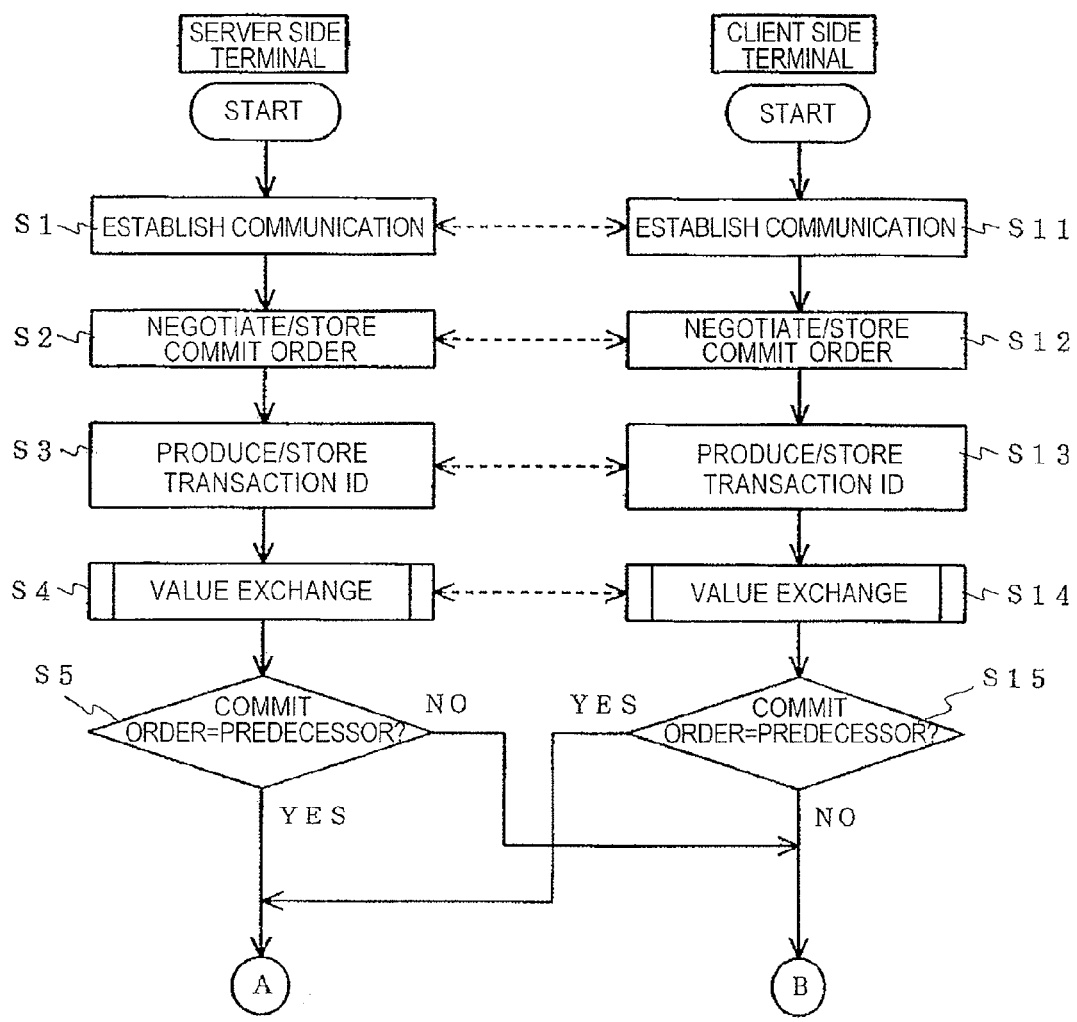
FIG. 6 is a flow chart illustrating value transfer operation according to the first embodiment the present invention.
Figure 7:
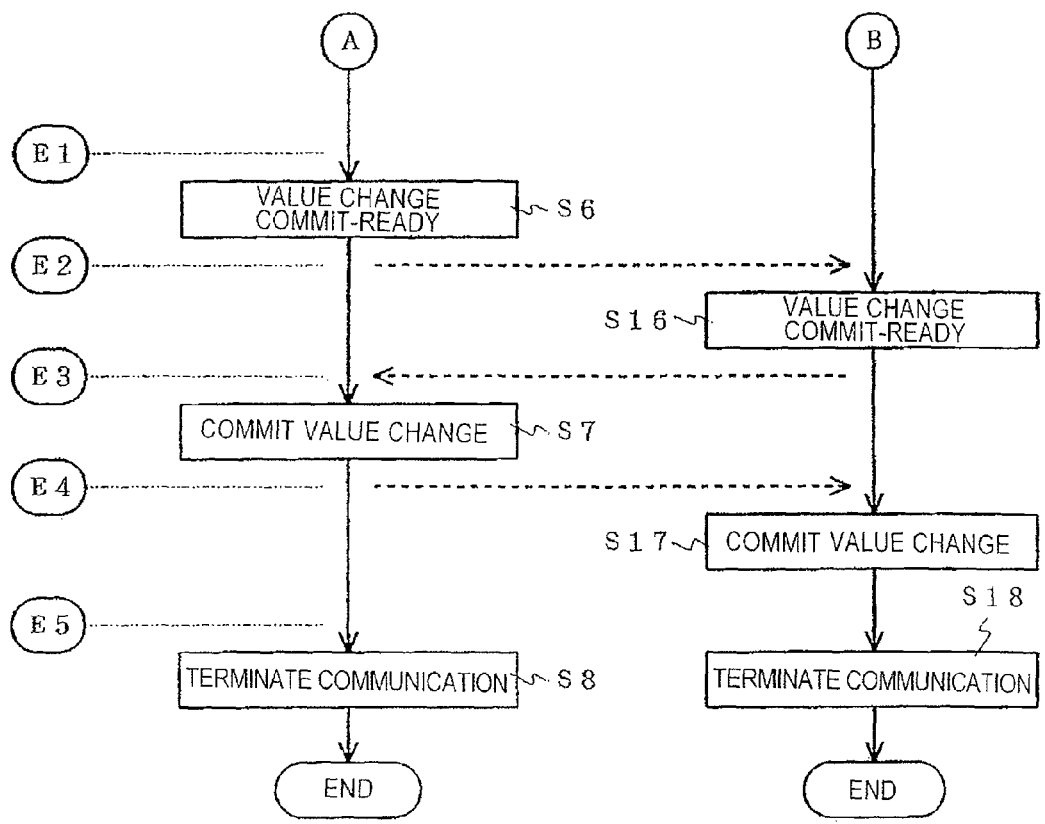
FIG. 7 is a flow chart illustrating value transfer operation according to the first embodiment of the present invention.
Figure 8:
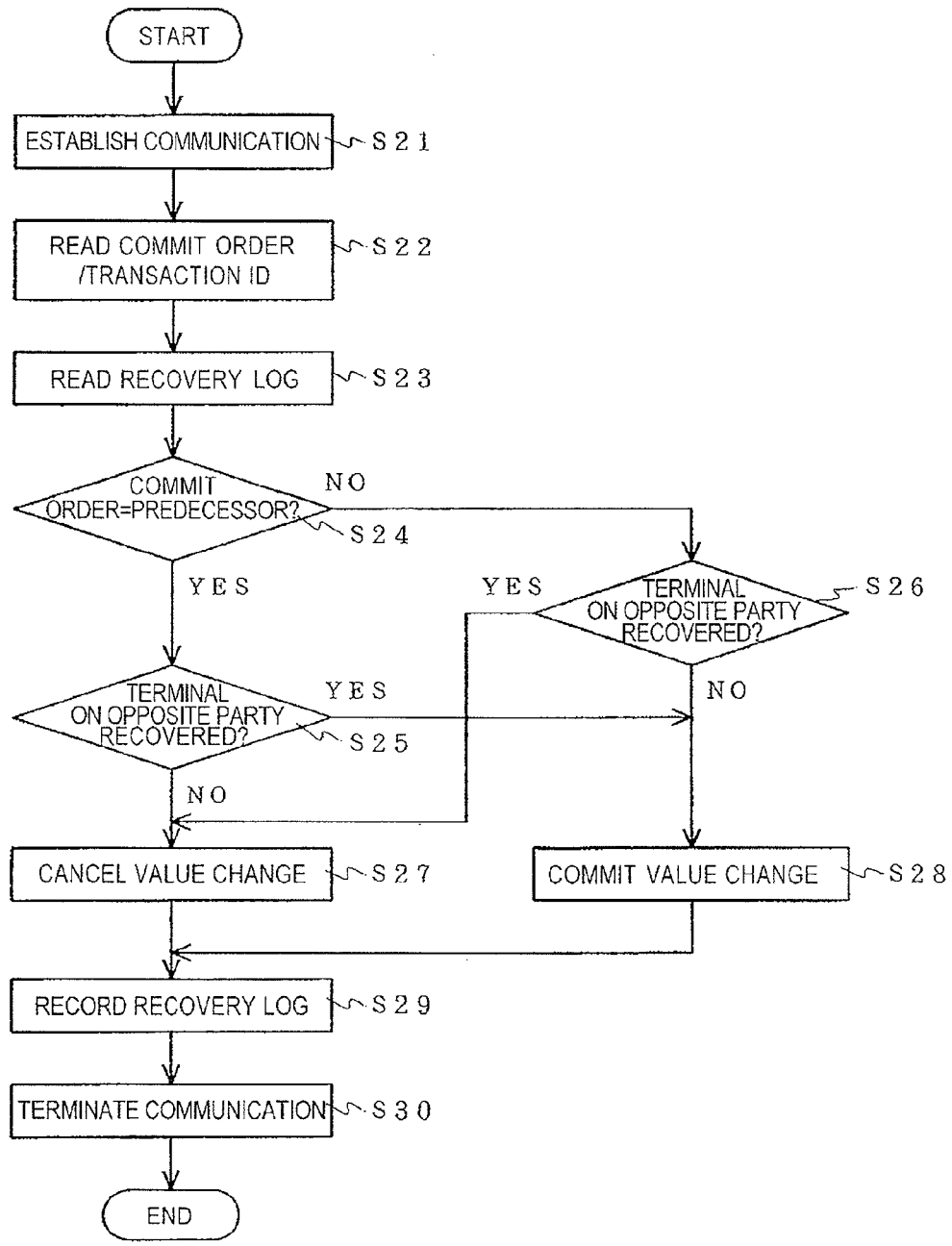
FIG. 8 is a flow chart illustrating a value recovery operation according to the first embodiment of the present invention.

FIG. 6 and FIG. 7 are flow charts illustrating value transfer operation according to the first embodiment of the present invention, and FIG. 8 is a flow chart illustrating value recovery operation according to the first embodiment of the present invention. The operation of the electronic value exchange system according to the first embodiment of the present invention will be explained, referring to FIG. 1 to FIG. 8. Note that the processes illustrated in FIG. 6 and FIG. 7 may be embodied by processing units [CPU (central processing unit)] incorporated in the terminals 1, 1a, 1b, when they execute a program, and the process illustrated in FIG. 8 may be embodied by a processing unit (CPU and so forth) incorporated in the recovery device 2, when it executes a program.

First, value transfer and exchange between two terminals 1a, 1b will be explained, referring to FIG. 6 and FIG. 7. It is committed herein that, in FIG. 6 and FIG. 7, the terminal 1a represents a server side terminal, and the terminal 1b represents a client side terminal.

When the value exchange starts in each of the terminals 1a, 1b while being triggered typically by an operation by the user, communication is established between the terminals 1a, 1b (steps S1, S11 in FIG. 6).

Next, the terminals 1a, 1b decides that which of the value storage units 13a, 13b of terminals 1a, 1b is the first to be changed into the commit-ready state, and stores the decision into each of the commit order storage units 14a, 14b (steps S2, S12 in FIG. 6). By this procedure, one of the terminals 1a, 1b is committed as a "predecessor" in the commit order, and the other is committed as a "successor" in the commit order. In this example, the terminal 1a is committed as the "predecessor" in the commit order, and the terminal 1b is committed as the "successor" in the commit order.

The commit order decided herein may be good enough if the one is committed as the "predecessor", and the other as the "successor", wherein the decision may be given typically based on random number, or largeness or smallness of the IDs given to each of the terminals 1a, 1b. In another possible method, the "predecessor" and the "successor" terminals may be committed according to the value operations. For example, when an electronic ticket is simply moved between the terminals 1a, 1b, the source terminal 1a may be committed as the "predecessor", and the destination terminal 1b as the "successor".

Next, the terminals 1a, 1b produce an ID (transaction ID) unique to the current exchange, and store it into the transaction ID storage units (identification information storage units) 15a, 15b (steps S3, S13 in FIG. 6). The transaction IDs are necessarily identical for both terminals 1a, 1b.

Thereafter, communication is established between the terminals 1a, 1b, so as to proceed therebetween any necessary value exchange such as transfer, exchange, and copy of the electronic value (steps S4, S14 in FIG. 6). Since the processes are similar to general value processing which takes place between the value storage units 13a, 13b of two terminals 1a, 1b, such as a process between an IC card and a reader/writer, so that the processes herein will not be detailed. The value storage units 13a, 13b of both terminals 1a, 1b herein are still in the uncommitted state where changes intended for the both are not committed yet.

Upon completion of the necessary value exchange, the process advances to a step of allowing the value storage units 13a, 13b of both terminals 1a, 1b to make state transition into the commit state. According to the commit order decided by the previous processes in steps S2, S12, the succeeding procedures will be executed (steps S5, S15 in FIG. 6).

First, the terminal 1a having the commit order committed as "predecessor" allows the value storage unit 13a to make state transition to the commit-ready state (step S6 in FIG. 7). Succeedingly, the terminal 1b having the commit order committed as "successor" allows the value storage unit 13b to make state transition to the commit-ready state (step S16 in FIG. 7). The terminal 1a having previously been brought into the commit-ready state then allows the value storage unit 13a to make state transition to the commit state (step S7 in FIG. 7). Lastly, the other terminal 1b allows the value storage unit 13b to make state transition to the commit state (step S17 in FIG. 7).

The state transition of the value storage unit 13a, 13b to the commit state is completed by the operations described in the above, and the communication is then terminated by both terminals 1a, 1b, to thereby complete the entire range of the value exchange. Note that decision of the commit order (steps S2, S12 in FIG. 6), production of the transaction IDs (steps S3, S13 in FIG. 6), and the value exchange (step S4, S14 in FIG. 6) are not always necessarily executed in the above-described order, and may be exchanged.

Next, procedures of recovering values at the terminals, in case of communication failure occurred in the process of value exchange in the electronic value exchange system according to the first embodiment of the present invention, will be explained referring to FIG. 8. The communication failure herein include not only direct communication failure typically caused by disconnection of the communication path, but also indirect communication interruption which occurs because the value exchange was made no longer sustainable at least in one terminal, due to abnormality in hardware such as processing device, or abnormality in power source.

If communication failure occurs, communication is established between the terminal 1 and the recovery device 2, while being triggered typically by an operation by the user (step S21 in FIG. 8). Next, the recovery execution unit 22 of the recovery device 2 reads out the commit order of the value storage unit 13 stored in the commit order storage unit 14 of the terminal 1, and the transaction ID stored in the transaction ID storage unit (identification information storage unit) 15 (step S22 in FIG. 8).

The recovery execution unit 22 then makes reference to the recovery log storage unit 23, based on the transaction ID read out from the transaction ID storage unit (identification information storage unit) 15 (step S23 in FIG. 8). This is used in order to confirm, in processes of steps S25 and S26, whether any recovery has previously been given to the other terminal, before the terminal 1 is recovered.

As illustrated in steps S24 to S26, the recovery execution unit 22 decides whether the exchange of value with respect to the value storage unit 13 of the terminal 1 should be cancelled (step S27 in FIG. 8), or committed (step S28 in FIG. 8), based on the commit order, and presence or absence of recovery with respect to the other terminal. The operation will be described later.

Upon deciding cancellation or commit with respect to the value storage unit 13, the recovery execution unit 22 stores the event that the terminal was recovered with respect to the transaction ID, into the recovery log storage unit 23 (step S29 in FIG. 8). In general, it may be good enough to store the transaction ID and the ID given to every terminal, into the recovery log storage unit 23.

Lastly, the communication between the terminal 1 and the recovery device 2 is terminated (FIG. 8 step S30), to thereby complete the recovery.

The value storage unit 13 of the terminal 1 may have three states, which include the commit state representing a normal state before the value dealing, an uncommitted state representing a state during value dealing, and a commit-ready state representing a preliminary stage after completion of the value dealing and before commit of the change. However, the above-described recovery is targeted at the terminal 1 having the storage unit 13 remained in the commit-ready state, due to occurrence of the communication failure, so that the recovery of abnormality is not targeted at the terminal remained in the commit state or in the uncommitted state.

In other words, no recovery will be necessary if the value storage unit 13 is in the commit state in case of communication failure, whereas if in the uncommitted state, all processes given to the value storage unit 13 will be cancelled by terminal 1 alone.

Alternatively, in case of communication failure, another possible method may be such as connecting the terminal 1 and the recovery device 2, irrespective of the state of the value storage unit 13. In this case, for example, after step S21 in FIG. 8, the state of the value storage unit 13 is checked. If the value storage unit is in the commit state, the state may be allowed to make transition to step S30 since no recovery is necessary, whereas in the uncommitted state, all processes given to the value storage unit 13 may be cancelled, and the state may be allowed to make transition to step S30.

FIG. 9 is a drawing illustrating the states of the value storage unit 13 in case of communication failure according to the first embodiment of the present invention, and FIG. 10 is a drawing illustrating recovery strategies for the value storage unit 13 in the recovery device 2 in the value recovery process according to the first embodiment of the present invention. How the state of value storage unit 13 can be recovered by the above-described method of recovery without inconsistency, when any communication failure occurs in the electronic value exchange system according to the first embodiment of the present invention, will be explained referring to FIG. 6, FIG. 7, FIG. 9 and FIG. 10.

Note that, in the explanation below, cancellation of change made on the value storage unit 13 means that the value storage unit 13 in the uncommitted state or commit-ready state is recovered with the data before the value is changed, and then brought into the commit state.

FIG. 9 illustrates relations among "E1" to "E5" which indicate points of occurrence of communication failure in FIG. 7, the states of the value storage unit 13*a* of the terminal 1*a* having the commit order committed as "predecessor", and the states of the value storage unit 13*b* of the terminal 1*b* having the commit order committed as "successor".

For an exemplary case where the communication failure occurred in the period from the start of communication to "E1" in FIG. 6 and FIG. 7, or in the period from the start of communication to step S6, the value storage units 13*a*, 13*b* are brought into the uncommitted state in both of the terminal 1*a* having the commit order committed as "predecessor" and the terminal 1*b* having the commit order committed as "successor", as illustrated in FIG. 9.

On the other hand, for the case of "E2" in FIG. 6 and FIG. 7, or for the case where the communication failure occurred immediately after step S6, the value storage unit 13*a* of the terminal 1*a* having the commit order committed as "predecessor" is brought into the commit-ready state, whereas the value storage unit 13*b* of the terminal 1*b* having the commit order committed as "successor" is brought into the uncommitted state, as illustrated in FIG. 9.

For the case of "E3" in FIG. 6 and FIG. 7, or for the case where the communication failure occurred immediately after step S16, the value storage units 13*a*, 13*b* are brought into the commit-ready state in both of the terminal 1*a* having the commit order committed as "predecessor" and the terminal 1*b* having the commit order committed as "successor", as illustrated in FIG. 9.

For the case of "E4" in FIG. 6 and FIG. 7, or for the case where the communication failure occurred immediately after step S7, the value storage unit 13*a* of the terminal 1*a* having the commit order committed as "predecessor" is brought into the commit state, whereas the value storage unit 13*b* of the terminal 1*b* having the commit order committed as "successor" is brought into the commit-ready state, as illustrated in FIG. 9.

For the case where the communication failure occurred in the period from "E5" to the end of communication in FIG. 6 and FIG. 7, or in the period immediately after step S17 up to the end of communication, the value storage units 13*a*, 13*b* are brought into the commit state in both of the terminal 1*a* having the commit order committed as "predecessor" and the terminal 1*b* having the commit order committed as "successor", as illustrated in FIG. 9.

If the value storage units 13*a*, 13*b* herein are in the uncommitted state or the commit state at the point of time the communication failure occurred, each of the terminals 1*a*, 1*b* independently cancels the changes for the uncommitted state, and leaves the changes as they are for the commit state, rather than executing recovery after being connected with the recovery device 2, as described in the above. In case of communication failure in the period "from start to E1" or "from E5 to end" illustrated in FIG. 9, the value storage units 13*a*, 13*b* of both terminals 1*a*, 1*b* can be successfully recovered without inconsistency, even if this sort of process is executed simply and independently by each of the terminals 1a, 1b.

On the other hand, in case of communication failure at "E2", "E3", "E4" where at least one of the value storage units 13a, 13b of the terminals 1a, 1b is remained in the commit-ready state, the change to be made on the value storage unit in the commit-ready state is determined by the recovery device 2 based on the criteria illustrated in FIG. 10.

In this case, the recovery device 2 has no information on both of the terminals 1a, 1b illustrated in FIG. 9, but decides the change to be made on the value storage unit, based on information (commit order and transaction ID) read out from the connected terminal, and a state of past recovery stored in the recovery log storage unit 23.

The criteria illustrated in FIG. 10 include the commit order of the terminal, a recovery record for the opposite-party terminal, and cancellation/commit of value changes, and the recovery device 2 decides the change to be made on the value storage unit of the terminal in the commit-ready state, referring to these criteria.

For an exemplary case where the terminal 1a having the commit order committed as "predecessor" establishes connection to the recovery device 2 earlier than the other terminal 1b and executes the recovery, the changes made on the value storage unit 13a are cancelled. On the other hand, if the terminal 1a having the commit order committed as "predecessor" establishes connection with the recovery device 2 to execute the recovery, and the other terminal 1b has already connected to the recovery device 2 and has executed the recovery, the changes made on the value storage unit 13a are committed as it is (the state is changed from the commit-ready state to the commit state).

The same will apply also to the case where the terminal 1b having the commit order committed as "successor" establishes connection to the recovery device 2, wherein the changes made on the value storage unit 13b is committed as it is, if the recovery is executed by connecting the terminal 1b to the recovery device 2, earlier than the other terminal 1a. On the other hand, if the terminal 1b having the commit order committed as "successor" establishes connection with the recovery device 2 to execute the recovery, and the other terminal 1a has already connected to the recovery device 2 and has executed the recovery, the changes made on the value storage unit 13b are cancelled.

If the recovery device 2 decides the change to be made on the value storage units 13a, 13b referring to the criteria illustrated in FIG. 10 as described in the above, for example in "E2" in FIG. 9, the changes made on the value storage unit 13a of the terminal 1a having the commit order committed as "predecessor" (the terminal whose value storage is in the commit-ready state) are cancelled, which is consistent with the state of the value storage unit 13b of the other terminal 1b (the value storage is in the uncommitted state and the changes are therefore to be cancelled by the terminal itself).

At "E4", the changes made on the value storage unit 13b of the terminal 1b having the commit order committed as "successor" are committed, which is consistent with the state of the value storage unit 13a of the other terminal 1a. At "E3", in case of communication failure, the terminal which establishes connection later to the recovery device 2 executes the same process (commit or cancel) as the terminal which established connection earlier to the recovery device 2, which also keeps the states of the value storage units 13a, 13b consistent with each other.

It is now assumed that further changes (another value transfer and so forth) cannot be made on the value storage unit 13 in the commit-ready state, until the change is committed or cancelled so as to bring the state thereof into the commit state. In other words, the terminal 1 having the value storage unit 13 brought into the commit-ready state due to communication failure is kept disabled (until the recovery is completed by the recovery device 2).

In this way, according to this embodiment, when communication failure occurs at "E3" inconsistency can be certainly avoided in the states of the value storage units 13a, 13b of the terminals 1a, 1b, since the terminals 1a, 1b are recovered one by one, rather than at the same time.

Next, effects of this embodiment will be explained. In this embodiment, the exchange execution units 12a, 12b are configured so that the changes made on the value storage units 13a, 13b are committed based on the commit order which is determined between two terminals 1a, 1b at the start of communication, and the individual terminals 1a, 1b are provided with the commit order storage units 14a, 14b for storing the commit order.

In the recovery device 2, the recovery execution unit 22 is configured to execute recovery (commit or cancellation) which is uniquely decided based on the commit order stored in the commit order storage units 14a, 14b of the terminals 1a, 1b, and the past states of recovery stored in the recovery log storage unit 23. Accordingly, in this embodiment, for an exemplary case where communication failure should occur in the process of transfer or exchange of the value between two terminals 1a, 1b, and where the terminals 1a, 1b failed in re-establishing connection therebetween, the state of value stored in the storage units 13a, 13b may successfully be recovered without inconsistency, by connecting one of the terminals 1a, 1b to the recovery device 2.

Figure 11:
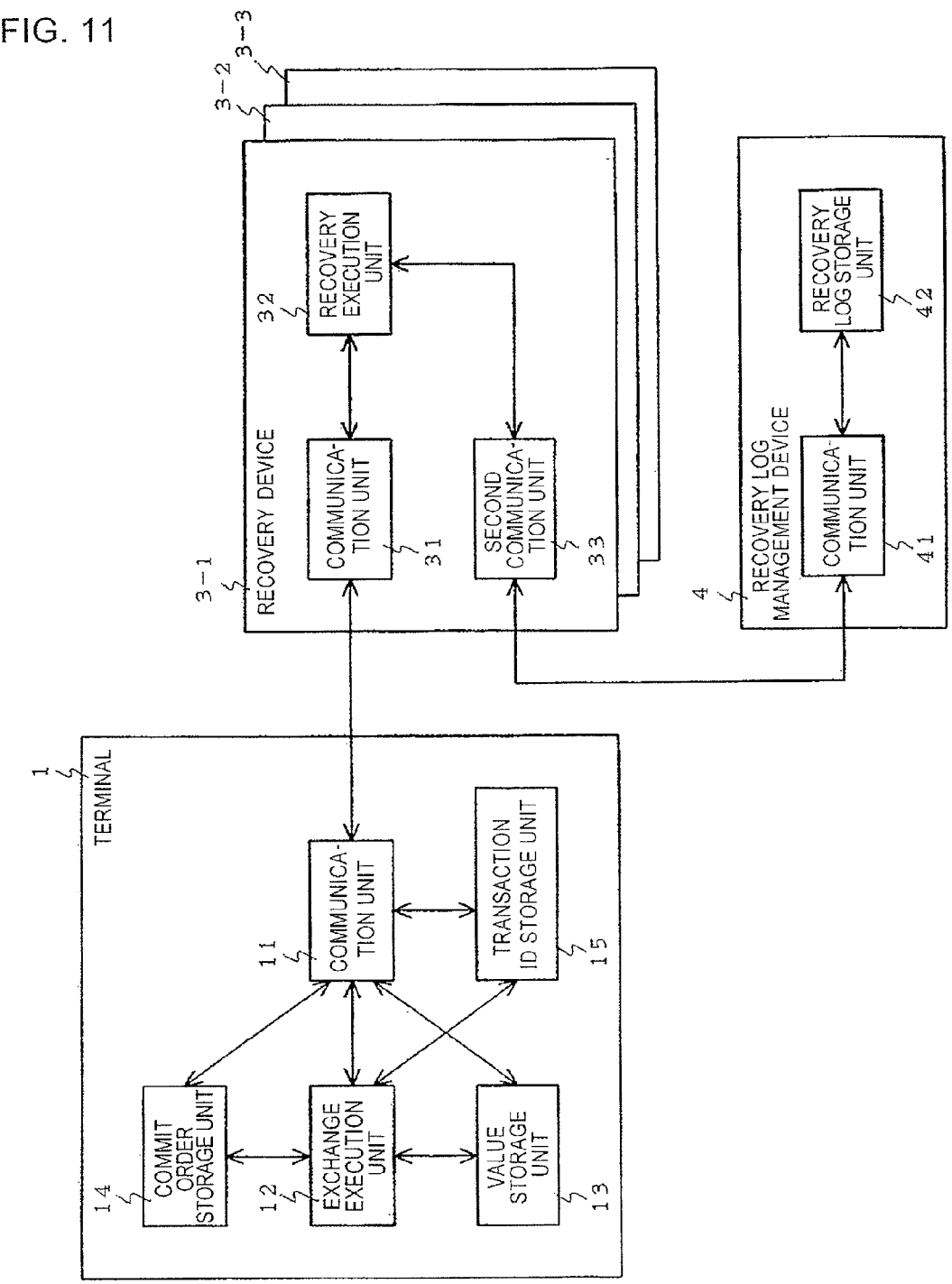
FIG. 11 is a block diagram illustrating a configuration of an electronic value exchange system according to a second embodiment of the present invention.

FIG. 11 is a block diagram illustrating a configuration of an electronic value exchange system according to a second embodiment of the present invention. The second embodiment of the present invention illustrated In FIG. 11 is configured similarly to the first embodiment of the present invention illustrated in FIG. 5, except that a plurality of recovery devices 3-1 to 3-3, each of which including a communication unit 31 which takes part in communication with the terminal 1, a recovery execution unit 32 which executes recovery, and a second communication unit 33 which takes part in communication with a recovery log management device 4; and the recovery log management device 4 including a communication unit 41 which takes part in communication with each of the plurality of recovery devices 3-1 to 3-3, and a recovery log storage unit 42 which stores past recovery; are provided in place of the recovery device 2. All similar constituents are given the same reference numerals or symbols.

Note that the second embodiment of the present invention operates similarly to the first embodiment of the present invention described in the above, except for the method of recovering the value in the terminal 1. Since the value transfer and value exchange between two terminals are same as those in the first embodiment of the present invention, so that the relevant explanation will not be repeated.

Next, a method of recovering the value in the terminal 1, incase of communication failure, according to the second embodiment of the present invention will be explained referring to FIG. 11. If communication failure occurs in the process of value exchange, the exchange execution unit 12 controls the communication unit 11 while being triggered typically by an operation by the user, and sets a communication path between itself and the communication unit 31 of any one of the plurality of recovery devices 3-1 to 3-3.

Note that operation of connecting the terminals (such as connecting them with a cable, or such as bringing the terminals close to each other in an area where wireless communication is available) may alternatively be adoptable in place of the operation by the user. Still alternatively, in case of communication failure in the process of value exchange, the terminal 1 may automatically be connected to any one of the plurality of recovery devices 3-1 to 3-3 through wireless communication or the like, irrespective of the operation by the user.

Next, the recovery execution unit 32 then makes reference to the commit order storage unit 14 and the transaction ID storage unit (identification information storage unit) 15 through the communication unit 31 and the communication unit 11 of the terminal 1, and acquires the commit order and the transaction ID in the value exchange during which the communication failure has occurred. The recovery execution unit 32 further makes reference to the recovery log storage unit 42 through the second communication unit 33 and the communication unit 41 of the recovery log management device 4, and confirms whether any recovery has previously been made on the other terminal.

Based on the commit order and presence or absence of the past recovery made on the other terminal, the recovery execution unit 32 decides whether the value storage unit 13 should be changed into the commit state without any change of data, or should be changed into the commit state after restoring the data before the value exchange. The recovery execution unit 32 finally records the event of recovery into the recovery log storage unit 42, through the second communication unit 33 and the communication unit 41 of the recovery log management device 4.

Next, operations of the electronic value exchange system according to the second embodiment of the present invention will be explained. Since the value transfer and the value exchange between two terminals are same as those in the first embodiment of the present invention, so that the relevant explanation will not be repeated.

Procedures of recovery of the value in the terminal 1 when any communication failure occurs in the process of value exchange are different from those in the above-described first embodiment of the present invention, in that reading from the recovery log in step S23, and recording into the recovery log in step S29 in the flow illustrated in FIG. 8 take place with respect to the recovery log storage unit 42 of the recovery log management device 4. Operations other than those described in the above are similar to those in the above-described first embodiment of the present invention.

Since the recovery log storage unit 42 in the second embodiment of the present invention is configured to be separated from each of the recovery devices 3-1 to 3-3, so that there may be a plurality of recovery devices 3-1 to 3-3, although the recovery log management device 4 needs be a unity. It is, therefore, possible to dispose a plurality of recovery devices 3-1 to 3-3, with which the terminal 1 establishes connection for recovery, at around the users.

Figure 12:
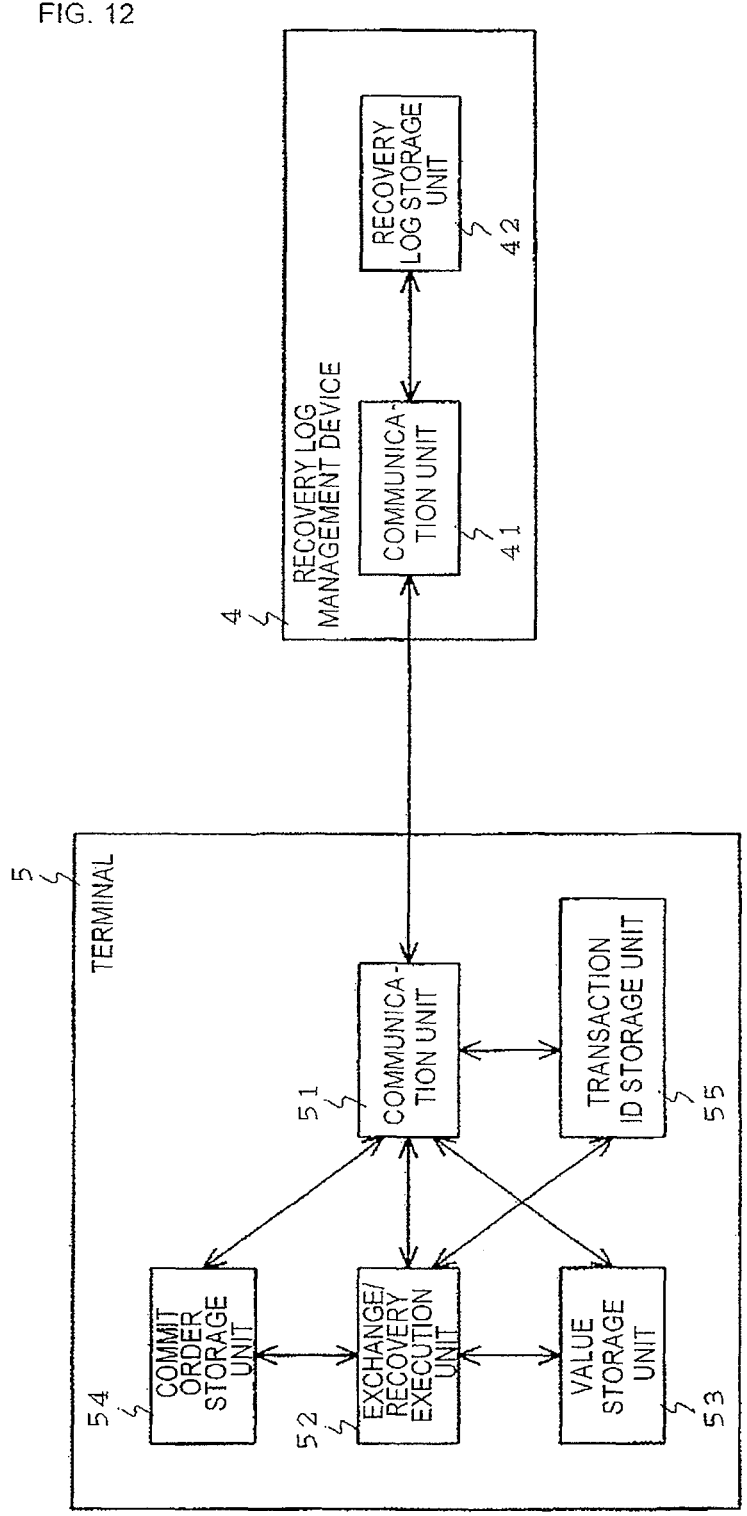
FIG. 12 is a block diagram illustrating a configuration of an electronic value exchange system according to a third embodiment of the present invention.

FIG. 12 is a block diagram illustrating a configuration of an electronic value exchange system according to a third embodiment of the present invention. The third embodiment of the present invention illustrated in FIG. 12 is configured similarly to the second embodiment of the present invention illustrated in FIG. 11, except that a terminal 5 having an exchange/recovery execution unit 52 is provided in place of the exchange execution unit 12, and the recovery devices 3-1 to 3-3 are omitted. All similar constituents are given the same reference numerals or symbols.

A communication unit 51, a value storage unit 53, a commit order storage unit 54, and a transaction ID storage unit (identification information storage unit) 55 of the terminal 5 are similar to the communication unit 11, the value storage unit 13, the commit order storage unit 14, and the transaction ID storage unit (identification information storage unit) 15, respectively, of the terminal 1 illustrated in FIG. 11. The recovery log management device 4 is configured similarly to the recovery log management device 4 in the above-described second embodiment of the present invention.

The value transfer and the value exchange between two terminals are same as those in the second embodiment of the present invention, since the exchange/recovery execution unit 52 operates as the exchange execution unit 12 illustrated in FIG. 11, so that the relevant explanation will not be repeated.

Next, a method of recovering the value in the terminal 5, in case of communication failure, according to the third embodiment of the present invention will be explained referring to FIG. 12. If communication failure occurs in the process of value exchange, the exchange/recovery execution unit 52 controls the communication unit 51 while being triggered typically by an operation by the user, and sets a communication path between itself and the communication unit 41 of the recovery log management device 4.

Note that operation of connecting the terminal 5 and the recovery log management device 4 (such as connecting them with a cable, or such as bringing the terminal 5 and the recovery log management device 4 close to each other in an area where wireless communication is available) may alternatively be adoptable in place of the operation by the user. Still alternatively, in case of communication failure in the process of value exchange, the terminal 5 may automatically be connected to the recovery log management device 4 through wireless communication or the like, irrespective of the operation by the user.

Next, the exchange/recovery execution unit 52 then makes reference to the commit order storage unit 53 and the transaction ID storage unit (identification information storage unit) 55, and acquires the commit order and the transaction ID in the value exchange during which the communication failure has occurred. The exchange/recovery execution unit 52 further makes reference to the recovery log storage unit 42 through the communication unit 51 and the communication unit 41 of the recovery log management device 4, and confirms whether any recovery has previously been executed by the other terminal.

Based on the commit order and presence or absence of the past recovery, the exchange/recovery execution unit 52 changes the value storage unit 53 into the commit state without any change of data, or changes it into the commit state after restoring the data before the value exchange. The exchange/recovery execution unit 52 finally records the event of recovery into the recovery log storage unit 42 of the recovery log management device 4.

Next, operations of the electronic value exchange system according to the third embodiment of the present invention will be explained. The value transfer and the value exchange between two terminals are same as those in the second embodiment of the present invention, since the exchange/recovery execution unit 52 operates as the exchange execution unit 12 illustrated in FIG. 11, so that the relevant explanation will not be repeated.

Procedures of recovery of the value in the terminal when any communication failure occurs in the process of value exchange are different from those in the above-described second embodiment of the present invention, in that, in the flow illustrated in FIG. 8, the process is executed by the exchange/recovery execution unit 52 in the terminal 5, rather than by the recovery execution unit 22 in the recovery device 2, and in that reading from the recovery log in step S23, and recording into the recovery log in step S29 take place with respect to the recovery log storage unit 42 of the recovery log management device 4. Operations other than those described in the above are similar to those in the above-described second embodiment of the present invention.

Since the third embodiment of the present invention is configured to have the exchange/recovery execution unit 52, which executes recovery similar to that executed by the above-described recovery execution unit 22, provided inside the terminal 5, so that it is now possible to execute the recovery simply by providing the recovery log storage unit 42 configured more simply than the recovery device 2 or the recovery devices 3-1 to 3-3.

Figure 13:
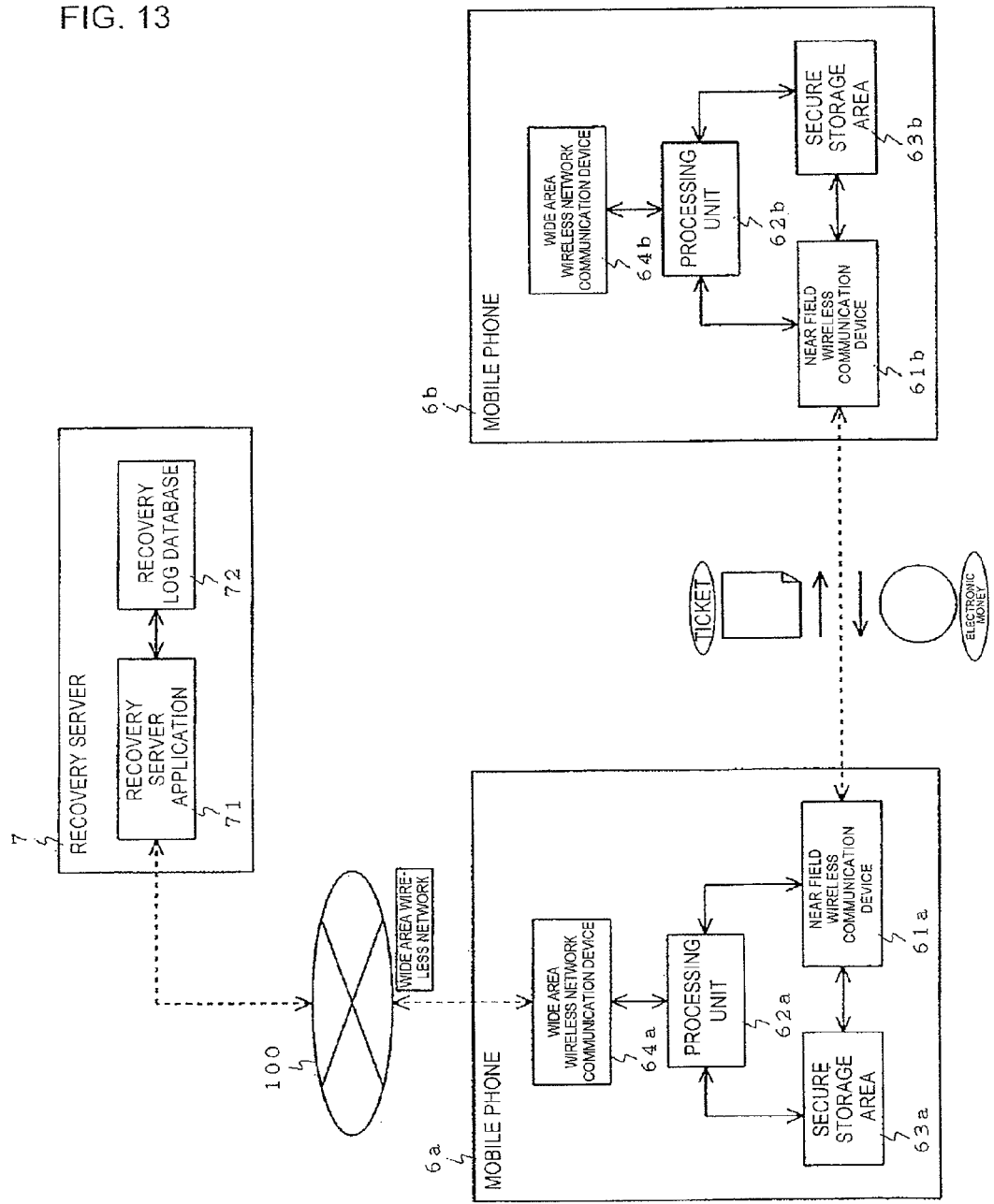
FIG. 13 is a block diagram illustrating an exemplary configuration of an electronic value exchange system according to a fourth embodiment of the present invention.

FIG. 13 is a block diagram illustrating an exemplary configuration of an electronic value exchange system according to a fourth embodiment of the present invention. As illustrated in FIG. 13, the electronic value exchange system according to the fourth embodiment of the present invention is configured by a mobile phone 6a which holds the value and can exchange the value between itself and the other mobile phone 6b, and a recovery server 7 to which the mobile phone 6a is connected in case of communication failure in the process of exchange so as to recover the value.

The mobile phone 6a is configured by a near field wireless communication device 61a which takes part in communication with the other mobile phone 6b, a secure storage area 63a which stores the value, a wide area wireless network communication device 64a which communicates with the recovery server 7 through the wide area wireless network 100, and a processing unit 62a which stores a program for executing a series of value exchange, value recovery and so forth. Also the mobile phone 6b is configured similarly to the mobile phone 6a.

Bluetooth (registered trademark) is adopted to the near field wireless communication devices 61a, 61b. As the secure storage areas 63a, 63b, memories (not illustrated) built in the mobile phones 6a, 6b are used, because reading of the internal data out therefrom is relatively difficult. The secure storage areas 63a, 63b in this embodiment may be brought into the commit-ready state before the change is committed, and may further allow cancellation of the change in the commit-ready state.

The recovery server 7 is composed of a recovery log database 72 which stores the recovery log, and a recovery server application 71 which accepts a recovery request from the mobile phones 6a, 6b through the wide area wireless network 100, and executes read/write with respect to the recovery log database 72.

Operations of exchanging an electronic ticket and an electronic money between two mobile phones 6a, 6b will be explained below. It is now premised that, before the exchange, a ticket is stored in the secure storage area 63a of the mobile phone 6a. According to the exchange described below, the ticket (actually a ticket ID) is transferred to the secure storage area 63b of the mobile phone 6b, and at the same time, the electronic money equivalent to the price of the ticket is subtracted from the electronic money balance of the secure storage area 63b, and added to the electronic money balance of the secure storage area 63a.

First, the user of the mobile phone 6a manipulates a menu or the like which appears on a display (not illustrated), selects a ticket the user wants to transfer, and enters a price the user wants to receive from the destination. When the user presses a process start button (not illustrated), the processing unit 62a controls the near field wireless communication device 61a of the mobile phone 6a, and searches the destination mobile phone 6b.

On the other hand, the user of the mobile phone 6b manipulates a menu or the like, places a command of reception of the ticket and subtraction of the electronic money. The processing unit 62b of the mobile phone 6b controls the near field wireless communication device 61b and searches the source mobile phone 6a.

When both users bring the mobile phones 6a, 6b as close as enabling communication with each other, communication is established between the near field wireless communication devices 61a, 61b, and mutual authentication takes place between the processing unit 62a and the secure storage area 63b. Thereafter, the processing unit 62a operates the secure storage area 63a and the secure storage area 63b, and exchange the electronic ticket and the electronic money.

The mutual authentication herein may be good enough if the both may be confirmed as valid instruments, and may alternatively be carried out typically between the processing unit 62a and the processing unit 62b, between the near field wireless communication device 61a and the near field wireless communication device 61b, between the secure storage area 63a and the secure storage area 63b, and so forth.

Figure 14:
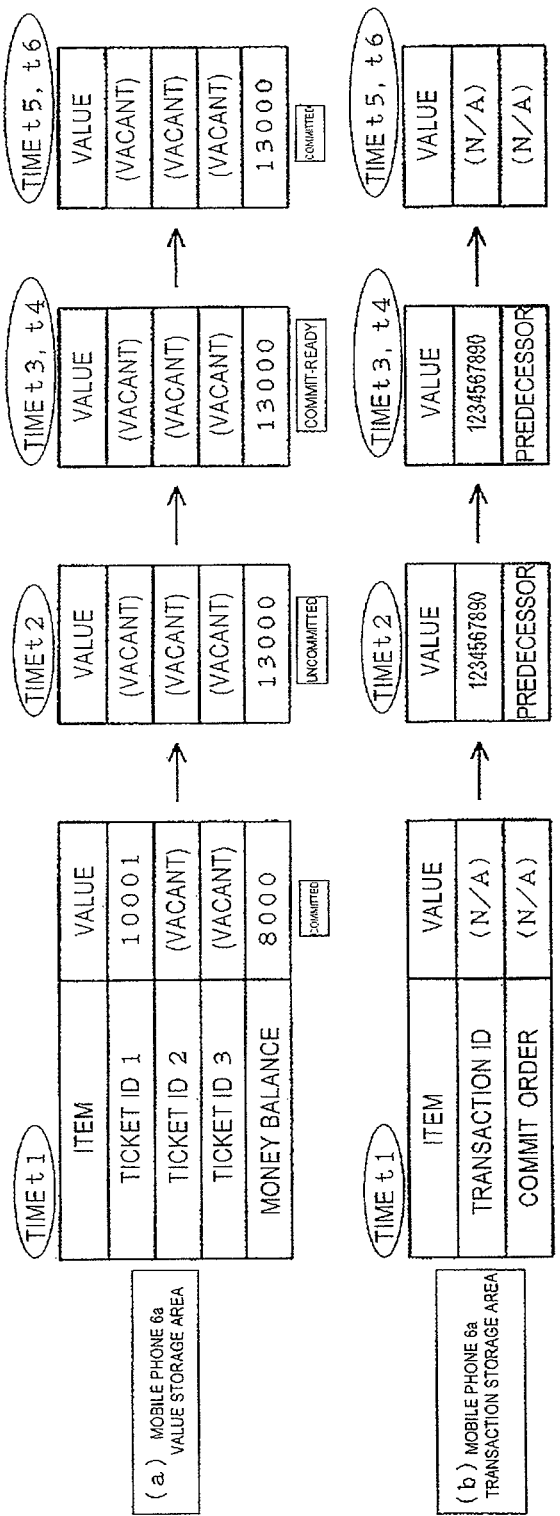
FIG. 14 is a drawing illustrating changes in a storage area of a mobile phone 6a in the process of value transfer, according to a fourth embodiment of the present invention.
Figure 15:
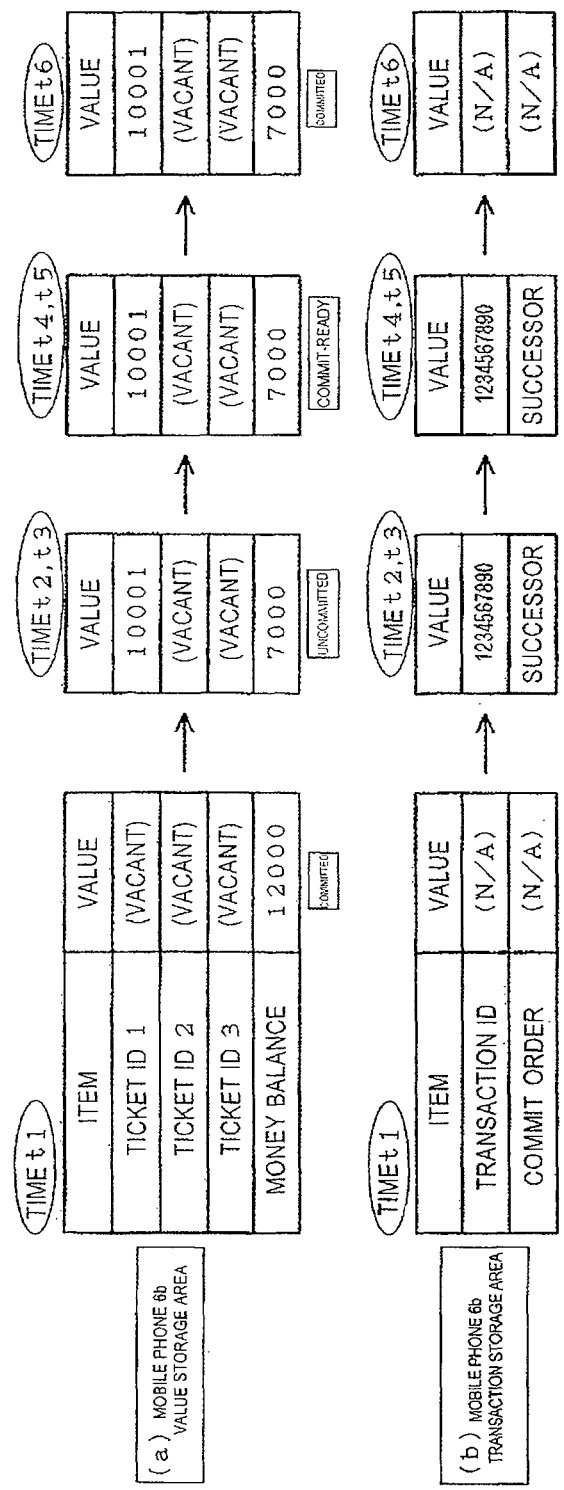
FIG. 15 is a drawing illustrating changes in a storage area of a mobile phone 6b in the process of value transfer, according to a fourth embodiment of the present invention.

FIG. 14 is a drawing illustrating changes in a storage area of a mobile phone 6a in the process of value transfer, according to a fourth embodiment of the present invention, and FIG. 15 is a drawing illustrating changes in a storage area of a mobile phone 6b in the process of value transfer, according to a fourth embodiment of the present invention. Exchange of the electronic ticket and the electronic money according to the fourth embodiment of the present invention will be explained referring to FIG. 13 to FIG. 15.

FIG. 14 and FIG. 15 respectively illustrate contents of storage of the secure storage areas 63a, 63b of the mobile phones 6a, 6b. Time t1 corresponds to a state immediately before the exchange, followed by times t2 to t5, and time t6 corresponds to a state after completion of the exchange.

Each of the secure storage areas 63a, 63b has two areas; one is used for storing values, and the other is used for storing transaction information. The former, or the value storage area, has three areas for storing the ticket IDs and one area for storing the electronic money balance, contents of change of all of which may be committed via the commit-ready state. They may also be returned back from the commit-ready state to a state before the change, by canceling the change.

On the other hand, the latter, or the transaction information storage area, has an area for storing the transaction ID, and an area for storing the commit order. While the value storage area has the commit-ready state and a function of canceling change, the transaction information storage area may be good enough if it simply has a function of holding the latest contents.

Referring now to FIG. 14 and FIG. 15, the processing unit 62a of the mobile phone 6a produces the transaction ID at time t2, decides the commit order (assumed herein that the mobile phone 6a is the first to be brought into the commit-ready state), and writes it into the transaction information storage areas of both terminals. At the same time, it also writes the ticket ID into the mobile phone 6b, and erases the ticket ID in the mobile phone 6a. The processing unit 62a further reduces the money balance from the mobile phone 6b, and adds the reduction to the money balance of the mobile phone 6a.

Next, at time t3, the value storage area of the mobile phone 6a is brought into the commit-ready state. Next, at time t4, the value storage area of the mobile phone 6b is brought into the commit-ready state. The value storage area of the mobile phone 6a is then brought into the commit state at time t5, and the value storage area of the mobile phone 6b is brought into the commit state at time t6. Note that it may alternatively be allowable to bring the value storage areas of the mobile phones 6a, 6b into the commit state at times t5, t6, and to erase, at the same time, the contents of the transaction information storage area.

By the operations described in the above, the exchange of the electronic ticket and the electronic money completes between the mobile phones 6a, 6b, and the mobile phones 6a, 6b then terminate the communication.

Figure 16:
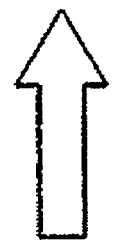
FIGS. 16(a), (b) are drawings illustrating states of the recovery log database in FIG. 12.

FIG. 16 is a drawings illustrating changes in the stored contents of the recovery log database 72 of the recovery server 7 in the process of value recovery, according to the fourth embodiment of the present invention. Recovery of the value in case of communication failure occurred in the process of exchange according to the fourth embodiment of the present invention will be explained referring to FIG. 13 and FIG. 16.

When a communication failure occurs, the processing unit 62a of the mobile phone 6a cancels the change, if the state of the secure storage area 63a is in the uncommitted state, and notifies the user on the display that the communication failure occurred and the exchange was turned invalid. If the secure storage area 63a is in the commit state, there if no need of notifying the user of occurrence of communication failure.

On the other hand, if the secure storage area 63a is in the commit-ready state, the processing unit 62a outputs a message on the display, to thereby direct the user to re-try communication with the other mobile phone 6b, or to establish connection with the recovery server 7.

If the user thus directed operates so as to re-try communication with the mobile phone 6b, the process may be re-started from the point of time of interruption due to the communication failure, so that the process will not be detailed.

On the other hand, if the user operates to establish connection with the recovery server 7, the processing unit 62a establishes connection through the wide area wireless network communication device 64a with the recovery server application 71 of a predetermined recovery server 7, to thereby carry out recovery.

FIG. 16 illustrates states of the recovery log database 72 illustrated in FIG. 13. Assuming now that the other mobile phone 6b has not established connection with the recovery server 7 yet, the recovery log database 72 is in a state illustrated in FIG. 16(a). Since there is no entry of transaction ID (stored in the transaction information storage area of the secure storage area 63a) "1234567890" executed right now, so that it is known that the mobile phone 6a established connection with the recovery server 7 earlier than the mobile phone 6b. Also since the mobile phone 6a has the commit order committed as "predecessor", so that change made on the value storage area of the secure storage area 63a is canceled according to the criteria illustrated in FIG. 10 (the contents of the transaction information storage area may be erased at the same time). Lastly, the transaction ID is added to the recovery log database 72 [see FIG. 16(b)].

On the other hand, if the other mobile phone 6b was found to have already established connection with the recovery server 7 when the mobile phone 6a establishes connection with the recovery server 7, the recovery log database 72 is in a state illustrated in FIG. 16(b). Since there is an entry of transaction ID "1234567890" executed right now, so that it is known that the mobile phone 6a established connection with the recovery server 7 after the mobile phone 6b did, and thereby the change made on the value storage area of the secure storage area 63a is committed according to the contents illustrated in FIG. 10 (the contents of the transaction information storage area may be erased at the same time).

Since it is understood in this case that both mobile phones 6a, 6b established connection with the recovery server 7, so that the transaction ID may finally be deleted from the recovery log database 72 in order to save the storage area.

While the process explained in the above was the recovery carried out in the mobile phone 6a, the recovery may be carried out also in the mobile phone 6b by the procedures similar to those for the mobile phone 6a. Since the transaction ID stored in the recovery log database 72 is necessarily unique to every process of exchange which takes place in all mobile phones 6a, 6b, so that it is more desirable to use a code obtained by combining a transaction ID which is preliminarily assigned to every mobile phone, time of exchange, a random number and so forth, as the transaction ID, rather than the ten-digit number (possibly be non-unique) exemplified in the above.

For the case where the communication failure could occur also in the above-described recovery, additional consideration will be necessary. For example, despite that the cancellation or commit was executed with respect to the value storage area, the recovery log database 72 could have no record remained therein due to communication failure. If the other mobile phone 6b executes recovery in this state, it would be a false operation against the correct operation with respect to the value storage area. In this case, the process is therefore configured to execute the recording into the recovery log database 72, before cancellation or commit of change with respect to the value storage area.

In addition, in order to avoid a false event that the communication failure occurs immediately after the recording into the recovery log database 72, and the same mobile phone establishes connection to the recovery server 7 again for recovery, but the other mobile phone would falsely be judged as the first to execute the recovery, the process herein is configured to record not only the transaction ID, but also a product ID or the like assigned to the mobile phone together therewith, into the recovery log database 72. In this way, even if the same mobile phone could repeat the recovery again and again due to communication failure or like during the recovery, it is now possible to correctly operate the value storage areas of both mobile phones.

Figure 17:
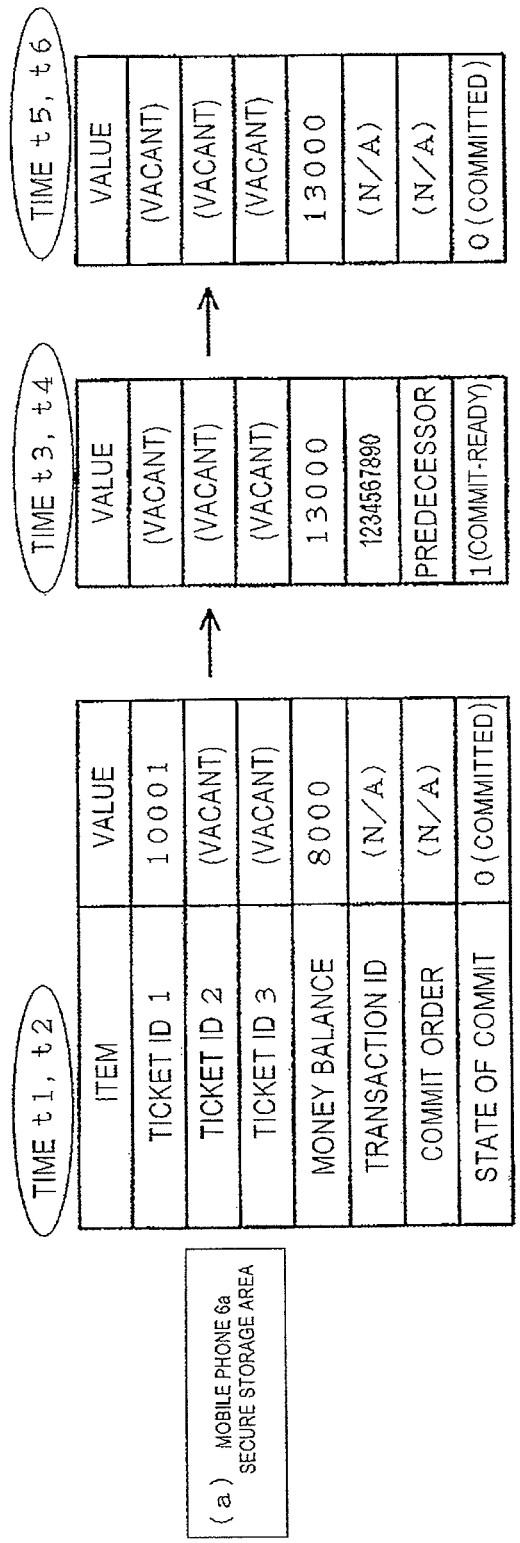
FIG. 17 is a drawing illustrating changes in a storage area of a mobile phone in the process of value transfer according to a fifth embodiment of the present invention.
Figure 18:
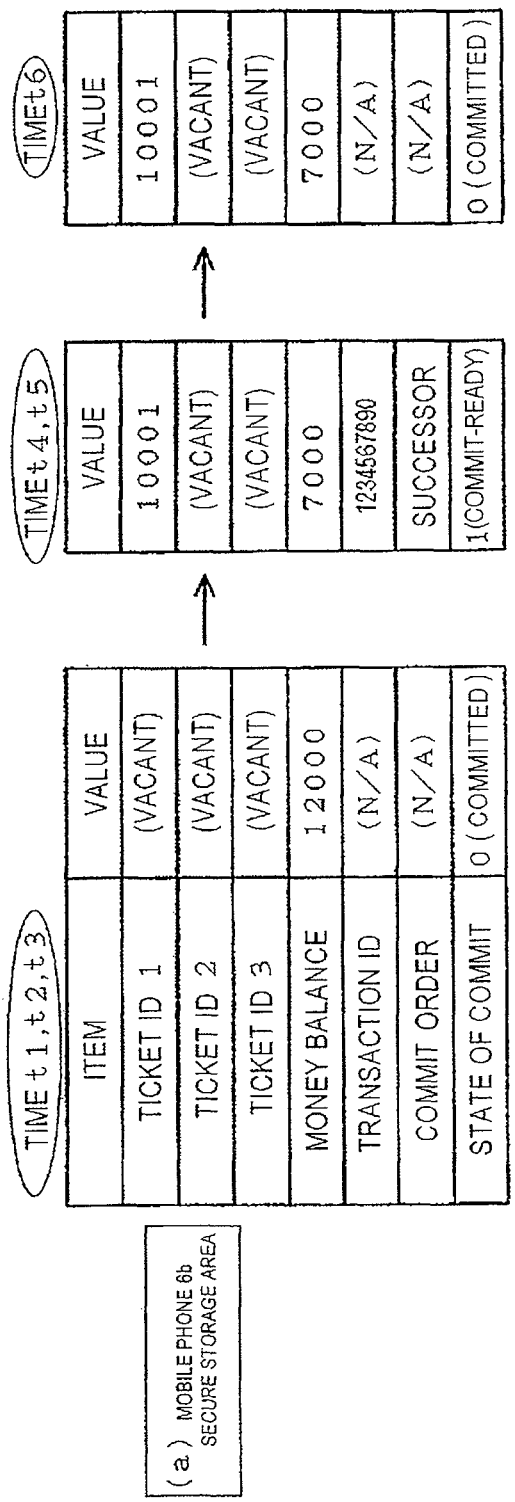
FIG. 18 is a drawing illustrating changes in a storage area of a mobile phone in the process of value transfer according to the fifth embodiment of the present invention.

FIG. 17 and FIG. 18 are drawings illustrating changes in the storage areas of the mobile phones in the process of value transfer according to a fifth embodiment of the present invention. An electronic value exchange system according to the fifth embodiment of the present invention is configured similarly to that of the above-described fourth embodiment of the present invention illustrated in FIG. 13. The fifth embodiment is however different from the above-described fourth embodiment of the present invention, in that the secure storage areas 63a, 63b of the mobile phones 6a, 6b do not support an operation of deciding the contents of change via the commit-ready state, and an operation of canceling the change and recovering the state before being changed. In other words, in the fifth embodiment of the present invention, the secure storage areas 63a, 63b have a function of merely holding the latest contents.

In the process of exchanging the electronic ticket and the electronic money, operations by the user and the procedures up to that both mobile phones 6a, 6b are brought close to each other so as to enable communication therebetween and so as to allow mutual authentication, are same as those in the above-described fourth embodiment of the present invention. Therefore, paragraphs below will explain the exchange executed thereafter by the processing unit 62a.

After the mutual authentication, the processing unit 62a operates the secure storage area 63a and the secure storage area 63*b*, so as to execute exchange of the electronic ticket and the electronic money. The process will be explained referring to FIG. 17 and FIG. 18.

FIG. 17 and FIG. 18 respectively illustrate the stored contents of the secure storage areas 63*a*, 63*b* of the mobile phones 6*a*, 6*b*. Times t1 to t6 mean similarly to as described in the fourth embodiment of the present invention.

Each of the secure storage areas 63*a*, 63*b* has three areas for storing the ticket IDs, and one area each for storing the electronic money balance, the transaction ID, the commit order, and the state of commit.

First at time t2, as a preparation for canceling the contents of change and for recovering the original state in case of communication failure, the processing unit 62*a* of the mobile phone 6*a* duplicates the current contents stored in the secure storage area 63*a*. More specifically, the processing unit 62*a* temporarily duplicates, on the memory thereof, all or a part of the contents (the ticket ID and the money balance herein) stored in the secure storage area 63*a*, and the processing unit 62*b* temporarily duplicates, on the memory thereof, all or a part of contents stored in the secure storage area 63*b*.

Besides the method of making duplication on the memories of the processing units 62*a*, 62*b*, another possible method may be such as preliminarily providing an area for duplication in the secure storage areas 63*a*, 63*b* per se, so as to allow storage therein.

At time t2, the processing unit 62*a* produces the transaction ID, and decides the commit order (the mobile phone 6*a* herein committed as the first to be brought into the commit-ready state). At time t2, while these values have not been written into the secure storage areas 63*a*, 63*b* of both mobile phones 6*a*, 6*b*, so far as FIG. 17 and FIG. 18 are referred to, but may be written therein.

Next, at time t3, the contents stored in the secure storage area 63*a* of the mobile phone having the commit order committed as "predecessor" (the mobile phone 6*a* herein) are rewritten as illustrated at time t3 in FIG. 17. More specifically, erasure of the ticket ID, addition of the money balance, and writing of the transaction ID and the commit order are executed. On the other hand, in the area of state of commit, a value ("1" herein) which represents "commit-ready" is written. These re-writing operations are more preferably executed at the same time (as primitive operations).

Next, at time t4, the contents stored in the secure storage area 63*b* of the mobile phone having the commit order committed as "successor" (the mobile phone 6*b* herein) are rewritten as illustrated at time t4 in FIG. 18. More specifically, writing of the ticket ID, reduction of the money balance, and writing of the transaction ID and the commit order are executed. On the other hand, in the area of state of commit, a value ("1" herein) which represents "commit-ready" is written. These rewrite operations are more preferably executed at the same time (as primitive operations).

Thereafter, at time t5, the area of state of commit of the mobile phone 6*a* is rewritten to have a value ("0" herein) which represents "committed", and at time t6, the area of state of commit of the mobile phone 6*b* is rewritten to have a value ("0" herein) which represents "committed". Alternatively, at times t5, t6, the value of state of commit of the individual mobile phones 6*a*, 6*b* may be rewritten to represent "commit", and the transaction ID and the contents of the commit order may be erased.

Since the exchange of the electronic ticket and the electronic money completes by the above-described processes, the mobile phones 6*a*, 6*b* terminate the communication. The values of the secure storage areas 63*a*, 63*b* temporarily duplicated at time t2 may be cancelled at this point of time.

Next, recovery of value in case of communication failure in the process of exchange in the electronic value exchange system according to the fifth embodiment of the present invention will be explained.

When the communication failure occurred, the processing unit 62*a* of the mobile phone 6*a* does not need to execute recovery, if the area of state of commit of the secure storage area 63*a* has a value which represents "commit" ("0" herein) (alternatively, incase of communication failure in the processes at times t1 to t2, a message telling that the exchange has been turned invalid may be output on the display to notify the user).

On the other hand, if the area of state of commit of the secure storage area 63*a* has a value which represents "commit ready" ("1" herein), a message is output on the display, so as to direct the user to re-try communication again with the other mobile phone 6*b*, or to establish connection with the recovery server 7.

If the user thus directed operates so as to re-try communication with the mobile phone 6*b*, the process may be re-started from the point of time of interruption due to the communication failure, so that the process will not be detailed.

On the other hand, if the user established connection with the recovery server 7, the processing unit 62*a* establishes connection through the wide area wireless network communication device 64*a* with the recovery server application 71 of a predetermined recovery server 7, to thereby carry out recovery.

The procedures of the recovery after connection with the recovery server 7 are same as those in the above-described fourth embodiment of the present invention. A different point is that, for the case where the change made on the value storage area of the secure storage area 63*a* is canceled, instead the value of the secure storage area 63*a* temporarily duplicated at time t2 is written back to the original, and the area of state of commit is rewritten to have a value ("0" herein) which represents "committed". Another different point is that, for the case where the change made on the value storage area of the secure storage area 63*a* is committed, instead the area of state of commit of the secure storage area 63*a* is rewritten to have a value ("0" herein) which represents "committed".

While the recovery took place in the mobile phone 6*a* has been described, also the mobile phone 6*b* may be recovered by procedures similar to those for the mobile phone 6*a*.

As has been described in the above, in this embodiment, the value commit order at the terminal is preliminarily decided and stored in the terminal, the change of value is committed according thereto, and a history of past recovery is stored in the recovery device. Accordingly, in this embodiment, even in case of communication failure, a consistent method of value recovery may uniquely be decided based on the commit order and the recovery history, by connecting one terminal to the recovery device.

As a consequence, according to this embodiment, the states of values in both terminals may be recovered to give consistent states, even these terminals are failed in re-connection, in case of communication failure in the process of transfer or exchange value between the terminals.

Figure 19:
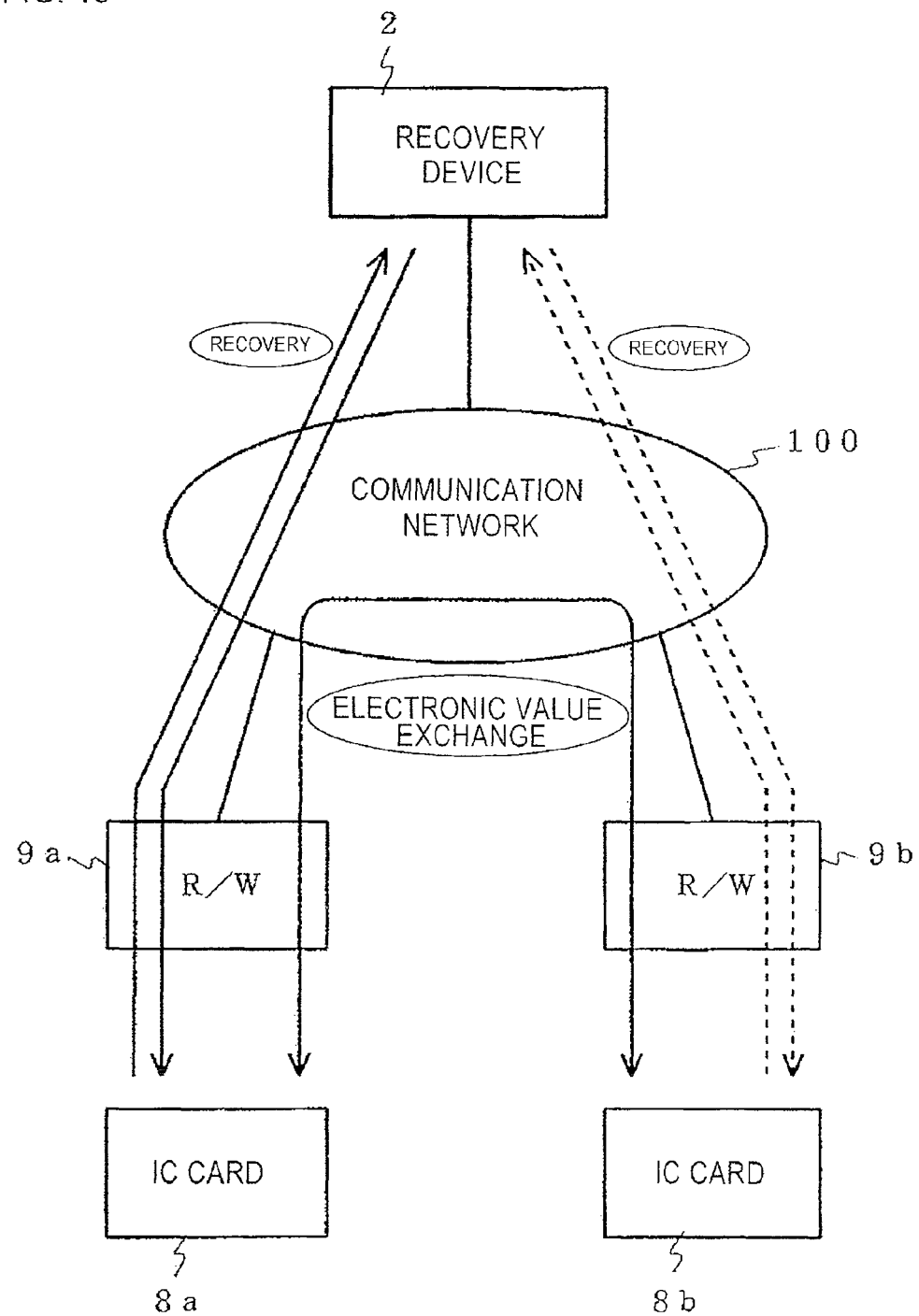
FIG. 19 is a block diagram illustrating an exemplary configuration of an electronic value exchange system according to a sixth embodiment of the present invention.

FIG. 19 is a block diagram illustrating an exemplary configuration of an electronic value exchange system according to a sixth embodiment of the present invention. In FIG. 19, the electronic value exchange system according to the sixth embodiment of the present invention is configured and allowed to operate similarly to the electronic value exchange system of the first embodiment of the present invention illustrated in FIG. 3, except that IC cards 8*a*, 8*b* for storing the values, and reader/writer units (R/W) 9*a*, 9*b* for executing read/write operation from or to the IC cards 8a, 8b are provided, in place of the terminals 1a, 1b.

According to the sixth embodiment of the of the present invention, effects similar to those in the first embodiment of the present invention may be obtained by providing the exchange execution units 12a, 12b of the terminals 1a, 1b in the reader/writer units 9a, 9b, by providing storage areas for each of the value storage units 13a, 13b, the commit order storage units 14a, 14b, the transaction ID storage units (identification information storage units) 15a, 15b respectively in the IC cards 8a, 8b, and by executing control similar to that for controlling the state of the value storage unit 13a, 13b (uncommitted state, commit-ready state, commit state). It is to be understood now that also connection of the IC cards 8a, 8b to the recovery device 2 is established through the reader/writer units 9a, 9b.

Figure 20:
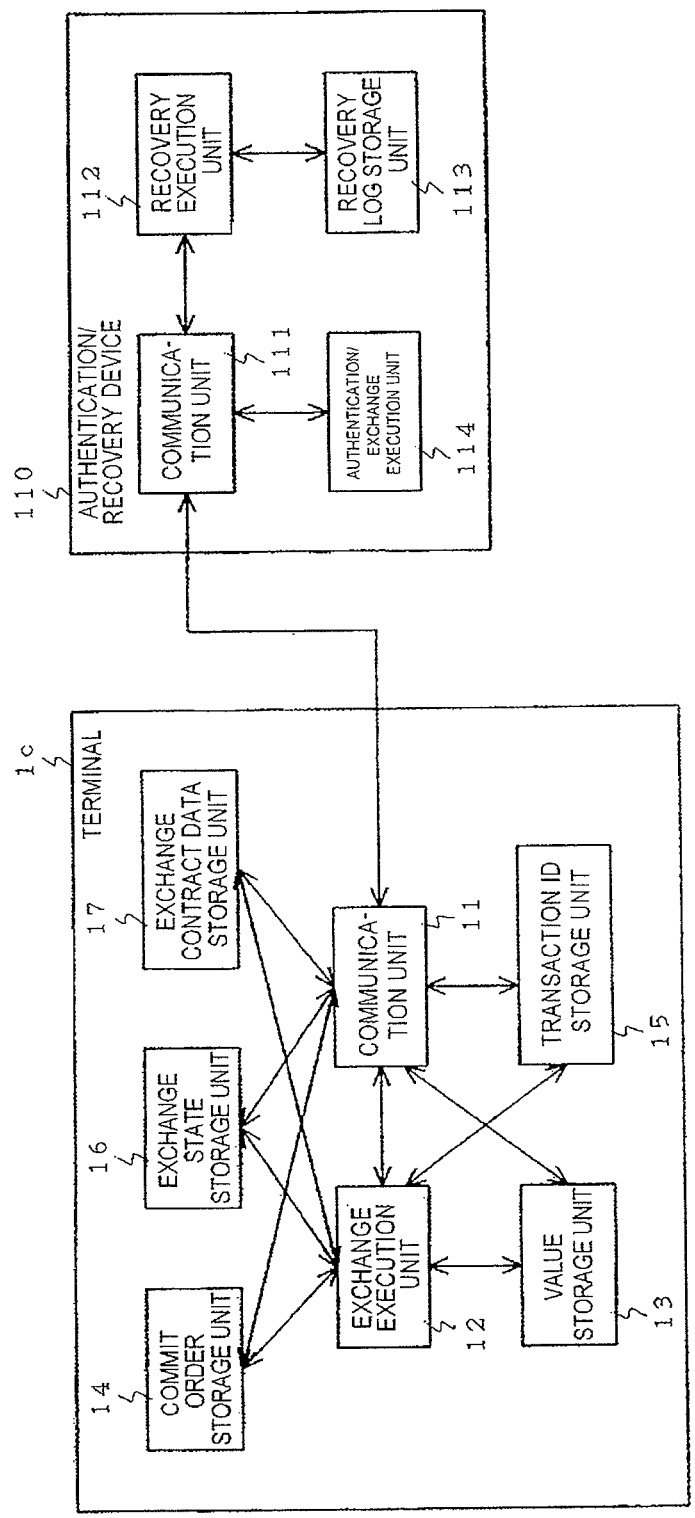
FIG. 20 is a drawing illustrating value transfer operation of an electronic value exchange system according to a seventh embodiment of the present invention.
Figure 21:
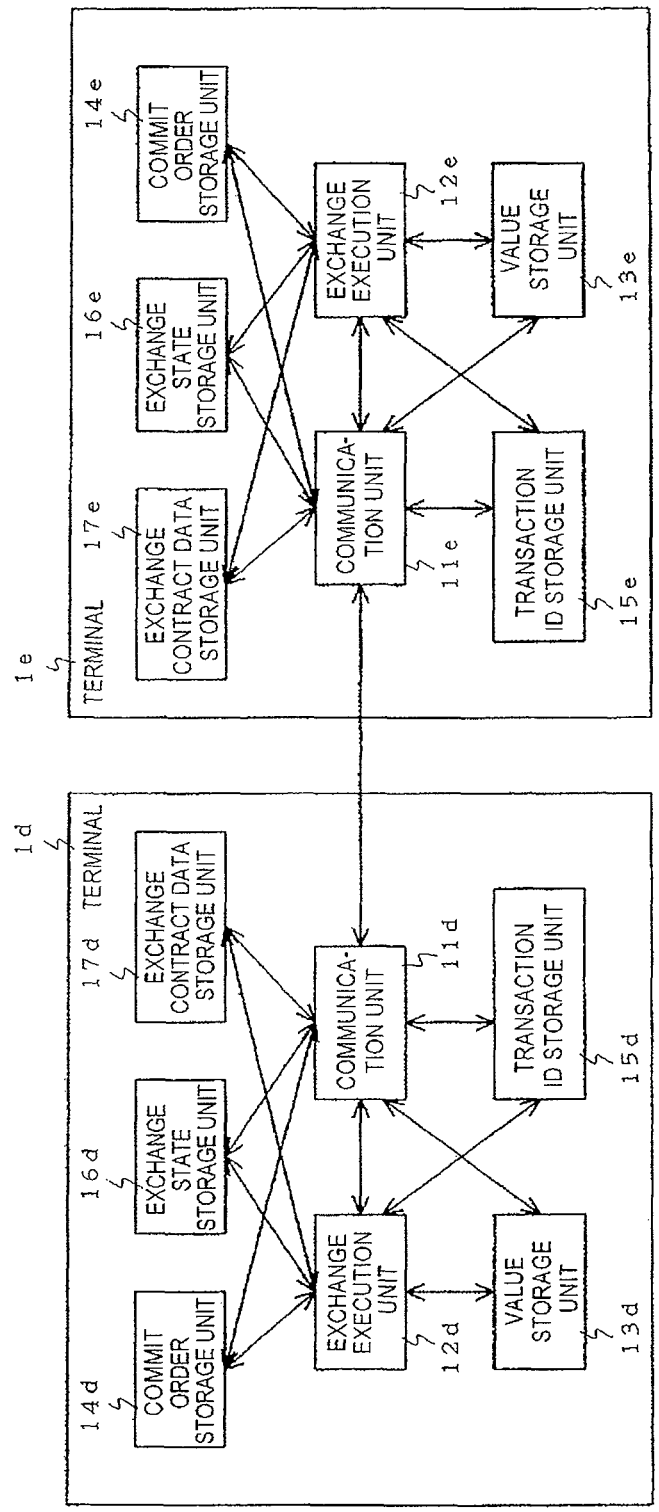
FIG. 21 is a drawing illustrating value transfer operation of an electronic value exchange system according to the seventh embodiment of the present invention.

FIG. 20 and FIG. 21 are block diagrams illustrating an exemplary configuration of the electronic value exchange system of a seventh embodiment of the present invention. The electronic value exchange system of this embodiment has a first terminal and a second terminal which at least execute electronic value exchange with each other (both of these terminals are similarly configured, and are denoted as the terminal 1c in FIG. 20, and as terminals 1d, 1e in FIG. 21), and an authentication device (authentication/recovery device) 110. Each of the first and second terminals has a value storage unit 13 which stores the electronic value; an exchange contract data storage unit 17 which stores exchange contract data representing contents of the electronic value exchange; an exchange state storage unit 16 which represents a state of the electronic value exchange; a commit order storage unit 14 which stores a commit order which indicates that which of the first terminal and the second terminal is the first to execute state change in the exchange state storage unit, into any one of the commit state representing a normal state before the electronic value exchange, the commit-ready state representing a preliminary stage in which the exchange contract is committed after completion of transmission/reception of the exchange contract data, and the quasi-commit state representing a state after the exchange contract is committed; an identification information storage unit (transaction ID storage unit) 15 which stores identification information assigned to every process of transmission/reception of the exchange contract data; and a first exchange execution unit which decides the commit order and stores it into the commit order storage unit 16, decides the identification information and stores it into the identification information storage unit (transaction ID storage unit) 15, and executes transmission/reception of the exchange contract data between itself and each of the first and second terminals and stores it into the exchange contract data storage unit 17. The authentication device (authentication/recovery device) 110 has a second exchange execution unit (authentication/exchange execution unit) 114 which acquires the exchange contract data from either one of the first and second terminals, and operates the value storage unit 13 of such one terminal to execute the electronic value exchange.

In FIG. 20, the terminal 1c is composed of the communication unit 11, the exchange execution unit 12, the value storage unit 13, the commit order storage unit 14, the transaction ID storage unit (identification information storage unit) 15, the exchange state storage unit 16, and the exchange contract data storage unit 17. The terminal 1c herein might resemble the terminal 1 in the first embodiment of the present invention, but is different from the first embodiment of the present invention in that it has the exchange state storage unit 16 and the exchange contract data storage unit 17.

The communication unit 11 takes part in communication between itself and the other terminal (not illustrated), the exchange execution unit 12 executes exchange of the value, and the value storage unit 13 stores the value. The commit order storage unit 14 stores the commit order of value exchange, and the transaction ID storage unit (identification information storage unit) 15 stores the transaction ID assigned to every process of exchange. The exchange state storage unit 16 stores the state of value exchange, and the exchange contract data storage unit 17 stores the exchange contract data.

In FIG. 20, the authentication/recovery device 110 is composed of a communication unit 111, a recovery execution unit 112, a recovery log storage unit 113, and the authentication/exchange execution unit 114. The authentication/recovery device 110 might resemble the recovery device 2 in the first embodiment of the present invention, but is different from the first embodiment of the present invention in that it has the authentication/exchange execution unit 114.

The communication unit 111 takes part in communication with the terminal 1c, and the recovery execution unit 112 executes recovery which brings the state of the value storage unit 13 into a consistent state, between the terminals involved in transfer and exchange of the value. The recovery log storage unit 113 stores history of past recovery for every transaction ID. The authentication/exchange execution unit 114 appropriately rewrites the contents of the value storage unit 13 according to the contents of the exchange contract data storage unit 17, and executes the exchange.

In the first embodiment of the present invention, the terminal 1 was able to directly rewrite data in the value storage unit 13. The seventh embodiment of the present invention is, however, different from the first embodiment of the present invention in that rewriting of data in the value storage unit 13 is necessarily preceded by authentication.

For this reason, in this embodiment, the data in the value storage unit 13 is rewritten, after executing authentication with respect to the value storage unit 13 using the authentication information. For example, in order to rewrite the data in the value storage unit 13, the terminal 1c establishes communication between itself and the authentication/recovery device 110, the authentication/exchange execution unit 114 executes authentication with respect to the value storage unit 13 using authentication information stored in the authentication information storage unit (not illustrated) owned by the authentication/recovery device 110, and the data is then rewritten. The system of authentication adoptable herein may be exemplified by common key cryptosystem, public key cryptosystem and so forth.

Paragraphs below will explain operation of exchange of the electronic ticket and the electronic money between two terminals 1d, 1e, similarly in the first embodiment of the present invention. In the seventh embodiment of the present invention, the exchange therebetween proceeds in two steps. More specifically, the communication is started when the terminals 1d, 1e are brought close to each other by the user, and the exchange completes after going through a first step allowing the process to proceed, and a second step in which the terminals 1d, 1e respectively start communication between each of them and the authentication/recovery device 110 so as to proceed the process.

FIG. 21 is a drawing illustrating operations in the first step. Operations by the user and the procedures up to that both terminals 1d, 1e are brought close to each other so as to enable communication therebetween and so as to start the communication, the commit order is decided and stored into the commit order storage units 14d, 14e, and the transaction ID is produced and stored into the transaction ID storage units (identification information storage units) 15d, 15e, are same as those in the above-described first embodiment of the present invention. Therefore, the paragraphs below will explain the exchange executed thereafter by the exchange execution units 12d, 12e.

The exchange execution units 12d, 12e at this point of time do not execute exchange of the electronic ticket and the electronic money, or do not rewrite data in the value storage units 13d, 13e, unlike the first embodiment of the present invention, but instead execute transmission/reception of the exchange contract data which promises to rewrite them later, and store them into the exchange contract data storage units 17d, 17e.

The exchange contract data contain, for example as illustrated in FIG. 22, an ID of the electronic ticket to be exchanged, a price of the electronic money, and information regarding from which terminal and to which terminal should they be transferred. In this process, the data may be signed with a secret key of either one of, or both of the terminals, or may be encrypted so as to make them invisible by the third party, in order to prevent the contents from being substituted.

When the exchange contract is normally committed, after completion of the transmission/reception of the exchange contract data between the terminals 1d, 1e, this means that the electronic ticket and the electronic money was exchanged. The terminals 1d, 1e terminates the communication.

After the terminals 1d, 1e terminate the communication therebetween, each of them then respectively establishes, in the second step, communication with the authentication/recovery device 110 in order to rewrite data in the value storage units 13d, 13e.

FIG. 20 is a drawing illustrating operations in the second step. Upon establishment of communication between the terminal 1c and the authentication/recovery device 110, the authentication/exchange execution unit 114 of the authentication/recovery device 110 acquires the exchange contract data from the exchange contract data storage unit 17 of the terminal 1c, and executes an appropriate exchange based on the contents thereof. Typically, the authentication/exchange execution unit 114 reads the authentication information out from the authentication information storage unit (not illustrated), and executes authentication with respect to the value storage unit 13 of the terminal 1c. The authentication/exchange execution unit 114 then appropriately rewrites the data in the value storage unit 13, and finally terminates the connection with the terminal 1c.

According to the process in the above-described second step, the process regarding one of the terminals 1d, 1e completes. As for exchange of the electronic ticket and the electronic money between the terminals 1d, 1e, also the process regarding the other terminal may be proceeded similarly to as described in the above. At the point of time at which both terminals 1d, 1e are respectively connected to the authentication/recovery device 110 and complete the processes, the entire range of exchange of the electronic ticket and the electronic money completes.

Since the value exchange has been concluded at the point of time when the exchange contract data was transmitted/received between the terminals 1d, 1e in the first step, and the exchange contract has been committed, so that each of the terminals 1d, 1e in the second step may good enough to establish connection and to communicate with the authentication/recovery device 110 respectively at their suitable points of time. For example, the terminals 1d, 1e do not necessarily start communication with respect to the authentication/recovery device 110 at the same time.

Operations of the value recovery in case of communication failure in the electronic value exchange system according to the seventh embodiment of the present invention will be explained referring to FIG. 20.

For the case where communication failure occurred during the first step or the second step of value exchange, the exchange execution unit 12 controls the communication unit 11 upon being triggered typically by an operation by the user, and sets a communication path between itself and the communication unit 111 of the authentication/recovery device 110. Note that operation of connecting the terminal 1c and the authentication/recovery device 110 (such as connecting them with a cable, or such as bringing the terminal 1c and the authentication/recovery device 110 close to each other in an area where wireless communication is available) may alternatively be adoptable in place of the operation by the user. Still alternatively, in case of communication failure in the process of value exchange, the terminal 1c may automatically be connected to the authentication/recovery device 110 through wireless communication or the like, irrespective of the operation by the user.

Next, in case of communication failure occurred in the first step of the exchange, the recovery execution unit 112 makes reference through the communication unit 111 and the communication unit 11 of the terminal 1c, to the commit order storage unit 14 and the transaction ID storage unit (identification information storage unit) 15, and acquires the commit order and the transaction ID in the value exchange in which the communication failure has occurred.

The recovery execution unit 112 further makes reference to the recovery log storage unit 113 based on the transaction ID, and confirms whether the other terminal has been previously recovered in the recovery process identified with the transaction ID. Based on the commit order and presence or absence of the past recovery, the recovery execution unit 112 decides whether the value of the exchange state storage unit 16 should be changed into the commit state without any change of data, or should be changed into the commit state after restoring the data before the value exchange, and executes the decision.

The recovery execution unit 112 finally records the event of recovery into the recovery log storage unit 113. Note that the authentication/recovery device 110 to which an arbitrary terminal 1c is connected for recovery should always be the same. In other words, two or more authentication/recovery device 110 are not permissible, and must be only one.

On the other hand, in case of communication failure occurred in the second step of exchange, the terminal 1c establishes connection with the authentication/recovery device 110 as described in the above, and the authentication/exchange execution unit 114 controls the terminal 1c to re-execute the second step of exchange.

The exchange execution units 12d, 12e illustrated in FIG. 21 are configured to be incorporated inside the terminals 1d, 1e, whereas the exchange execution units 12d, 12e may alternatively be provided outside the terminals 1d, 1e, and may be configured to execute read/write to or from the value storage units 13d, 13e, the commit order storage units 14d, 14e, the transaction ID storage units (identification information storage unit) 15d, 15e, the exchange state storage units 16d, 16e, and the exchange contract data storage units 17d, 17e, through the communication units 11d, 11e.

Figure 23:
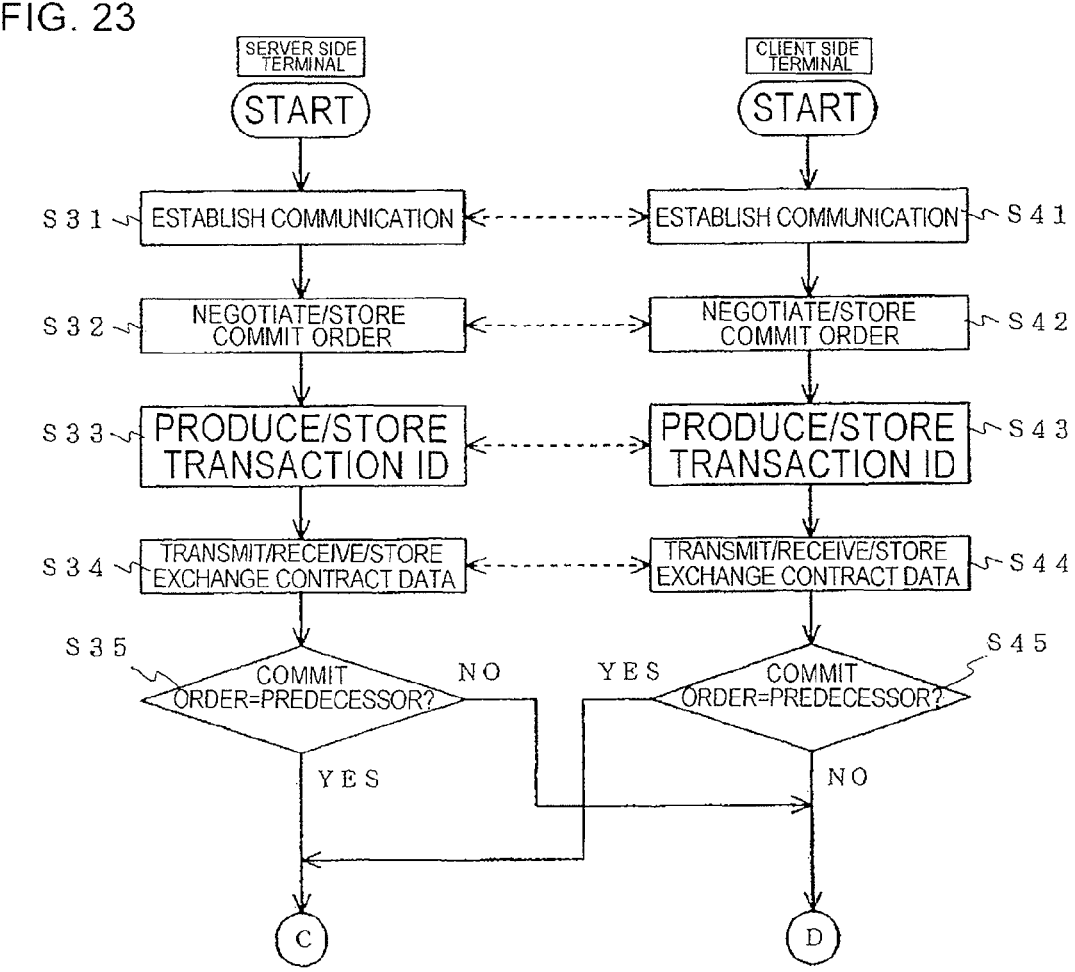
FIG. 23 is a flow chart illustrating value transfer operation according to the seventh embodiment of the present invention.
Figure 24:
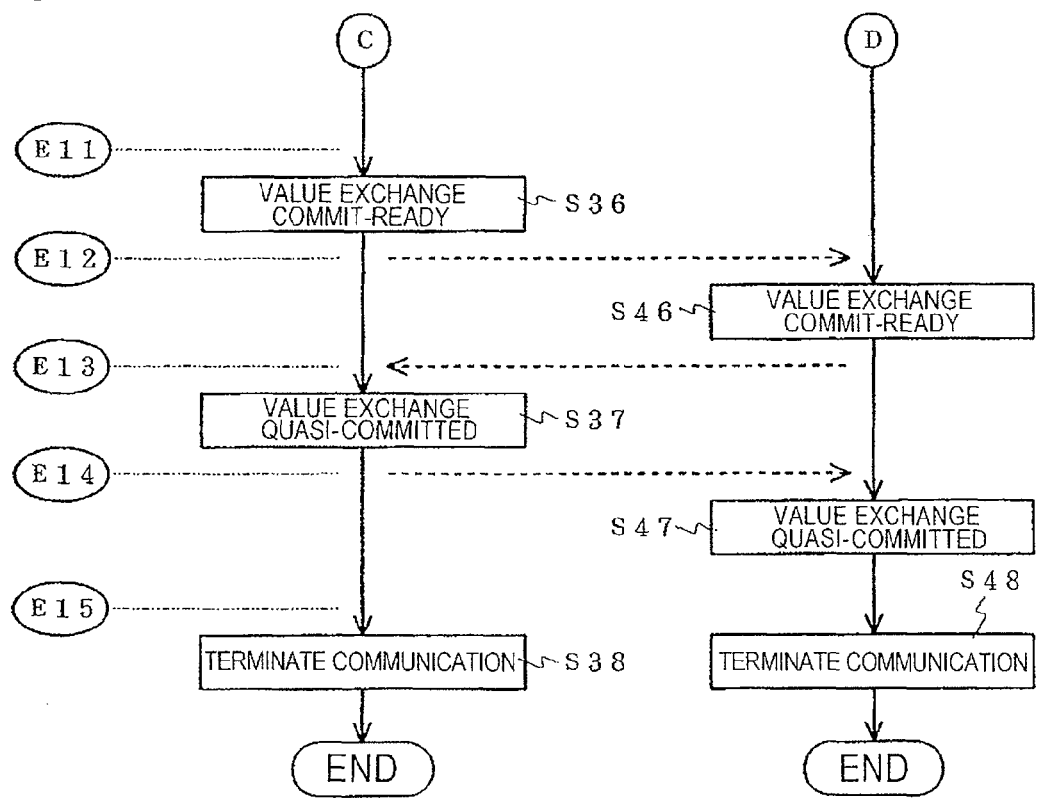
FIG. 24 is a flow chart illustrating value transfer operation according to the seventh embodiment of the present invention.
Figure 25:
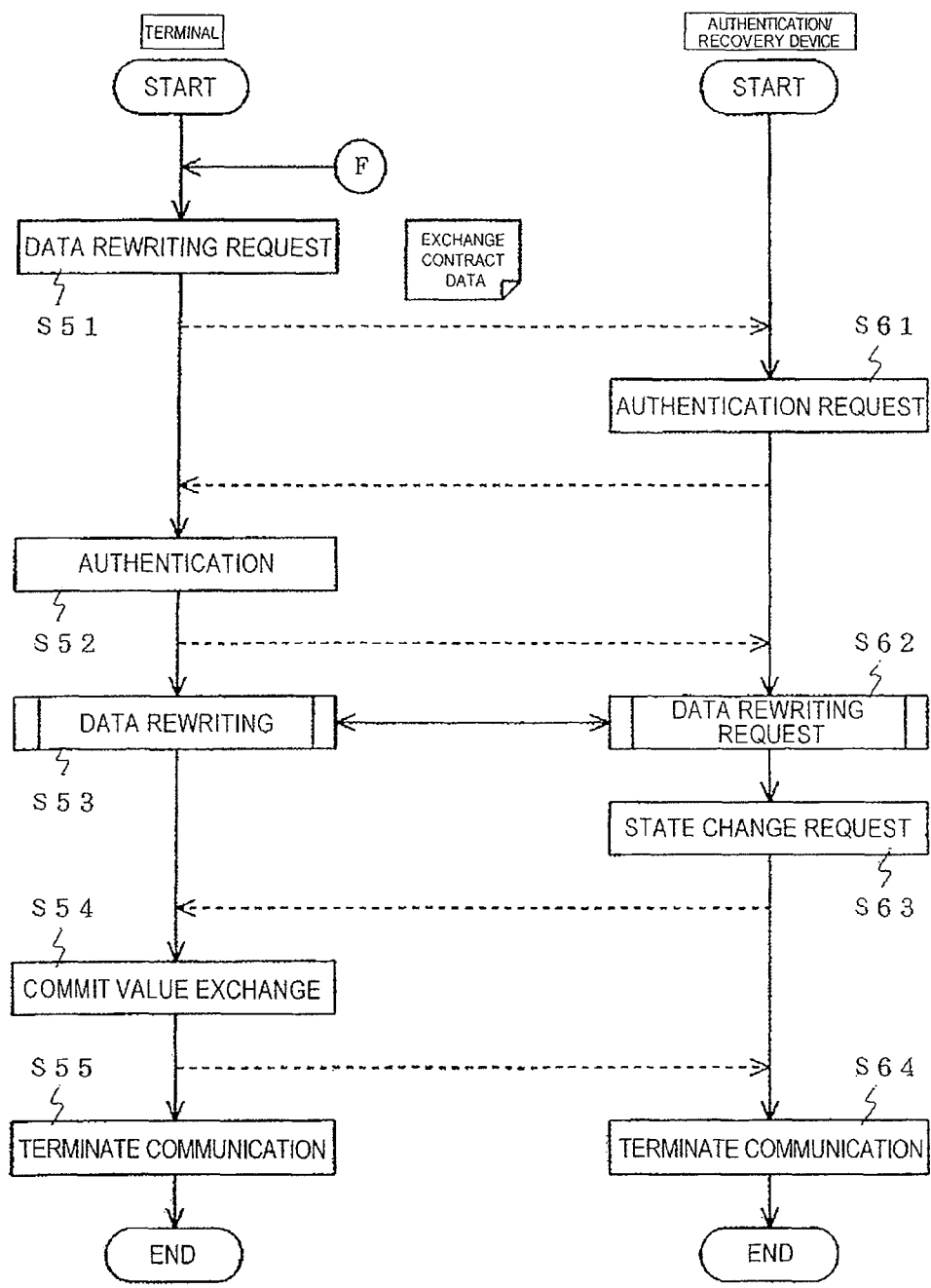
FIG. 25 is a flow chart illustrating value transfer operation according to the seventh embodiment of the present invention.

FIG. 23 to FIG. 25 are flow charts illustrating operations of the value exchange according to the seventh embodiment of the present invention. Operations of the electronic value exchange system according to the seventh embodiment of the present invention will be explained referring to FIG. 23 to FIG. 25. Note that processes illustrated in FIG. 23 and FIG. 24 may be embodied by processing units (CPUs and so forth) incorporated in the terminals 1d, 1e, when they execute a program, and the processes illustrated in FIG. 25 may be embodied by processing units (CPUs and so forth) incorporated respectively in the terminals 1d, 1e, and the authentication/recovery device 110, when they execute a program.

In contrast to that the value storage units according to the first to sixth embodiments of the present invention may have three states, which include the commit state representing a normal state before the change of value, the uncommitted state representing a state during the change of value, and the commit-ready state representing a preliminary stage after completion of the change of value and before commit of the change, in the seventh embodiment of the present invention, the values which represent the states of change of value at the individual terminals are stored in the exchange state storage unit 16, and the individual terminal may have three states different from those described in the above.

More specifically, three possible states attainable in this embodiment include the normal state before the electronic value exchange, the commit-ready state which represents a preliminary stage in which the exchange contract is committed by transmission/reception of the exchange contract data, and a quasi-commit state which represents a state after the exchange contract is committed and before the data in the value storage units 13d, 13e are rewritten based on the exchange contract data.

First, the exchange contract processing of the electronic ticket and the electronic money between two terminals 1d, 1e, which corresponds to the exchange in the above-described first step, will be explained referring to FIG. 23 and FIG. 24. Note that, in FIG. 23 and FIG. 24, the terminal 1d is assumed as the server side terminal, and the terminal 1e is assumed as the client side terminal.

Out of the procedures of exchange in the first step of the seventh embodiment of the present invention, those in steps S31 to S33, and those in steps S41 to S43 in FIG. 23 are similar to those in the exchange according to the first embodiment of the present invention (steps S1 to S3, and steps S11 to S13 in FIG. 6), so that the details will not repetitively be explained.

Next, communication is established between the terminals 1d, 1e, so as to transmit/receive the exchange contract data between the terminals 1d, 1e, and so as to store it into the exchange contract data storage units 17d, 17e (steps S34, S44 in FIG. 23). The state of value exchange in both terminals 1d, 1e (values in the exchange state storage units 16d, 16e) at this time is same as that before the start of exchange.

Upon completion of transmission/reception and storage of the exchange contract data, the process advances to a step of allowing the both terminals 1d, 1e to make state transition from the commit state to the commit-ready state and the quasi-commit state, so as to commit the exchange contract. According to the commit order decided by the previous processes in steps S32, S42, the succeeding procedures will be executed (steps S35, S45 in FIG. 23).

First, the terminal having the commit order committed as "predecessor" (assumed here as the terminal 1d) changes the value of the exchange state storage unit 16d so as to represent the commit-ready state (step S36 in FIG. 24). Succeedingly, the terminal 1e having the commit order committed as "successor" changes the value of the exchange state storage unit 16e so as to represent the commit-ready state (step S46 in FIG. 24). The terminal 1d having previously been changed into the commit-ready state then changes the value of the exchange state storage unit 16d so as to represent the quasi-commit state (step S37 in FIG. 24). Lastly, the other terminal 1e changes the value of the exchange state storage unit 16d so as to represent the quasi-commit state (step S47 in FIG. 24).

The state transition of the terminals 1d, 1e to the quasi-commit state is completed by the operations described in the above, and the exchange contract is committed. The communication is then terminated by both terminals 1d, 1e, to thereby complete the first step of value exchange. Note that decision of the commit order (steps S32, S42 in FIG. 23), production of the transaction ID (steps S33, S43 in FIG. 23), and transmission/reception of the exchange contract data (steps S34, S44 in FIG. 23) are not always necessarily executed in the above-described order, and may be exchanged.

Next, rewriting of the data in the value storage unit 13 of the terminal 1c by the authentication/recovery device 110, corresponded to the above-described second step of exchange, will be explained referring to FIG. 25. The terminals 1d, 1e brought into the quasi-commit state respectively establish connection with the authentication/recovery device 110, so as to request rewriting of the data in the value storage units 13d, 13e (step S51 in FIG. 25). Paragraphs below will explain each of the terminals as the terminal 1c.

When the terminal 1c requests the authentication/recovery device 110 to rewrite data, the authentication/recovery device 110 authenticates the value storage unit 13 (steps S61, S52 in FIG. 25). If the authentication succeeds, the authentication/recovery device 110 then operates the value storage unit 13, so as to appropriately rewrites data, based on the exchange contract data acquired from the terminal 1c (steps S62, S53 in FIG. 25). These processes are similar to general value processing, such as a process between an IC card and a reader/writer, so that the processes herein will not be detailed.

Upon completion of necessary rewriting of data, the authentication/recovery device 110 then changes the value of the exchange state storage unit 16 of the terminal 1c so as to represent the commit state (steps S63, S54 in FIG. 25), and terminates the communication between the terminal 1c and the authentication/recovery device 110, to thereby complete the second step of value exchange (steps S55, S64 in FIG. 25).

Note that acquisition of the exchange contract data, which took place in step S51 in FIG. 25, may alternatively take place earlier than step S62, so that the exchange contract data may be acquired for example in step S52. For the case where an advanced level of security is not necessary, the authentication of the value storage unit 13 (steps S61, S52 in FIG. 25) may be omissible.

Next, procedures of recovering the terminal 1c in case of communication failure occurred in the first step of exchange according to the seventh embodiment of the present invention will be explained referring to FIG. 26.

Figure 26:
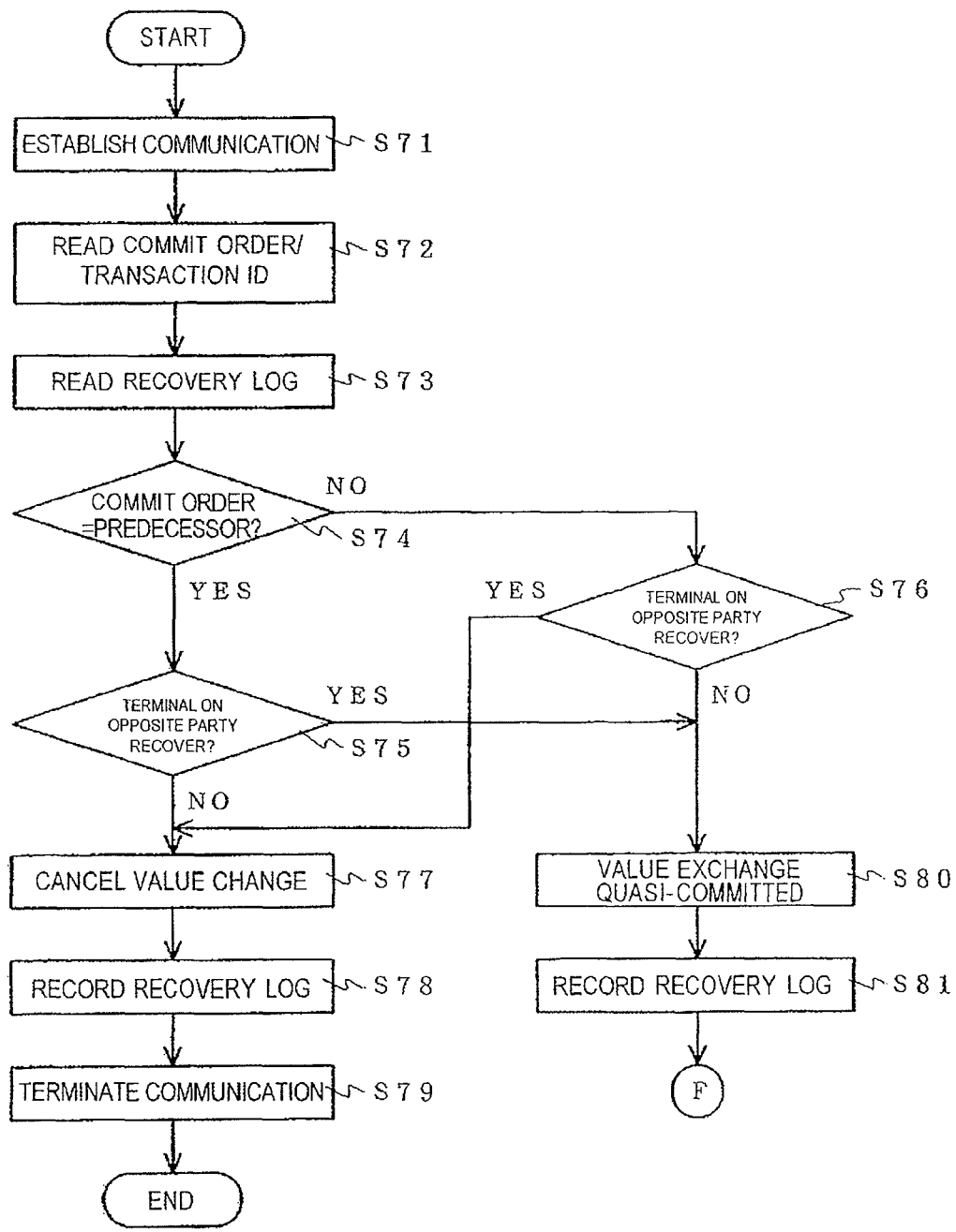
FIG. 26 is a flow chart illustrating value recovery operation according to the seventh embodiment of the present invention.

First, the terminal 1c establishes connection with the authentication/recovery device 110 and executes the recovery of steps S71 to S76 in FIG. 26. These steps are similar to those in the recovery according to the first embodiment of the present invention (steps S21 to S26 in FIG. 8), so that the detailed explanation will not be repeated.

If the authentication/recovery device 110 decides cancellation of the value exchange in steps S75, S76 in FIG. 26, the value of the exchange state storage unit 16 is changed so as to represent the commit state (step S77 in FIG. 26). The authentication/recovery device 110 stores the event of recovery of the terminal 1c with respect to the transaction ID into the recovery log database 112 (step S78 in FIG. 26), and finally terminates the communication (step S79 in FIG. 26), to thereby complete the recovery.

On the other hand, when the authentication/recovery device 110 decides commit of the value exchange in steps S75, S76, the value of the exchange state storage unit 16 is changed so as to represent the quasi-commit state (step S80 in FIG. 26). The authentication/recovery device 110 then stores the transaction ID into the recovery log database 112 (step S81 in FIG. 26), and succeedingly executes the second step of exchange.

In other words, the terminal 1c executes the processes of step S51 in FIG. 25 and thereafter. Note that the process in the second step may alternatively be executed by once interrupting the communication between the terminal 1c and the authentication/recovery device 110, and the terminal 1c may again establish connection with the authentication/recovery device 110 at a suitable point of time, to thereby execute the processes of step S51 in FIG. 25 and thereafter.

The exchange state storage unit 16 of the terminal 1c in the seventh embodiment of the present invention may have three states, which include the commit state representing a normal state before the exchange, the commit-ready state representing a preliminary stage for committing the exchange contract, and the quasi-commit state representing a state after the exchange contract is committed. The above-described recovery is, however, executed on the terminal 1c in which the value of the exchange state storage unit 16 has been remained in the commit-ready state, due to occurrence of communication failure, and is therefore not directed to the terminal 1c having been turned into the commit state or in the quasi-commit state.

In other words, the recovery will be unnecessary if the value of the exchange state storage unit 16 in case of communication failure was found to represent the commit state, whereas the processes of step S51 in FIG. 25 and thereafter, which are in the second step of the normal exchange, will be executed if the value was found to represent the quasi-commit state.

On the other hand, another possible method, in case of communication failure, may be such as establishing connection between the terminal 1c and the authentication/recovery device 110, irrespective of the value of the exchange state storage unit 16. In this case, one possible method may be such as, for example, checking the value of the exchange state storage unit 16 after step S71 in FIG. 26, and allowing the terminal to make transition to step S79 without needing recovery if the value was found to represent the commit state, or executing the processes of step S51 in FIG. 25 or thereafter, which are in the second step of the normal exchange, if the value was found to represent the quasi-commit state.

FIG. 27 is a drawing illustrating values (states) of the exchange state storage unit 16 in case of communication failure in the seventh embodiment of the present invention. FIG. 27 illustrates relations between points of occurrence of communication failure "E11" to "E15" in FIG. 24, the states of the exchange state storage unit 16d of the terminal 1d having the commit order committed as "predecessor", and the states of the exchange state storage unit 16e of the terminal 1e having the commit order committed as "successor".

For an exemplary case where communication failure should occur typically in the period between the start of communication and "E11" in FIG. 23 and FIG. 24, or between the start of communication and the point of time immediately before step S36, the exchange state storage units 16d, 16e will be brought into the commit state in both of the terminal 1d and the terminal 1e having the commit orders committed as "predecessor" and "successor", respectively, as illustrated in FIG. 27.

The relation between FIG. 27 and FIGS. 23, 24 is similar to that between FIG. 9 and FIGS. 6, 7. As a consequence, in case of communication failure at "E12", "E13" or "E14" where at least either one of the exchange state storage units 16d, 16e is remained in the commit-ready state, the value exchange by the terminal having been brought into the commit-ready state is canceled or committed referring to the criteria illustrated in FIG. 10, based on the commit order stored in the terminal having been brought into the commit-ready state, and a history of past recovery.

In short, the value of the exchange state storage unit of the relevant terminal is changed so as to represent the commit state in the former case, and so as to represent the quasi-commit state for the latter case. Even if such process is independently executed by each of the terminals 1d, 1e, the state of value exchange in both terminals 1d, 1e, or the exchange state storage units 16d, 16e, can be successfully recovered without inconsistency.

By the processing described in the above, in case of communication failure in the first step of exchange, the state of value exchange may be allowed to make transition (commit state or quasi-commit state) without causing any inconsistency, even if the terminals 1d, 1e are unable to be re-connected. The reason why is the same as described previously in the first embodiment of the present invention.

In case of communication failure in the second step of exchange, the terminal 1c may be good enough to execute the exchange in the second step again. In other words, the terminal 1c again executes the processes of step S51 in FIG. 25 and thereafter. Note that, if the communication failure occurred at a point of time after step S53 in FIG. 25 and thereafter, the data in the value storage unit 13 has already been rewritten, so that in consideration thereof, an appropriate rewriting typically as described below is executed.

More specifically, in the exchange in the second step, the terminal 1c judges whether the execution of this process is the second or thereafter, by storing, immediately after step S51 in FIG. 25, the transaction ID produced in steps S33, S43 in FIG. 23, and exchange contract data in the authentication/recovery device 110, and if the execution was found to be the second or thereafter, the authentication/recovery device 110 reads the data in the value storage unit 13 immediately before step S62 in FIG. 25, and judges whether the data has been rewritten in the latest execution, and actually rewrites the data only when rewriting is necessary in the current processing.

As has been described in the above, in this embodiment, even if the process is executed again in case of communication failure in the second step of exchange, the values of the value storage units 13d, 13e of the terminals 1d, 1e may not become inconsistent with each other (one terminal completes the exchange, but the other cancels the exchange). This is because the exchange contract of the value may be determined in both terminals, when the value of the exchange state storage unit 16 of the terminal 1c is changed to represent the quasi-commit state, upon normal completion of the first step of exchange, or when the value of the exchange state storage unit 16 is changed to represent the quasi-commit state, by executing step S80 in FIG. 26, as a result of recovery after occurrence of communication failure in the first step.

Note that the value storage unit 13 of the terminal having been brought into the commit-ready state or into the quasi-commit state is not accessible by any new operations (new process of value transfer or the like), until it is brought into the commit state by committing or canceling the value exchange. In other words, in the first step of exchange, the terminal having the value storage unit 13 remained in the commit-ready state due to communication failure, and the terminal remained in the quasi-commit state because the second step of exchange has not completed therein, are not available (until they complete the second step of exchange by establishing connection with the authentication/recovery device 110). This is because any operation, made on the value storage unit 13 of the terminal before completion of the exchange, may result in the contradictory state.

While the description in the above explained a configuration having only a single authentication/recovery device 110 used therein, another possible configuration may be such as providing a plurality of authentication/recovery servers having no recovery log storage units, in place of the authentication/recovery device 110, just like in the second embodiment of the present invention, and separately providing a single recovery log management device having a recovery log storage unit.

While the description in the above explained that the second step of exchange and recovery are executed by the authentication/exchange execution unit 114 and the recovery execution unit 112, these processes may alternatively be executed by an authentication/exchange/recovery execution unit provided in place of the exchange execution unit 12 of the terminal 1c, while providing no authentication/exchange execution unit 114 and no recovery execution unit 112 to the authentication/recovery device 110, just like in the third embodiment of the present invention.

Next, effects of this embodiment will be explained. In this embodiment, first the terminals 1d, 1e are connected each other to thereby start the value exchange, the exchange contract of value is committed, each the terminals 1d, 1e then respectively establishes connection with the authentication/recovery device 110, the authentication/recovery device 110 appropriately authenticates the value storage units 13d, 13e and rewrites the data. In this way, even if the data of the value storage units 13d, 13e of the terminals 1d, 1e are not rewritable by the terminal alone, the value exchange may be committed when the communication is terminated firstly by establishing connection between the terminals, just like in the first to sixth embodiments of the present invention where the data is rewritable by the terminal alone.

Also by committing the value of the exchange contract in the first step of exchange, the value exchange may be committed between the terminals, even if the data of the value storage units 13d, 13e of the terminals 1d, 1e is not rewritable by the terminal alone, and even in a situation where the authentication/recovery device 110 which stores the authentication information is incapable of communicating with the terminal 1c typically when they are out of the range of communication of a public wireless network. In this case, the terminal 1c executes the second step of exchange when the communication with the authentication/recovery device 110 is enabled, and terminates the exchange.

Figure 31:
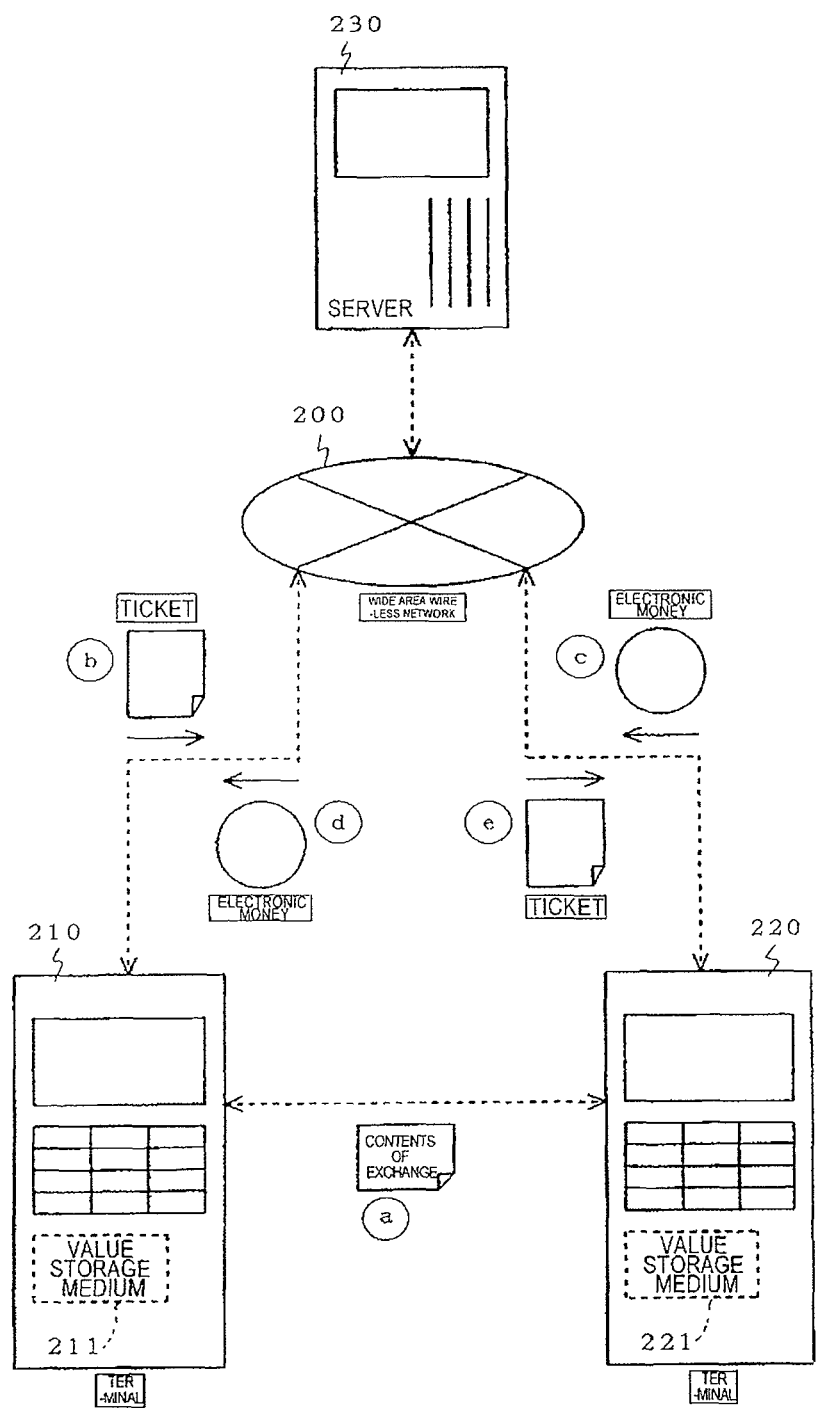
FIG. 31 is a block diagram illustrating an exemplary configuration of an electronic value exchange system of the related art.

In addition, according to a technique using a value exchange system which exchanges value between two terminals through a server, relevant to the present invention as illustrated in FIG. 31, communication is establishes between the terminal devices, each of the terminal devices then established connection to the server to thereby transfer the value to be exchanged to the server, the server then sends a message to the terminal devices. Upon re-connection of the terminal devices to the server, the value to be exchanged is transferred to the terminal device, and thereby the exchange completes.

In contrast to the value exchange system relevant to the present invention which requires complicated procedures before completion of the exchange as described in the above, this embodiment successfully produces an effect of enabling value exchange by more simple procedures, since the terminals 1d, 1e are connected to the authentication/recovery device 110 only once after the exchange contract data is firstly transmitted or received between the terminals 1d, 1e, and thereby the number of times of communication between the server and the terminals may be reduced.

In addition, according to a technique using a value exchange system relevant to the present invention as illustrated in FIG. 31, the exchange is not committed unless the terminal of the opposite party establishes connection to the server and completes the value transfer. The value exchange is, however, not guaranteed to be smoothly finished if, for example, the user of the opposite party is not cooperative. Accordingly, there is no guarantee that the value of the own terminal is immediately brought into a state where the value may immediately be dealt.

In contrast, according to this embodiment, the value exchange may be committed upon termination of communication between the terminals 1d, 1e in the first step of exchange. In particular, the communication may be completed generally within an extremely short time if the communication between the terminals 1d, 1e are made using a near field wireless communication unit, and thereby an effect that the value exchange may be committed in situ in the communication may be obtained. In addition, since the second step of exchange may be executed without waiting for the terminal of the opposite party, so that the own terminal may successfully be brought into a state where the value may immediately be dealt.

Figure 28:
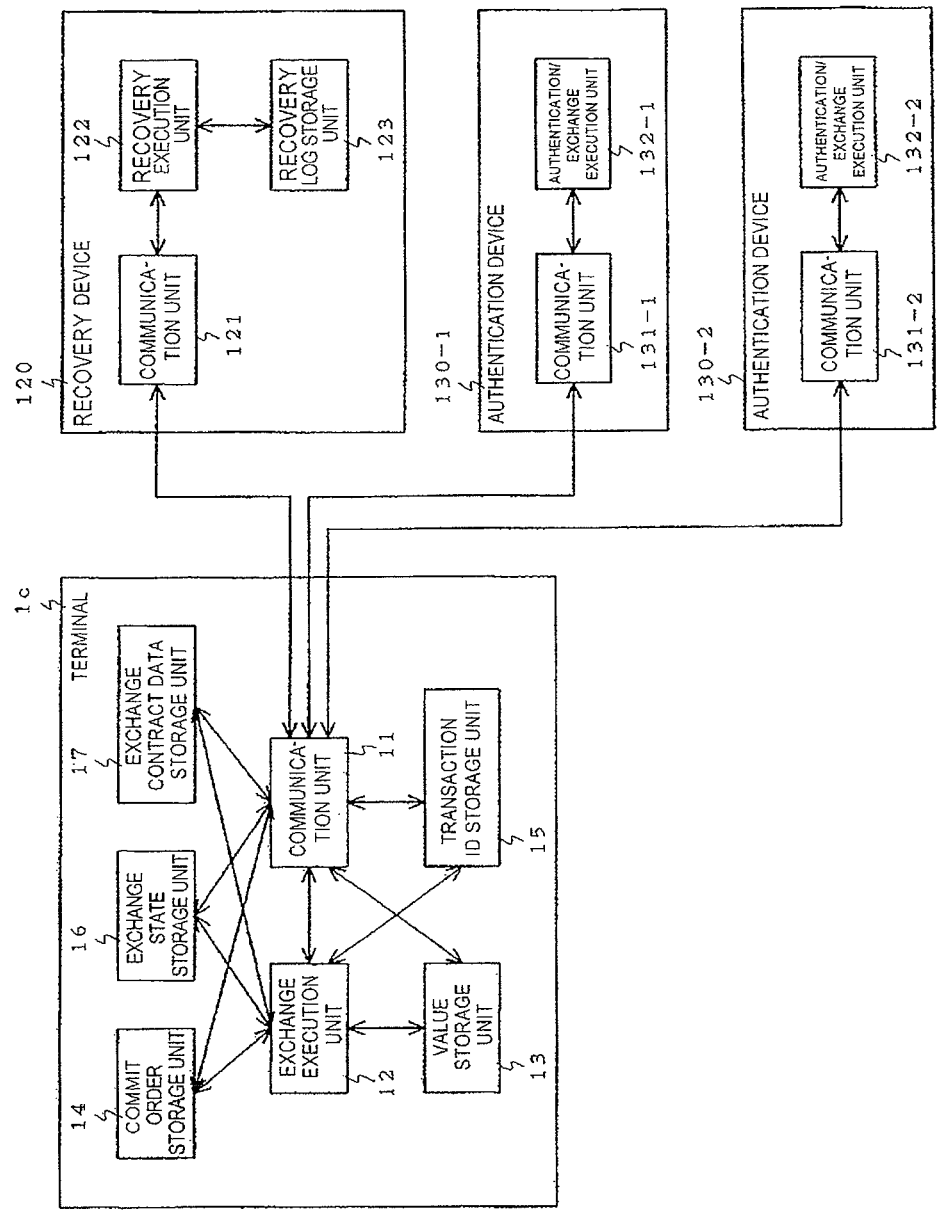
FIG. 28 is a drawing illustrating value transfer operation of an electronic value exchange system according to an eighth embodiment of the present invention.

FIG. 28 is block diagram drawing illustrating an exemplary configuration of an electronic value exchange system according to the eighth embodiment of the present invention. The electronic value exchange system according to the eighth embodiment of the present invention illustrated in FIG. 28 is different from the seventh embodiment of the present invention illustrated previously in FIG. 20 and FIG. 21, in that the authentication/recovery device 110 is separated into a recovery device 120 and a plurality of authentication devices 130-1, 130-2.

The authentication device 130-1 has authentication information which is necessary for rewriting a specific value stored in the value storage unit 13, and the authentication device 130-2 similarly has authentication information which is necessary for rewriting other different specific value. This corresponds typically to the case where a business provider who provides the electronic ticket service, and a business provider who provides the electronic money service are independent from each other, so that an authentication server is provided to each of the business provider. Note that, in the configuration illustrated in FIG. 28, all constituents identical to those in FIG. 20 and FIG. 21 are given the same reference numerals or symbols. The number of authentication devices may be increased or decreased, depending on needs.

When the electronic ticket and the electronic money are exchanged, operations by the user and the procedures up to that both terminals (assumed herein as the terminals 1d, 1e) are brought close to each other so as to enable communication therebetween and so as to execute mutual authentication, in other words, the first step of exchange, are same as those in the above-described seventh embodiment of the present invention. Therefore, the paragraphs below will explain the second step of exchange executed thereafter.

The terminals 1d, 1e terminate the communication therebetween, and then establish communication respectively with the authentication devices 130-1, 130-2 in order to rewrite the data in the value storage units 13d, 13e, as the second step of exchange. Paragraphs below will explain one terminal out of the terminals 1d, 1e as the terminal 1c.

When the terminal 1c establishes connection and communication with the authentication device 130-1, the authentication/exchange execution unit 132-1 of the authentication device 130-1 acquires the exchange contract data from the exchange contract data storage unit 17 of the terminal 1c, and executes appropriate exchange based on the contents thereof. Typically, the authentication/exchange execution unit 132-1 reads the authentication information out from the authentication information storage unit (not illustrated), and authenticates the value storage unit 13 of the terminal 1c.

Next, the authentication/exchange execution unit 132-1 of the authentication device 130-1 appropriately rewrites the data in the value storage unit 13, and lastly terminates the connection with the terminal 1c. The authentication device 130-1 herein is provided to deal the electronic ticket, and deals the electronic ticket stored in the value storage unit 13.

Next, the terminal 1c establishes connection with the authentication device 130-2, and upon establishment of communication therebetween, the authentication/exchange execution unit 132-2 of the authentication device 130-2 receives the exchange contract data from the terminal 1c, and executes appropriate exchange based on the contents thereof. Typically, the authentication/exchange execution unit 132-2 reads the authentication information from the authentication information storage unit (not illustrated), and authenticates the value storage unit 13 of the terminal 1c.

The authentication/exchange execution unit 132-2 of the authentication device 130-2 then appropriately rewrites the data in the value storage unit 13, and lastly terminates the communication with the terminal 1c. The authentication device 130-2 herein is provided to deal the electronic money, and deals the electronic money stored in the value storage unit 13.

By the operations described in the above, the exchange relevant to the terminal 1c completes. The entire process of the value exchange between the terminals 1d, 1e (herein means exchange of the electronic ticket and the electronic money) is completed, by the above described operations independently executed by each of the terminals 1d, 1e.

Note that, in the second step of exchange described in the above, the order of establishing connection of each of the terminals 1d, 1e to the authentication devices 130-1, 130-2 may respectively be inverted. More specifically, the connection may be established in the order of authentication devices 130-2, 130-1. The terminals 1d, 1e may be good enough to establish communication with the authentication devices 130-1, 130-2, respectively at a convenient point of time.

Next, operations in the value recovery in case of communication failure occurred in the electronic value exchange system according to the eighth embodiment of the present invention will be explained, referring to FIG. 28.

In case of communication failure occurred in the process of the first step of value exchange, the exchange execution unit 12 controls the communication unit 11 while being triggered typically by an operation by the user, and sets a communication path between itself and the communication unit 121 of the recovery device 120. Note that operation of connecting the terminal 1c with the recovery device 120 (such as connecting them with a cable, or such as bringing the terminal 1c and the recovery device 120 close to each other in an area where wireless communication is available) may alternatively be adoptable in place of the operation by the user. Still alternatively, in case of communication failure in the process of value exchange, the terminal 1c may automatically be connected to the recovery device 120 through wireless communication or the like, irrespective of the operation by the user.

Next, the recovery execution unit 122 makes reference to the commit order storage unit 14 and the transaction ID storage unit (identification information storage unit) 15 through the communication unit 121 and the communication unit 11 of the terminal 1c, and acquires the commit order and the transaction ID in the value exchange in which the communication failure has occurred.

The recovery execution unit 122 further makes reference to the recovery log storage unit 123 based on the transaction ID, and confirms whether the other terminal has been previously restored in the recovery process identified with the transaction ID.

Based on the commit order and presence or absence of the past recovery, the recovery execution unit 122 decides whether the value of the exchange state storage unit 16 should be changed into the commit state without any change of data, or should be changed into the commit state after restoring the data before the value exchange, and executes the decision. The recovery execution unit 122 finally records the event of recovery into the recovery log storage unit 123. Note that the authentication/recovery device 120 to which an arbitrary terminal 1c is connected for recovery should always be the same. In other words, two or more authentication/recovery device 120 are not permissible, and must be only one.

On the other hand, in case of communication failure occurred in the second step of the exchange, the terminal 1c establishes connection with either of the authentication device 130-1 and the authentication device 130-2, having been communicated therewith when the communication failure occurred, re-executes the second step of exchange, and continues the process.

Figure 29:
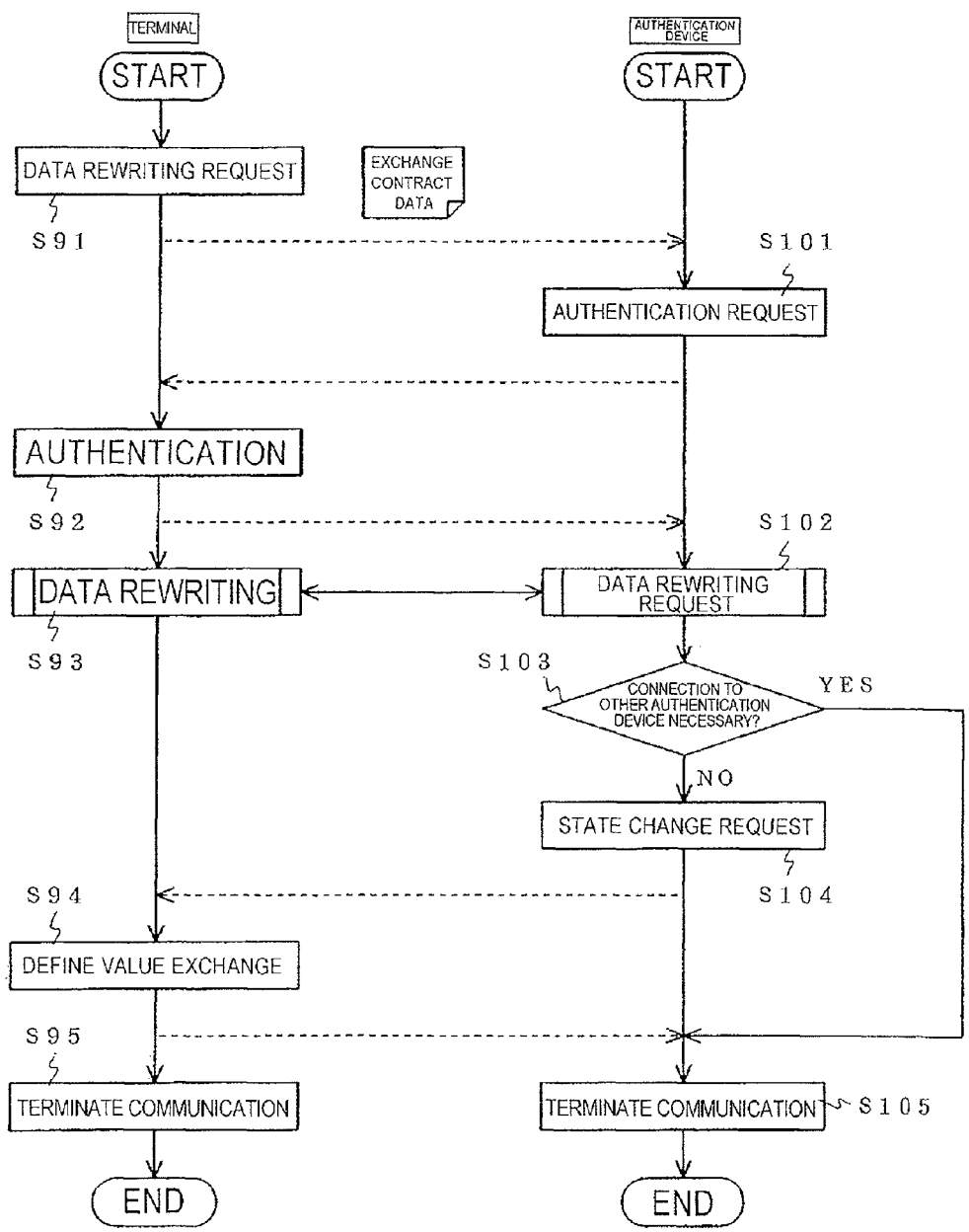
FIG. 29 is a flow chart illustrating value transfer operation according to the eighth embodiment of the present invention.
Figure 30:
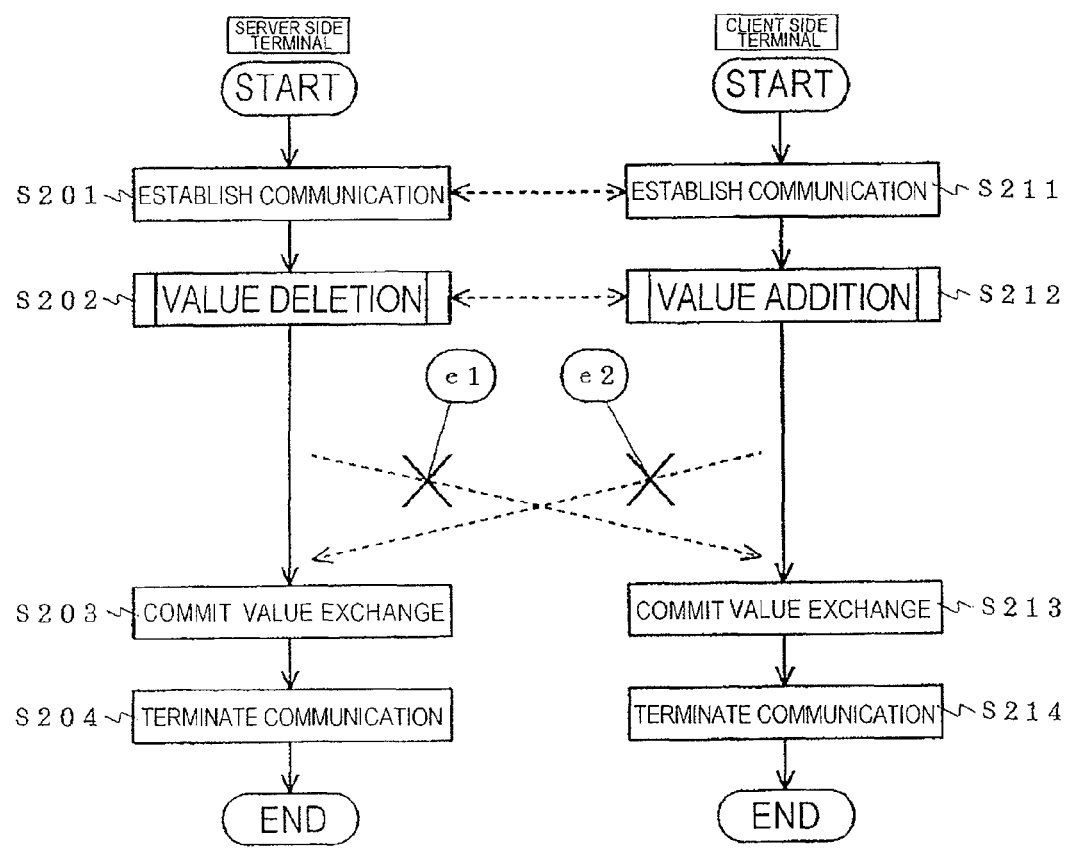
FIG. 30 is a sequence chart illustrating value transfer operation of an electronic value exchange system of a related art.

FIG. 29 is a flow chart illustrating operations of the second step of value exchange according to the eighth embodiment of the present invention. Since the exchange contract process of the value between two terminals 1d, 1e, which corresponds to the first step of exchange, is similar to that in the seventh embodiment of the present invention illustrated in FIG. 23 and FIG. 24, so that the details thereof will not be repeated. The processes illustrated in FIG. 29 may be embodied by processing units (CPUs and so forth) incorporated in the terminal 1d, 1e, and in the authentication device 130-1, 130-2, when they execute a program.

Paragraphs below will explain rewriting of the data in the value storage unit 13 of the terminal 1c by the authentication devices 130-1, 130-2, which corresponds to the second step of exchange described in the above, referring to FIG. 29.

The terminal 1c, which has completed the first step of exchange and thereby has been brought into the contract commit state, establishes connection with the authentication device 130-1, and issues a request of rewriting data in the value storage unit 13 (step S91 in FIG. 29).

When the terminal 1c issues the request of rewriting data to the authentication device 130-1, the authentication device 130-1 authenticates the value storage unit 13 (steps S101, S92 in FIG. 29). If the authentication succeeds, the authentication device 130-1 then operates the value storage unit 13, and appropriately rewrites data based on the exchange contract data acquired from the terminal 1c (steps S102, S93 in FIG. 29). These processes are similar to general value processing, such as a process between an IC card and a reader/writer, so that the processes herein will not be detailed.

While the rewriting of the data in the value storage unit 13 completes by the operations described in the above, the terminal 1c needs thereafter to establish connection with another authentication device 130-2 for processing, so that the terminal 1c then decides in step S103 to skip execution of steps S104, S94, and terminates the communication between the terminal 1c and the authentication device 130-1 (steps S95, S105 in FIG. 29).

Next, the terminal 1*c* establishes connection with the authentication device 130-2, and issues a request of rewriting data in the value storage unit 13. Thereafter, the processes of steps S91 to S93, S101, S102 are executed similarly to those between the terminal 1*c* and the authentication device 130-1. In step S103, the value of the exchange state storage unit 16 is changed so as to represent the commit state (steps S104, S94 in FIG. 29), since the terminal 1*c* is no longer necessary to establish connection with the other authentication device. The terminal 1*c* then terminates the connection with the authentication device 130-2, and completes the second step of value exchange (steps S95, S105 in FIG. 29).

Note that acquisition of the exchange contract data, which took place in step S91 in FIG. 29, may alternatively take place earlier than step S93, so that the exchange contract data may be acquired for example in step S92. For the case where an advanced level of security is not necessary, the authentication of the value storage unit 13 (steps S101, S92 in FIG. 29) may be omissible.

Next, procedures of recovering the terminal 1*c* incase of communication failure occurred in the first step of exchange according to the eighth embodiment of the present invention will be explained. When communication failure occurs in the first step, the terminal 1*c* establishes connection with the authentication/recovery device 120 and executes the processes similar to those according to the seventh embodiment procedures of the present invention. These processes are similar to those illustrated in FIG. 26, so that the detailed explanation will not be repeated. The eighth embodiment of the present invention is, however, different in that in the processes after step S81 in FIG. 26 (processes after "F"), the terminal 1*c* establishes connection with the authentication devices 130-1, 130-2, and executes the processes illustrated in FIG. 29, which are the processes of the second step of exchange.

If communication failure occurs in the second step of exchange in the eighth embodiment of the present invention, the terminal 1*c* may be good enough to re-execute the second step of exchange. Also this aspect is similar to that in the procedures of recovery in the seventh embodiment of the present invention, so that the details will not be repeated.

While the description in the above explained a configuration having only a single recovery device 120 used therein, another possible configuration may be such as providing a plurality of recovery servers having no recovery log storage units, in place of the recovery device 120, just like in the second embodiment of the present invention, and separately providing a single recovery log management device having a recovery log storage unit.

While the description in the above explained that the second step of exchange and recovery are executed by the authentication/exchange execution units 132-1, 132-2 and the recovery execution unit 122, these processes may alternatively be executed by an authentication/exchange/recovery execution unit provided in place of the exchange execution unit 12 of the terminal 1*c*, while providing no authentication/exchange execution unit to the authentication device 130-1, 130-2, and while providing no recovery execution unit 122 to the recovery device 120, just like in the third embodiment of the present invention.

Next, effects of this embodiment will be explained. According to this embodiment, even for the case where the authentication information cannot be stored in a single authentication device, such as for the case where a plurality of authentication information managed by a plurality of business providers are used, the plurality of authentication information may be stored in separate authentication devices, so as to ensure the value exchange.

In addition, when the terminals 1*d*, 1*e* establish connection one by one with a plurality of authentication devices in order to rewrite the data in the storage units 13*d*, 13*e*, each of the terminals 1*d*, 1*e* may independently establish connection at an arbitrary point of time in an arbitrary order to the individual authentication devices, without need of waiting connection of the terminal of the opposite party to the authentication device.

As described in the above, the electronic value exchange system of the present invention is composed of the terminal devices which hold the value, and the recovery device which takes part in recovery of value in case of communication failure occurred in the process of value transfer or value exchange between the terminal devices.

Each terminal device is composed of the value storage unit which stores the value, the communication unit which takes part in communication with other terminal device, the exchange execution unit which executes value transfer and value exchange, the transaction ID storage unit which stores the transaction ID assigned to every process of exchange, and the commit order storage unit which stores the commit order of operations made on the value storage units. The recovery device has the communication unit which takes part in communication with the terminal devices, the recovery execution unit which takes part in recovery, and the recovery log storage unit which stores a history of past recovery.

In the process of value transfer and value exchange between the terminals, the value storage unit of each terminal may have three states, which include the commit state representing a normal state before the value change, an uncommitted state representing a state during value change, and the commit-ready state representing a preliminary stage after completion of the value change and before commit of the change. The value storage unit in the commit-ready state may be brought not only into the commit state after committing the value, but also back into the commit state which represents the state before the value change, reversely by canceling the value.

When the value transfer or value exchange starts between the terminal devices, the exchange execution units of the individual terminal devices deal the value in the value storage units while keeping communication therebetween, and allow the storage units to make state transition through the uncommitted state and the commit-ready state, finally to the commit state of the value change, and complete the process.

In advance of execution of the above described process, the commit order which indicates that which of two terminal devices is the first to make transition into the commit-ready state is decided, and the result of decision (commit order) is preliminarily stored into the commit order storage unit. According to this order, in the present invention, the value storage unit of one terminal device is allowed to make transition into the commit-ready state, the value storage unit of the other terminal device is allowed to make transition into the commit-ready state, the value storage unit of the terminal device having been allowed to make transition into the commit-ready state earlier is then allowed to make transition into the commit state, and finally the other value storage unit is allowed to make transition into the commit state.

If communication failure should occur in this process, and if the value storage unit of the terminal device is in the uncommitted state, the system of the present invention cancels the value change, and returns the value storage unit into the state before the transfer. On the other hand, if the value storage unit is in the commit-ready state, the system of the present invention establishes connection of the terminal device with the recovery device, and recovers the states of the value storage units into a state which is consistent between both terminal devices. In this case, the recovery device recovers the state of the value storage units into a consistent state between both terminal devices, whichever of two terminal devices establishes connection earlier with the recovery device.

In short, according to the electronic value exchange system of the present invention, the recovery execution unit of the recovery device reads the commit order of the value storage stored in the commit order storage unit of the terminal device out therefrom, and confirms whether the recovery device has ever recovered the other terminal, referring to the recovery log storage unit. The recovery execution unit uniquely decides whether the value storage unit should be brought into the commit state after canceling the value change, or should directly be brought into the commit state, based on the commit order, and presence or absence of the recovery.

The electronic value exchange system according to another embodiment of the present invention is composed of the terminal devices which hold the value, the authentication device used for authentication between itself and the value storage units of the terminal devices, and is used for rewriting the value held in the value storage units, and the recovery device used for recovering the value, in case of communication failure in the process of communication between the terminal devices.

Each terminal device is composed of the value storage unit which stores the value, the communication unit which takes part in communication with other terminal device, the exchange execution unit which executes value transfer and value exchange, the transaction ID storage unit which stores the transaction ID which is assigned to every process of transfer or exchange, the commit order storage unit which stores the commit order of value exchange, the exchange state storage unit which stores the state of value exchange, and the exchange contract data storage unit which stores the exchange contract data.

The authentication device has a communication unit which takes part in communication with the terminal devices, and the authentication/exchange execution unit which appropriately rewrites the contents of the value storage unit according to the contents of the exchange contract data storage unit, and executes the exchange. The recovery device has a communication unit which takes part in communication with the terminal devices, the recovery execution unit which takes part in recovery, and the recovery log storage unit which stores a history of past recovery.

The value exchange between the terminal devices is proceeded by executing the first step in which the exchange contract data, which promises to execute process for the value exchange later, is transmitted/received between the terminal devices, and the second step in which communication is established between the terminal devices and the authentication device, to thereby rewrite the values in the value storage units based on the exchange contract data.

In the process of value transfer or value exchange between the terminal devices, each terminal device may have three states, which include the commit state representing a normal state before the value exchange, the commit-ready state representing a preliminary stage for committing the exchange contract by transmitting/receiving the exchange contract data between the terminal devices, and the quasi-commit state representing a preliminary stage after the exchange contract is committed, and before the data in the value storage unit is rewritten based on the exchange contract data. The terminal device in the commit-ready state may be brought not only into the quasi-commit state after committing the exchange contract, but also back into the commit state which represents the state before the value exchange is started, reversely by canceling the exchange contract.

When the value exchange starts between the terminal devices, the exchange execution units of the individual terminal devices transmit/receive the exchange contract data while keeping communication therebetween, the values of the exchange state storage units are changed to represent the commit-ready state and the quasi-commit state, and the communication between the terminal devices is terminated to complete the first step of exchange. In the present invention, at this point of time, the value is exchanged between two terminal devices based on the exchange contract data, that is, the exchange contract is committed.

In advance of execution of the above described process, the commit order which indicates that which of two terminal devices is the first to make transition into the commit-ready state is decided, and the result of decision (commit order) is preliminarily stored into the commit order storage unit. According to this order, in the present invention, the value storage unit of one terminal device is allowed to make transition into the commit-ready state, the value storage unit of the other terminal device is allowed to make transition into the commit-ready state, the value storage unit of the terminal device having been allowed to make transition into the commit-ready state earlier is then allowed to make transition into the quasi-commit state, and finally the other value storage unit is allowed to make transition into the quasi-commit state.

If communication failure should occur in this process, and if the value of the exchange state storage unit of the terminal device is in the commit state, the system of the present invention cancels the exchange contract, and returns the exchange state storage unit into the state before the transfer. On the other hand, if the exchange state storage unit is in the commit-ready state, the system of the present invention establishes connection of the terminal device with the recovery device, and recovers the exchange states of the terminal devices, or, the values of the exchange state storage units, into a state which is consistent between both terminal devices. In this case, the recovery device recovers the values of the exchange state storage units into a state consistent between both terminal devices, whichever of two terminal devices is allowed to establish connection earlier with the recovery device.

When the values of the exchange state storage units are changed to represent the quasi-commit state, and thereby the first step of exchange completes, the exchange execution units of the individual terminal devices respectively establish communication with the authentication device, deal the values based on the exchange contract data transmitted/received to or from the other terminal device, after the authentication device executes authentication between itself and the value storage units, and finally change the values in the exchange state storage units so as to represent the commit state, to thereby complete the second step of exchange. After the values in the exchange state storage units are changed to represent the quasi-commit state in the first step of exchange, whichever terminal device may be the first to execute the second step.

Since the value exchange between two terminal devices is committed at the point of time when the first step of exchange completes, and the values in the exchange state storage units are changed to represent the quasi-commit state, so that, if communication failure should occur in the process of the second step of exchange, the terminal devices may be good enough to re-execute the second step of exchange.

In short, according to the present invention, the exchange execution units of the terminal devices re-establish communication with the authentication device, and after the values in the value storage units are appropriately dealt by the authentication device, the exchange execution units change the values in the exchange state storage units so as to represent the commit state, to thereby complete the second step of exchange. As is clear from the above, according to the present invention, the states of exchange may not become inconsistent between the terminal devices, even if the second step of exchange is re-executed.

In the electronic value exchange system of the present invention, according to a series of procedures described in the above, even if one terminal device does not establish connection with the recovery device in case of communication failure, the state of the value storage unit of the other terminal device may be recovered to give a state without causing inconsistency between both terminals.

By virtue of the above-described configuration and operations, the present invention raises an effect of recovering the state of values in two terminal devices into a consistent one, even if the terminal devices are not successfully re-connected with each other in case of communication failure in the process of value transfer or value exchange between both terminal devices.

By virtue of the above-described configuration and operations, the present invention also raises an effect of smoothly committing the value exchange, when a server is used for the value exchange between two terminal devices.

[Industrial Usability]

The present invention may be applicable typically to mobile terminals among which the electronic value is transferred or exchanged. The present invention is applicable also to mobile terminals which hold the electronic value, and service terminals such as ticket vending machines, entrance gates, and personal computers, which offer the electronic value or receive the electronic value, to or from the mobile terminals.

The present invention is also applicable to IC cards which hold the electronic value, and service terminals such as ticket vending machines, entrance gates, and personal computers, which offer the electronic value or receive the electronic value, to or from the mobile terminals.

The present invention is still also applicable to terminals such as personal computers which hold music contents and movie contents, and terminals such as portable players which use the contents downloaded therefrom.

This application claims priority based on Japanese patent application No. 2007-301131 filed on Nov. 21, 2007, the content of which is incorporated hereinto by reference.

The invention claimed is:

1. An electronic value exchange system comprising:
   first and second terminals each of which comprises a processor, wherein the processors of the first and second terminals control the execution of electronic value exchange between the first and second terminals,
   an authentication device,
   a recovery log storage unit, and
   a recovery execution unit,
   wherein each of said first and second terminals comprises:
      a value storage unit which stores said electronic value;
      an exchange contract data storage unit which stores exchange contract data representing contents of said electronic value exchange;
      an exchange state storage unit which represents a state of said electronic value exchange;
      a commit order storage unit which stores a commit order which indicates which of said first terminal and said second terminal is first to execute state change in said exchange state storage unit, into any one of a commit state representing a normal state before modification of said electronic value, a commit-ready state representing a state after completion of transmission and reception of said exchange contract data and before the exchange contract is committed, and a quasi-commit state representing a state after said exchange contract is committed;
      an identification information storage unit which stores identification information assigned to the transmission and to the reception of said exchange contract data; and
      a first exchange execution unit which decides said commit order and stores it into said commit order storage unit, decides said identification information and stores it into said identification information storage unit, executes the transmission and the reception of said exchange contract data between itself and each of said first and second terminals and stores it into said exchange contract data storage unit, in a first operation changes the state of said exchange state storage unit of said terminal having the commit order committed as predecessor to the commit-ready state, in a second operation after completing the first operation changes the state of said exchange state storage unit of said terminal having an commit order committed as successor to the commit-ready state, in a third operation after completing the second operation changes the state of said exchange state storage unit of said terminal committed as predecessor to the quasi-commit state, and in a fourth operation after completing the third operation changes the state of said exchange state storage unit of said terminal committed as successor to the quasi-commit state,
   wherein said authentication device includes a second exchange execution unit which acquires said exchange contract data from either one of said first and second terminals, and operates said value storage unit of said one terminal when said exchange state storage unit of said one terminal is in the quasi-commit state, to thereby change the state of said exchange state storage unit of said one terminal into the commit state,
   wherein said recovery log storage unit stores the identification information of the terminal that has performed a recovery; and
   wherein said recovery execution unit acquires a state of said value storage unit of said first terminal, and if the state represents said commit-ready state, performs:
      acquiring the commit order recorded in said commit order storage unit of said first terminal;
      checking whether or not the recovery log storage unit stores the identification information of said second terminal;
      executing cancellation of said exchange contract of said first terminal if the commit order which the recovery log storage unit does not stores the identification information of said second terminal;
      executing cancellation of said exchange contract of said first terminal if the commit order which the recovery execution unit acquires represents that said first terminal is not the first to execute state change and if said recovery log storage unit stores the identification information of said second terminal;
      executing commit of said exchange contract of said first terminal if the commit order which the recovery execution unit acquire represents that said first terminal is first to execute state change and if said recovery log storage unit stores the identification information of said second terminal; and executing commit of said exchange contract of said first terminal if the commit which the recovery execution unit acquires represents that said first terminal is not the first to execute state change and if said recovery log storage unit does not stores the identification information of said second terminal.

2. The electronic value exchange system as claimed in claim 1,
wherein the recovery execution unit is included in the authentication device.

3. The electronic value exchange system as claimed in claim 1, including a plurality of said authentication device.

4. The electronic value exchange system as claimed in claim 1,
wherein said first and second terminals are represented by at least either a mobile terminal, or a combination of a portable recording medium and a device which executes read/write with respect to the recording medium.

5. A method of exchanging electronic value comprising at least executing electronic value exchange between first and second terminals,
wherein each of said first and second terminals comprises a processor controlling the operations of:
storing, into a commit order storage unit, a commit order which indicates that which of said first terminal and said second terminal is first to execute state change into any one of a commit state representing a normal state before modification of said electronic value, a commit-ready state representing a state after completion of transmission and reception of said exchange contract data and before the exchange contract is committed, and a quasi-commit state representing a state after said exchange contract is committed; and
storing identification information assigned to the transmission and to the reception of said exchange contract data into an identification information storage unit, executes the transmission and the reception of said exchange contract data with respect to each of said first and second terminals, stores it into an exchange contract data storage unit, in a first operation changes the state of an exchange state storage unit of said terminal having a commit order committed as predecessor to the commit-ready state, in a second operation after completing the first operation changes the state of said exchange state storage unit of said terminal having an commit order committed as successor to the commit-ready state, in a third operation after completing the second operation changes the state of said exchange state storage unit of said terminal committed as predecessor to the quasi-commit state, in a fourths operation after completing the third operation changes the state of said exchange state storage unit of said terminal committed as successor to the quasi-commit state, and
acquiring said exchange contract data from either one terminal out of said first and second terminals, executes said electronic value exchange by operating a value storage unit of said one terminal when said exchange state storage unit of said one terminal is in the commit-ready state, to thereby change the state of said exchange state storage unit of said one terminal to the commit state,
storing, by a recovery log storage unit, the identification information of the terminal that has performed a recovery; and
acquiring, by a recovery execution unit, a state of said value storage unit of said first terminal, and if the state represents said commit-ready state, performing the operations of:
acquiring the commit order recorded in said commit order storage unit of said first terminal;
checking whether or not the recovery log storage unit stores the identification information of said second terminal;
executing cancellation of said exchange contract of said first terminal if the commit order which the recovery log storage unit does not stores the identification information of said second terminal;
executing cancellation of said exchange contract of said first terminal if the commit order which the recovery execution unit acquires represents that said first terminal is not the first to execute state change and if said recovery log storage unit stores the identification information of said second terminal;
executing commit of said exchange contract of said first terminal if the commit order which the recovery execution unit acquire represents that said first terminal is the first to execute state change and if said recovery log storage unit stores the identification information of said second terminal; and
executing commit of said exchange contract of said first terminal if the commit which the recovery execution unit acquires represents that said first terminal is not the first to execute state change and if said recovery log storage unit does not stores the identification information of said second terminal.

* * * * *

UNITED STATES PATENT AND TRADEMARK OFFICE
CERTIFICATE OF CORRECTION

PATENT NO. : 8,762,240 B2  
APPLICATION NO. : 12/744309  
DATED : June 24, 2014  
INVENTOR(S) : Takushi Sogo and Yuichi Koike Page 1 of 1

It is certified that error appears in the above-identified patent and that said Letters Patent is hereby corrected as shown below:

In the Claims

Column 46, Line 4: Claim 5, delete "fourths" and insert -- fourth --

Signed and Sealed this  
Thirtieth Day of December, 2014

Michelle K. Lee  
*Deputy Director of the United States Patent and Trademark Office*